United States Patent
Huang et al.

(10) Patent No.: US 12,486,338 B2
(45) Date of Patent: Dec. 2, 2025

(54) POLY ALPHA-1,6-GLUCAN DERIVATIVES AND COMPOSITIONS COMPRISING SAME

(71) Applicant: NUTRITION & BIOSCIENCES USA 4, INC., Rochester, NY (US)

(72) Inventors: Zhengzheng Huang, Hockessin, DE (US); Douglas J. Adelman, Wilmington, DE (US); Neil Thomas Fairweather, Liberty Town, OH (US); Kristi Lynn Fliter, Cincinnati, OH (US); David Good, Cincinnati, OH (US); Helen S.M. Lu, Wallingford, PA (US); Weiming Qiu, Wilmington, DE (US); Gang Si, Newcastle Upon Tyne (GB); Mark Robert Sivik, Cincinnati, OH (US)

(73) Assignee: NUTRITION & BIOSCIENCES USA 4, INC., Wilmington, DE (US)

( * ) Notice: Subject to any disclaimer, the term of this patent is extended or adjusted under 35 U.S.C. 154(b) by 554 days.

(21) Appl. No.: 18/007,583

(22) PCT Filed: Jun. 9, 2021

(86) PCT No.: PCT/US2021/036529
§ 371 (c)(1),
(2) Date: Dec. 1, 2022

(87) PCT Pub. No.: WO2021/252569
PCT Pub. Date: Dec. 16, 2021

(65) Prior Publication Data
US 2023/0212325 A1    Jul. 6, 2023

Related U.S. Application Data

(60) Provisional application No. 63/037,076, filed on Jun. 10, 2020.

(51) Int. Cl.
*C08B 37/02* (2006.01)
*C11D 3/22* (2006.01)

(52) U.S. Cl.
CPC .......... *C08B 37/0021* (2013.01); *C11D 3/222* (2013.01); *C11D 3/227* (2013.01)

(58) Field of Classification Search
CPC ...... C08B 37/0021; C11D 3/222; C11D 3/227
See application file for complete search history.

(56) References Cited

U.S. PATENT DOCUMENTS

| | | |
|---|---|---|
| 2,734,005 A | 2/1956 | Novak et al. |
| 2,786,786 A | 3/1957 | Novak et al. |
| 5,739,122 A | 4/1998 | Schehlmann et al. |
| 5,776,435 A | 7/1998 | Gaffar et al. |
| 6,013,250 A | 1/2000 | Cannell et al. |
| 6,020,303 A | 2/2000 | Cripe et al. |
| 6,060,443 A | 5/2000 | Cripe et al. |
| 6,139,851 A | 10/2000 | Omura et al. |
| 6,280,747 B1 | 8/2001 | Philippe et al. |
| 7,000,000 B1 | 2/2006 | O'Brien |
| 8,540,971 B2 | 9/2013 | Zaidel et al. |
| 8,642,757 B2 | 2/2014 | O'Brien et al. |
| 8,796,196 B2 | 8/2014 | Chan et al. |
| 8,871,474 B2 | 10/2014 | Payne et al. |
| 9,080,195 B2 | 7/2015 | O'Brien et al. |
| 9,139,718 B2 | 9/2015 | Paullin et al. |
| 10,005,850 B2 | 6/2018 | Kasat et al. |
| 10,260,053 B2 | 4/2019 | Paullin et al. |
| 10,301,604 B2 | 5/2019 | Li et al. |
| 11,905,495 B2 * | 2/2024 | Sivik .............. C11D 17/045 |
| 2004/0010864 A1 | 1/2004 | Vic et al. |
| 2012/0058196 A1 | 3/2012 | Friesen et al. |
| 2013/0244287 A1 | 9/2013 | O'Brien et al. |
| 2013/0244288 A1 | 9/2013 | O'Brien et al. |
| 2014/0179913 A1 | 6/2014 | Paullin et al. |
| 2015/0064748 A1 | 3/2015 | Caimi et al. |

(Continued)

FOREIGN PATENT DOCUMENTS

| | | | | |
|---|---|---|---|---|
| AU | 2016243411 B2 * | 10/2020 | .............. | C12P 19/18 |
| EP | 3922704 A1 * | 12/2021 | .............. | C11D 3/228 |

(Continued)

OTHER PUBLICATIONS

Naessens et al., "Leuconostoc dextransucrase and dextran: production, properties and applications", J. Chem. Technol. Biotechnol. 80:845-860.

Vuillemin et al., "Characterization of the First alpha-(1-->3) Branching Sucrases of the GH70 Family", J. Biol Chem. 291:7687-7702; 2016.

Heinze et al., "Functional Polymers Based on Dextran", POLYSACCHARIDES, 2 (Book Series: Advances in Polymer Science), pp. 199-291; 2006.

Togo et al., "Synthesis and characterization of dextran ester derivatives and their adhesive propertie", J. Wood Sci. 65:66; 2019.

Larsen, "Dextran prodrugs—structure and stability in relation to therapeutic activity", Advanced Drug Delivery Reviews 3:103-154; 1989.

(Continued)

*Primary Examiner* — Mark Eashoo
*Assistant Examiner* — M. Reza Asdjodi

(57) ABSTRACT

The disclosure relates to poly alpha-1,6-glucan derivatives comprising poly alpha-1,6-glucan substituted with at least one organic group linked to the poly alpha-1,6-glucan through a linkage moiety selected from ether, sulfonyl, carbonate, or carbamoyl/carbamate, and having a degree of substitution of about 0.001 to about 3.0. The poly alpha-1,6-glucan comprises a backbone of glucose monomer units wherein greater than or equal to 40% of the glucose monomer units are linked via alpha-1,6 glycosidic linkages, and optionally at least 5% of the backbone glucose monomer units have branches via alpha-1,2 and/or alpha-1,3 glycosidic linkages. Compositions comprising a poly alpha-1,6-glucan derivative can be useful in various applications.

20 Claims, No Drawings

(56) References Cited

U.S. PATENT DOCUMENTS

| | | | |
|---|---|---|---|
| 2015/0232785 A1* | 8/2015 | Paullin | C11D 3/222 |
| | | | 536/120 |
| 2015/0368594 A1* | 12/2015 | Nagy | C11D 3/38645 |
| | | | 510/320 |
| 2017/0002335 A1 | 1/2017 | Payne et al. | |
| 2017/0198324 A1 | 7/2017 | Cheng et al. | |
| 2017/0218093 A1 | 8/2017 | Cheng et al. | |
| 2018/0021238 A1 | 1/2018 | Huh et al. | |
| 2018/0237816 A1* | 8/2018 | Paullin | C08B 37/0021 |
| 2018/0273731 A1 | 9/2018 | Opietnik et al. | |
| 2018/0282385 A1 | 10/2018 | Cheng et al. | |
| 2018/0340199 A1 | 11/2018 | Nagy et al. | |
| 2019/0078062 A1 | 3/2019 | Li et al. | |
| 2019/0078063 A1 | 3/2019 | Li et al. | |
| 2019/0112456 A1 | 4/2019 | Bell et al. | |
| 2019/0185893 A1 | 6/2019 | Guan et al. | |
| 2019/0276806 A1 | 9/2019 | Li et al. | |
| 2019/0359734 A1 | 11/2019 | Qiu et al. | |
| 2019/0390138 A1* | 12/2019 | Sivik | C11D 17/043 |
| 2020/0002646 A1* | 1/2020 | Huang | C11D 3/228 |
| 2020/0165360 A1 | 5/2020 | Behabtu et al. | |
| 2021/0253977 A1* | 8/2021 | Huang | C08L 5/00 |
| 2021/0388290 A1* | 12/2021 | Sivik | C08B 37/0009 |
| 2021/0395648 A1* | 12/2021 | Sivik | C11D 3/225 |
| 2021/0395649 A1* | 12/2021 | Sivik | C11D 3/222 |
| 2021/0395655 A1* | 12/2021 | DePoot | C11D 3/225 |
| 2023/0212325 A1* | 7/2023 | Huang | C08B 37/0021 |
| | | | 510/321 |
| 2023/0287148 A1* | 9/2023 | Huang | C11D 3/226 |
| 2023/0332073 A1* | 10/2023 | Sivik | C11D 3/386 |
| 2024/0301325 A1* | 9/2024 | Burkhart | C08L 5/02 |

FOREIGN PATENT DOCUMENTS

| | | | | |
|---|---|---|---|---|
| EP | 3926029 A1 * | 12/2021 | | C11D 17/06 |
| WO | 2001007009 A1 | 2/2001 | | |
| WO | 2015183714 A1 | 12/2015 | | |
| WO | 2016160738 A2 | 10/2016 | | |
| WO | 2017091533 A1 | 6/2017 | | |
| WO | WO-2019246228 A1 * | 12/2019 | | C08B 37/0021 |
| WO | 2021007264 A1 | 1/2021 | | |

OTHER PUBLICATIONS

Hornig et al., "Nanoscale structures of dextran esters", Carb. Polymers 68:280-286; 2007.

International Preliminary Report on Patentability for PCT/US2021/036529 issued Dec. 13, 2022.

* cited by examiner

POLY ALPHA-1,6-GLUCAN DERIVATIVES AND COMPOSITIONS COMPRISING SAME

This application is the National Stage application of International Application No. PCT/US2021/036529 (filed Jun. 9, 2021), which claims the benefit of U.S. Provisional Appl. No. 63/037,076 (filed Jun. 10, 2020), both of which prior applications are incorporated herein by reference in their entirety.

FIELD OF THE DISCLOSURE

The present disclosure is directed towards poly alpha-1,6-glucan derivatives comprising poly alpha-1,6-glucan substituted with at least one organic group. The poly alpha-1,6-glucan comprises a backbone of glucose monomer units wherein greater than or equal to 40% of the glucose monomer units are linked via alpha-1,6 glycosidic linkages, and optionally at least 5% of the backbone glucose monomer units have branches via alpha-1,2 and/or alpha-1,3 glycosidic linkages.

BACKGROUND

Polysaccharides modified with ether groups may be used for aqueous applications such as rheology modifiers, emulsion stabilizers, and dispersing agents in cleaning, detergent, cosmetics, food, cement, film, and paper production. For example, carboxymethyl cellulose derivatives have been used as rheology modifiers. Enzymatically-polymerized polysaccharides and their derivatives can have narrow polydispersity and compositional consistency, offering advantages in some applications. Ether derivatives of poly alpha-1,3-1,6-glucan and methods of using such materials as viscosity modifiers are disclosed in published patent application US 2015/0232785. Hydrocolloids and aqueous solutions comprising a poly alpha-1,3-glucan ether compound and such materials in the form of a personal care product, pharmaceutical product, food product, household product, or industrial product, are disclosed in U.S. Pat. No. 10,005,850. The pattern of glycosidic linkages in the glucan polymer backbone, in combination with selected substituents on the ether compound and the degree of substitution, can affect the solubility or dispersibility of the glucan ether compound in aqueous solution.

There is a continuing need for new materials which can be used in aqueous applications such as fabric care, for example as anti-deposition, anti-graying, and/or whiteness performing agents in laundry detergents, and in home and personal care applications. There remains a need for such materials which can be made from renewable resources and which are biodegradable.

SUMMARY

Disclosed herein are poly alpha-1,6-glucan derivatives comprising:
(i) poly alpha-1,6-glucan substituted with at least one organic group linked to the poly alpha-1,6-glucan through a linkage moiety selected from —O—, —OSO$_2$—, —OCOO—, or —OCONH—/

(ii) a weight average degree of polymerization of at least 5; and
(iii) a degree of substitution of about 0.001 to about 3.0; wherein the poly alpha-1,6-glucan comprises a backbone of glucose monomer units, and wherein greater than or equal to 40% of the glucose monomer units are linked via alpha-1,6 glycosidic linkages.

In one embodiment, at least 5% of the backbone glucose monomer units have branches via alpha-1,2 and/or alpha-1,3 glycosidic linkages. In one embodiment, the degree of substitution is about 0.01 to about 1.5. In one embodiment, the degree of substitution is about 0.01 to about 0.6. In one embodiment, the degree of substitution is about 0.01 to about 0.2. In one embodiment, the poly alpha-1,6-glucan derivative has a weight average degree of polymerization in the range of from about 5 to about 1400. In one embodiment, the poly alpha-1,6-glucan derivative has a biodegradability as determined by the Carbon Dioxide Evolution Test Method of at least 10% after 90 days.

In one embodiment, the linkage moiety is —O—. In one embodiment, the linkage moiety is —OSO$_2$—. In one embodiment, the linkage moiety is —OCOO—. In one embodiment, the linkage moiety is —OCONH— or

(carbamoyl/carbamate). In one embodiment, at least one linkage moiety is —O— and at least one linkage moiety is —OSO$_2$—.

In one embodiment, the organic group comprises a $C_1$ to $C_{18}$ alkyl group, a hydroxy alkyl group, a carboxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of (—CH$_2$CH$_2$O—), (—CH$_2$CH(CH$_3$)O—), CH(CH$_3$)CH(CH$_3$)O—), and/or (—CH$_2$CH(CH$_2$CH$_3$)O—) or a mixture thereof, wherein the total number of repeat units is in the range of 2 to 100, or a combination thereof. In one embodiment, the organic group comprises a $C_1$-$C_{10}$ alkyl group, a $C_1$-$C_{10}$ hydroxyl alkyl group, a polyether comprising repeat units of (—CH$_2$CH$_2$O—), (—CH$_2$CH(CH$_3$)O—), CH(CH$_3$)CH(CH$_3$)O—), and/or (—CH$_2$CH(CH$_2$CH$_3$)O—) or a mixture thereof, wherein the total number of repeat units is in the range of 2 to 100, or a combination thereof. In one embodiment, the organic group comprises a benzyl group or a benzyl group substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or a combination thereof. In one embodiment, the organic group is a methyl, ethyl, phenyl, benzyl, or p-tolyl group.

In one embodiment, the linkage moiety is —O— and at least one organic group is a $C_1$ to $C_{10}$ alkyl group, a $C_1$-$C_{10}$ hydroxy alkyl group, a polyether comprising repeat units of (—CH$_2$CH$_2$O—) and/or (—CH$_2$CH(CH$_3$)O—) wherein the total number of repeat units is in the range of 2 to 100, a benzyl group, or a combination thereof.

In one embodiment, the linkage moiety is —OSO$_2$— and at least one organic group is a $C_6$-$C_{20}$ aryl group, optionally substituted with alkyl groups. In a further embodiment, the linkage moiety is —OSO$_2$— and the aryl group is a tolyl group.

Also disclosed herein are compositions comprising a poly alpha-1,6-glucan derivative as disclosed herein. Further disclosed herein are a personal care product, a home care product, an industrial product, and a fabric care product comprising a poly alpha-1,6-glucan derivative as disclosed herein, or comprising a composition containing a poly alpha-1,6-glucan derivative as disclosed herein.

In another embodiment, the composition is in the form of a liquid, a gel, a powder, a hydrocolloid, an aqueous solution, a granule, a tablet, a capsule, a bead or pastille, a single compartment sachet, a pad, a multi-compartment sachet, a single compartment pouch, or a multi-compartment pouch.

In yet another embodiment, the composition further comprises at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

In one embodiment, the enzyme is a cellulase, a protease, a lipase, an amylase, a lipase, or a combination thereof. In one embodiment, the enzyme is a cellulase. In one embodiment, the enzyme is a protease. In one embodiment, the enzyme is an amylase. In one embodiment, the enzyme is a lipase.

Also disclosed herein is a method for treating a substrate, the method comprising the steps:
(a) providing a composition comprising a poly alpha-1, 6-glucan derivative as disclosed herein;
(b) contacting the substrate with the composition; and
(c) optionally rinsing the substrate;
wherein the substrate is a textile, a fabric, carpet, upholstery, apparel, or a surface.

DETAILED DESCRIPTION

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. These articles should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

As used herein:

The term "polysaccharide" means a polymeric carbohydrate molecule composed of long chains of monosaccharide units bound together by glycosidic linkages and on hydrolysis gives the constituent monosaccharides or oligosaccharides.

The terms "poly alpha-1,6-glucan", "alpha-1,6-glucan", "dextran", "dextran polymer" and the like herein refer to an alpha-glucan comprising at least 40% alpha-1,6 glycosidic linkages.

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The phrase "water insoluble" means that less than 1 gram of the polysaccharide or polysaccharide derivative dissolves in 1000 milliliters of water at 23° C.

The term "water soluble" means that the polysaccharide or polysaccharide derivative is soluble at 1% by weight or higher in pH 7 water at 25° C. The percentage by weight is based on the total weight of the polysaccharide soluble in water, for example, 1 gram of polysaccharide in 100 grams of water.

The term "hydrophobic" refers to a molecule or substituent which is nonpolar and has little or no affinity for water, and which tends to repel water.

The term "molar substitution" (M.S.) as used herein refers to the moles of an organic group per monomeric unit of the polysaccharide or the derivative thereof. It is noted that the molar substitution value for a poly alpha-1,6-glucan derivative, for example, may have a very high upper limit, for example in the hundreds or even thousands. For example, if the organic group is a hydroxyl-containing alkyl group, via the addition of ethylene oxide to one of the hydroxyl groups of the poly alpha-1,6-glucan, then the so-formed hydroxyl group from the ethylene oxide can then be further etherified to form a polyether.

The molecular weight of a polysaccharide or polysaccharide derivative can be represented as statistically averaged molecular mass distribution, i.e. as number-average molecular weight ($M_n$) or as weight-average molecular weight ($M_w$), both of which are generally given in units of Daltons (Da), i.e. in grams/mole. Alternatively, molecular weight can be represented as DPw (weight average degree of polymerization) or DPn (number average degree of polymerization). Various means are known in the art for calculating these molecular weights from techniques such as high-pressure liquid chromatography (HPLC), size exclusion chromatography (SEC), gel permeation chromatography (GPC), and gel filtration chromatography (GFC).

As used herein, "weight average molecular weight" or "$M_w$" is calculated as $M_w = \Sigma N_i M_i^2 / \Sigma N_i M_i$; where $M_i$ is the molecular weight of an individual chain i and $N_i$ is the number of chains of that molecular weight. In addition to using SEC, the weight average molecular weight can be determined by other techniques such as static light scattering, mass spectrometry especially MALDI-TOF (matrix-assisted laser desorption/ionization time-of-flight), small angle X-ray or neutron scattering, and ultracentrifugation.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain i and $N_i$ is the number of chains of that molecular weight. In addition to using SEC, the number average molecular weight of a polymer can be determined by various colligative methods such as vapor pressure osmometry or end-group determination by spectroscopic methods such as proton NMR, FTIR, or UV-vis.

As used herein, number average degree of polymerization (DPn) and weight average degree of polymerization (DPw) are calculated from the corresponding average molecular weights $M_w$ or $M_n$ by dividing by the molar mass of one monomer unit $M_1$. In the case of unsubstituted glucan polymer, $M_1 = 162$. In the case of a substituted glucan polymer, $M_1 = 162 + M_f \times DoS$, where $M_f$ is the molar mass of the substituent group and DoS is the degree of substitution with respect to that substituent group (average number of substituted groups per one glucose unit).

Glucose carbon positions 1, 2, 3, 4, 5 and 6 as referred to herein are as known in the art and depicted in Structure I:

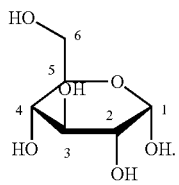

Structure I

The terms "glycosidic linkage" and "glycosidic bond" are used interchangeably herein and refer to the type of covalent bond that joins a carbohydrate (sugar) molecule to another group such as another carbohydrate. The term "alpha-1,6-glucosidic linkage" as used herein refers to the covalent bond that joins alpha-D-glucose molecules to each other through carbons 1 and 6 on adjacent alpha-D-glucose rings. The term "alpha-1,3-glucosidic linkage" as used herein refers to the covalent bond that joins alpha-D-glucose molecules to each other through carbons 1 and 3 on adjacent alpha-D-glucose rings. The term "alpha-1,2-glucosidic linkage" as used herein refers to the covalent bond that joins alpha-D-glucose molecules to each other through carbons 1 and 2 on adjacent alpha-D-glucose rings. The term "alpha-1,4-glucosidic linkage" as used herein refers to the covalent bond that joins alpha-D-glucose molecules to each other through carbons 1 and 4 on adjacent alpha-D-glucose rings. Herein, "alpha-D-glucose" will be referred to as "glucose".

The glycosidic linkage profile of a glucan, dextran, substituted glucan, or substituted dextran can be determined using any method known in the art. For example, a linkage profile can be determined using methods that use nuclear magnetic resonance (NMR) spectroscopy (e.g., $^{13}$C NMR or $^1$H NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, FL, 2005), which is incorporated herein by reference.

The structure, molecular weight, and degree of substitution of a polysaccharide or polysaccharide derivative can be confirmed using various physiochemical analyses known in the art such as NMR spectroscopy and size exclusion chromatography (SEC).

The terms "household care product", "home care product", and like terms typically refer to products, goods and services relating to the treatment, cleaning, caring, and/or conditioning of a home and its contents. The foregoing includes, for example, chemicals, compositions, products, or combinations thereof having application in such care.

The term "personal care product" and like terms typically refer to products, goods and services relating to the treatment, cleaning, cleansing, caring, or conditioning of a person. The foregoing includes, for example, chemicals, compositions, products, or combinations thereof having application in such care.

The term "industrial product" and like terms typically refer to products, goods and services used in industrial settings, but typically not by individual consumers.

The present disclosure is directed to a poly alpha-1,6-glucan derivative comprising:
  (i) poly alpha-1,6-glucan substituted with at least one organic group linked to the poly alpha-1,6-glucan through a linkage moiety selected from —O—, —OSO$_2$—, —OCOO—, or —OCONH— or

(ii) a weight average degree of polymerization of at least 5; and
  (iii) a degree of substitution of about 0.001 to about 3.0; wherein the poly alpha-1,6-glucan comprises a backbone of glucose monomer units wherein greater than or equal to 40% of the glucose monomer units are linked via alpha-1,6 glycosidic linkages, and optionally at least 5% of the backbone glucose monomer units have branches via alpha-1,2 and/or alpha-1,3 glycosidic linkages. Optionally, the poly alpha-1,6-glucan is (a) substituted with only one type of the linkage moiety selected from —O—, —OSO$_2$—, —OCOO—, or —OCONH—/

(and no other types of substitutions), (b) substituted with two or more different types of linkage moieties selected from —O—, —OSO$_2$—, —OCOO—, or —OCONH—/

(and no other types of substitutions), or (c) not substituted with a hydrophilic group.

The poly alpha-1,6-glucan derivatives disclosed herein comprise water-soluble poly alpha-1,6-glucan comprising a backbone of glucose monomer units wherein greater than or equal to 40% of the glucose monomer units are linked via alpha-1,6-glycosidic linkages, and optionally at least 5% of the backbone glucose monomer units have branches via alpha-1,2 and/or alpha-1,3-glycosidic linkages, the poly alpha-1,6-glucan being substituted (preferably randomly substituted) with organic groups on the polysaccharide backbone and/or on any branches which may be present, such that the poly alpha-1,6-glucan derivative comprises, in some aspects, unsubstituted and substituted alpha-D-glucose rings. As used herein, the term "randomly substituted" means the substituents on the glucose rings in the randomly substituted polysaccharide occur in a non-repeating or random fashion. That is, the substitution on a substituted glucose ring may be the same or different [i.e. the substituents (which may be the same or different) on different atoms in the glucose rings in the polysaccharide] from the substitution on a second substituted glucose ring in the polysaccharide, such that the overall substitution on the polymer has no pattern. Further, the substituted glucose rings occur randomly within the polysaccharide (i.e., there is no pattern with the substituted and unsubstituted glucose rings within the polysaccharide).

In some embodiments, depending on reaction conditions and the specific substituent used to derivatize the poly alpha-1,6-glucan, the glucose monomers of the polymer backbone may be disproportionately substituted relative to the glucose monomers of any branches, including branches via alpha-1,2 and/or alpha-1,3 linkages, if present. In another embodiment, the glucose monomers of the branches, including branches via alpha-1,2 and/or alpha-1,3 linkages, if present, may be disproportionately substituted relative to the glucose monomers of the polymer backbone. In some embodiments, depending on reaction conditions and the specific substituent used, substitution of the poly alpha-1,6-glucan may occur in a block manner.

In some embodiments, depending on reaction conditions and the specific substituent used to derivatize the poly alpha-1,6-glucan, it is possible that the hydroxyl groups at certain glucose carbon positions may be disproportionately substituted. For example, in some embodiments, the hydroxyl at carbon position 2, 3, or 4 may be more substituted than the hydroxyls at other carbon positions.

The poly alpha-1,6-glucan derivatives disclosed herein comprise poly alpha-1,6-glucan substituted with at least one organic group, wherein the organic group or groups are independently linked to the poly alpha-1,6-glucan polysaccharide backbone and/or to any branches, if present, through a linkage moiety selected from —O— (ether), —OSO$_2$— (sulfonyl), —OCOO— (carbonate), or —OCONH—/

(carbamoyl or carbamate, also referred to as urethane). In typical aspects, the at least one organic group can derivatize the poly alpha-1,6-glucan at the 2, 3, and/or 4 glucose carbon position of a glucose monomer on the backbone of the glucan, and/or at the 2, 3, 4, or 6 glucose carbon position(s) of a glucose monomer on a branch, if present. At unsubstituted positions, a hydroxyl group is present in a glucose monomer.

In one embodiment, at least one organic group comprises a $C_1$ to $C_{18}$ alkyl group, a hydroxy alkyl group, a carboxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of (—CH$_2$CH$_2$O—) and/or (—CH$_2$CH(CH$_3$)O—) wherein the total number of repeat units is in the range of 2 to 100, or a combination thereof. In another embodiment, at least one organic group comprises a $C_1$-$C_{10}$ alkyl group, a $C_1$-$C_{10}$ hydroxyl alkyl group, a polyether comprising repeat units of (—CH$_2$CH$_2$O—) and/or (—CH$_2$CH(CH$_3$)O—) wherein the total number of repeat units is in the range of 2 to 100, or a combination thereof. In an additional embodiment, at least one organic group comprises a $C_6$-$C_{20}$ aryl group, optionally substituted with alkyl groups. In a further embodiment, the aryl group is a tolyl group.

The poly alpha-1,6-glucan derivatives disclosed herein contain hydrophobic substituents and are of interest due to their solubility characteristics in water, which can be varied by appropriate selection of substituents and the degree of substitution. Compositions comprising the poly alpha-1,6-glucan derivatives can be useful in a wide range of applications, including laundry, cleaning, food, cosmetics, industrial, film, and paper production. Poly alpha-1,6-glucan derivatives having greater than 0.1 weight percent (wt %) solubility in water can be useful as rheology modifiers, emulsion stabilizers, and dispersing agents in cleaning, detergent, cosmetics, food, cement, film, and paper production, wherein the products are in a primarily water-based formulation and optical clarity is desired. Poly alpha-1,6-glucan derivatives having less than 0.1 wt % solubility in water can be useful as rheology modifiers, emulsion stabilizers, and dispersing agents in cleaning, detergent, cosmetics, food, cement, film, and paper production, wherein the products are in formulations which contain organic solvents to solubilize or disperse the poly alpha-1,6-glucan derivatives. In one embodiment of the composition, the poly alpha-1,6-glucan derivative has a DoS of about 0.001 to about 1.5 and a solubility of 0.1% by weight or higher in deionized water at 25° C. In another embodiment of the composition, the poly alpha-1,6-glucan derivative has a DoS of about 0.05 to about 1.5 and a solubility of less than 0.1% by weight in pH 7 water at 25° C.

Compositions comprising poly alpha-1,6-glucan derivatives can be sustainable materials in applications disclosed herein. Furthermore, biodegradable alpha-1,6-glucan derivatives are preferred over non-biodegradable materials from an environmental footprint perspective. Biodegradability of a material can be evaluated by methods known in the art, for example, or as disclosed in the Examples section herein below. In some embodiments, the poly alpha-1,6-glucan derivative has a biodegradability as determined by the Carbon Dioxide Evolution Test Method (OECD Guideline 301B) of about, or at least about, 5%, 10%, 15%, 20%, 25%, 30%, 35%, 40%, 45%, 50%, 55%, 60%, 65%, 70%, 75%, 80%, 85%, 90%, 5-80%, 5-90%, 40-70%, 50-70%, 60-70%, 40-75%, 50-75%, 60-75%, 70-75%, 40-80%, 50-80%, 60-80%, 70-80%, 40-85%, 50-85%, 60-85%, 70-85%, 40-90%, 50-90%, 60-90%, or 70-90%, or any value between 5% and 90%, after 30, 60, or 90 days of performing the test.

The poly alpha-1,6-glucan derivatives disclosed herein can be comprised in a personal care product, pharmaceutical product, household product, or industrial product in an amount that provides a desired degree of one or more of the following physical properties to the product: thickening, freeze/thaw stability, lubricity, moisture retention and release, texture, consistency, shape retention, emulsification, binding, suspension, dispersion, and gelation, for example. Examples of a concentration or amount of a poly alpha-1, 6-glucan derivative as disclosed herein in a product, on a weight basis, can be about 0.1-3 wt %, 1-2 wt %, 1.5-2.5 wt %, 2.0 wt %, 0.1-4 wt %, 0.1-5 wt %, or 0.1-10 wt %, for example.

A household and/or industrial product herein can be in the form of drywall tape-joint compounds; mortars; grouts; cement plasters; spray plasters; cement stucco; adhesives; pastes; wall/ceiling texturizers; binders and processing aids for tape casting, extrusion forming, injection molding and ceramics; spray adherents and suspending/dispersing aids for pesticides, herbicides, and fertilizers; fabric care products such as fabric softeners and laundry detergents; hard surface cleaners; air fresheners; polymer emulsions; gels such as water-based gels; surfactant solutions; paints such as water-based paints; protective coatings; adhesives; sealants and caulks; inks such as water-based ink; metal-working fluids; emulsion-based metal cleaning fluids used in electroplating, phosphatizing, galvanizing and/or general metal cleaning operations; hydraulic fluids (e.g., those used for fracking in downhole operations); and aqueous mineral slurries, for example.

The terms "poly alpha-1,6-glucan" and "dextran" are used interchangeably herein. Dextrans represent a family of complex, branched alpha-glucans generally comprising chains of alpha-1,6-linked glucose monomers, with periodic side chains (branches) linked to the straight chains by alpha-1, 3-linkage (Ioan et al., *Macromolecules* 33:5730-5739) and/or alpha-1,2-linkage. Production of dextran for producing a poly alpha-1,6-glucan derivative herein can be done, for example, through fermentation of sucrose with bacteria (e.g., *Leuconostoc* or *Streptococcus* species), where sucrose serves as the source of glucose for dextran polymerization (Naessens et al., *J. Chem. Technol. Biotechnol.* 80:845-860; Sarwat et al., *Int. J. Biol. Sci.* 4:379-386; Onilude et al., *Int. Food Res. J.* 20:1645-1651). Alternatively, poly alpha-1,6-glucan can be prepared using a glucosyltransferase (dextransucrase) such as (but not limited to) GTF1729, GTF1428, GTF5604, GTF6831, GTF8845, GTF0088, and GTF8117 as described in Int. Patent Appl. Publ. Nos. WO2015/183714 or WO2017/091533, or U.S. Patent Appl. Publ. Nos. 2017/0218093 or 2018/0282385, all of which are incorporated herein by reference.

In some embodiments, the poly alpha-1,6-glucan derivative comprises a backbone of glucose monomer units wherein greater than or equal to 40%, 45%, 50%, 55%, 60%, 65%, 70%, 75%, 80%, 85%, 90%, 95%, 96%, 97%, 98%, 99%, 99.5%, or 100% of the glucose monomer units are linked via alpha-1,6-glycosodic linkages. The backbone of the poly alpha-1,6-glucan derivative can comprise, for example, 0.5%, 1%, 2%, 3%, 4%, 5%, 10%, 15%, 20%, 25%, 30%, 35%, 40%, 45%, 50%, 55%, or 60% glucose monomer units which are linked via alpha-1,2, alpha-1,3, and/or alpha-1,4 glycosidic linkages. In some aspects, the poly alpha-1,6-glucan derivative comprises a backbone that is linear (unbranched). In some aspects, the backbone of poly alpha-1,6-glucan derivative can comprise 0% to less than 30% alpha-1,3 glycosidic linkages.

Dextran "long chains" herein can comprise "substantially (or mostly) alpha-1,6-glucosidic linkages", meaning that they can have at least about 98.0% alpha-1,6-glucosidic linkages in some aspects. Dextran herein can comprise a "branching structure" (branched structure, such as dendritic) in some aspects. It is contemplated that in this structure, long chains branch from other long chains, likely in an iterative manner (e.g., a long chain can be a branch from another long chain, which in turn can itself be a branch from another long chain, and so on). It is contemplated that long chains in this structure can be "similar in length", meaning that the length (DP [degree of polymerization]) of at least 70% of all the long chains in a branching structure is within plus/minus 30% of the mean length of all the long chains of the branching structure.

Dextran in some embodiments can also comprise "short chains" branching from the long chains, typically being one to three glucose monomers in length, and typically comprising less than about 10% of all the glucose monomers of a dextran polymer. Such short chains typically comprise alpha-1,2-, alpha-1,3-, and/or alpha-1,4-glucosidic linkages (it is understood that there can also be a small percentage of such non-alpha-1,6 linkages in long chains in some aspects). In certain embodiments, the poly-1,6-glucan with branching is produced enzymatically according to the procedures in WO2015/183714 and WO2017/091533 (both incorporated herein by reference) where, for example, alpha-1,2-branching enzymes such as GTFJ18T1 or GTF9905 can be added during or after the production of the dextran polymer (polysaccharide). In some embodiments, any other enzyme known to produce alpha-1,2-branching can be added. Poly alpha-1,6-glucan with alpha-1,3-branching can be prepared as disclosed in Vuillemin et al. (2016, *J. Biol Chem.* 291: 7687-7702), Int. Patent Appl. Publ. No. WO2021/007264, or U.S. Appl. No. 62/871,796 (as originally filed), which are incorporated herein by reference. The degree of branching of poly alpha-1,6-glucan or a poly alpha-1,6-glucan derivative in such embodiments has less than or equal to 50%, 40%, 30%, 20%, 10%, or 5% (or any integer value between 5% and 50%) of short branching, for example alpha-1,2-branching or 1,3-branching. In one embodiment, the poly alpha-1,6-glucan or the poly alpha-1,6-glucan derivative has a degree of alpha-1,2-branching that is less than 50%. In another embodiment, the poly alpha-1,6-glucan or the poly alpha-1,6-glucan derivative has a degree of alpha-1,2-branching that is at least 5%. In one embodiment, at least 5% of the backbone glucose monomer units of the poly alpha-1,6-glucan derivative have branches via alpha-1,2- or alpha-1,3-glycosidic linkages. In one embodiment, the poly alpha-1,6-glucan or the poly alpha-1,6-glucan derivative comprises a backbone of glucose monomer units wherein greater than or equal to 40% of the glucose monomer units are linked via alpha-1,6-glycosidic linkages. In one embodiment, the poly alpha-1,6-glucan derivative comprises a backbone of glucose monomer units wherein greater than or equal to 40% of the glucose monomer units are linked via alpha-1,6-glycosidic linkages and at least 5% of the glucose monomer units have branches via alpha-1,2- or alpha-1,3-glycosidic linkages. In one embodiment, the poly alpha-1,6-glucan derivative comprises a backbone of glucose monomer units wherein greater than or equal to 40% of the glucose monomer units are linked via alpha-1,6-glycosidic linkages and at least 5% of the glucose monomer units have branches via alpha-1,2 linkages. In one embodiment, the poly alpha-1,6-glucan derivative comprises a backbone of glucose monomer units wherein greater than or equal to 40% of the glucose monomer units are linked via alpha-1,6-glycosidic linkages and at least 5% of the glucose monomer units have branches via alpha-1,3 linkages. In one embodiment, the poly alpha-1,6-glucan or poly alpha-1,6-glucan derivative is linear, or predominantly linear. In some aspects, about, at least about, or less than about, 1%, 2%, 3%, 4%, 5%, 10%, 15%, 20%, 25%, 30%, 35%, 40%, 50%, 55%, 60%, 65%, 70%, 75%, 80%, 85%, 90%, 5-9%, or 26-40% of the backbone glucose monomer units of a poly alpha-1,6-glucan or derivative thereof as presently disclosed can have branches via alpha-1,2 and/or alpha-1,3 glycosidic linkages. In some aspects, about, at least about, or less than about, 1%, 2%, 2.5%, 5%, 10%, 15%, 20%, 25%, 30%, 35%, 40%, or 45% of all the glycosidic linkages of an alpha-1,2- and/or alpha-1,3-branched poly alpha-1,6-glucan or derivative thereof as presently disclosed are alpha-1,2 and/or alpha-1,3 glycosidic linkages. The amount of alpha-1,2-branching or alpha-1,3-branching can be determined by NMR methods, as disclosed in the Examples.

The poly alpha-1,6-glucan and poly alpha-1,6-glucan derivatives disclosed herein can have a number-average degree of polymerization (DPn) or weight-average degree of polymerization (DPw) in the range of 5 to 4000. In some embodiments, the DPn or DPw can be in the range of 5 to 100, 5 to 500, 5 to 1000, 5 to 1500, 5 to 2000, 5 to 2500, 5 to 3000, or 5 to 4000. In some embodiments, the DPn or DPw can be in the range of 50 to 500, 50 to 1000, 50 to 1500, 50 to 2000, 50 to 3000, or 50 to 4000. In some embodiments, the DPn or DPw can be in the range of 400 to 4000, 400 to 3000, 400 to 2000, or 400 to 1000. In some embodiments, the DPn or DPw can be about, at least about, or less than about, 5, 10, 25, 50, 100, 250, 500, 1000, 1500, 2000, 2500, 3000, 4000, 5000, 6000, 5-95, 5-100, 5-250, 5-500, 5-1000, 5-1500, 5-2000, 5-2500, 5-3000, 5-4000, 5-5000, 5-6000, 10-100, 10-250, 10-500, 10-1000, 10-1500, 10-2000, 10-2500, 10-3000, 10-4000, 10-5000, 10-6000, 25-100, 25-250, 25-500, 25-1000, 25-1500, 25-2000, 25-2500, 25-3000, 25-4000, 25-5000, 25-6000, 50-100, 50-250, 50-500, 50-1000, 50-1500, 50-2000, 50-2500, 50-3000, 50-4000, 50-5000, 50-6000, 100-100, 100-250, 100-500, 100-1000, 100-1500, 100-2000, 100-2500, 100-3000, 100-4000, 125-4000, 100-5000, or 100-6000.

A poly alpha-1,6-glucan derivative as disclosed herein comprises:
  i) poly alpha-1,6-glucan substituted with at least one organic group linked to the poly alpha-1,6-glucan through a linkage moiety selected from —O—, —OSO$_2$—, —OCOO—, or —OCONH—/

;

ii) a weight average degree of polymerization of at least 5; and iii) a degree of substitution of about 0.001 to about 3.0; wherein the poly alpha-1,6-glucan comprises a backbone of glucose monomer units wherein greater than or equal to 40% of the glucose monomer units are linked via alpha-1,6-glycosidic linkages, and optionally at least 5% of the backbone glucose monomer units have branches via alpha-1,2- and/or alpha-1,3-glycosidic linkages.

The poly alpha-1,6-glucan derivative comprises poly alpha-1,6-glucan substituted with at least one organic group on the polysaccharide backbone and/or on one or more of the optional branches. When substitution occurs on a glucose monomer contained in the backbone, the polysaccharide is derivatized at the 2, 3, and/or 4 glucose carbon position(s) with an organic group as defined herein which is linked to the polysaccharide through a linkage moiety. When substitution occurs on a glucose monomer contained in a branch, the polysaccharide is derivatized at the 2, 3, 4, and/or 6 glucose carbon position(s) with an organic group as defined herein which is linked to the polysaccharide through a linkage moiety. The organic groups are independently linked to the poly alpha-1,6-glucan through a linkage moiety selected from —O— (ether), —OSO$_2$— (sulfonyl), —OCOO— (carbonate), or —OCONH—/

(also referred to as carbamoyl, carbamate, or urethane) in place of the hydroxyl group originally present in the underivatized (unsubstituted) poly alpha-1,6-glucan.

When the linkage moiety is —O—, a poly alpha-1,6-glucan derivative is termed a glucan "ether" compound herein by virtue of comprising the substructure —C$_G$—O—C$_R$—, wherein "—C$_G$—" represents a carbon of a glucose monomer unit of a poly alpha-1,6-glucan ether compound, and wherein "—C$_R$—" is comprised in the organic group. In one embodiment, the linkage moiety is —O— and the poly alpha-1,6-glucan derivative comprises a poly alpha-1,6-glucan ether compound. A poly alpha-1,6-glucan monoether compound contains the linkage moiety —O— and one type of organic group. A poly alpha-1,6-glucan mixed ether compound contains the linkage moiety —O— and two or more types of an organic group.

When the linkage moiety is —OSO$_2$—, a poly alpha-1,6-glucan derivative is termed a glucan "sulfonyl" or "sulfonate ester" compound herein by virtue of comprising the substructure —C$_G$—O—SO$_2$—C$_R$—, wherein "—C$_G$—" represents a carbon of a glucose monomer unit of a poly alpha-1,6-glucan sulfonyl compound, and wherein "—C$_R$—" is comprised in the organic group. In one embodiment, the linkage moiety is —OSO$_2$— and the poly alpha-1,6-glucan derivative comprises a poly alpha-1,6-glucan sulfonyl compound. A poly alpha-1,6-glucan monosulfonyl compound contains the linkage moiety —OSO$_2$— and one type of organic group. A poly alpha-1,6-glucan mixed sulfonyl compound contains the linkage moiety —OSO$_2$— and two or more types of an organic group. As a substituent on a derivatized polysaccharide, the sulfonyl moiety binds to the polysaccharide through a sulfur-oxygen bond and the sulfonyl group is not ionizable.

When the linkage moiety is —OCOO—, a poly alpha-1,6-glucan derivative is termed a glucan "carbonate" or "carbonate ester" compound herein by virtue of comprising the substructure —C$_G$—O—COO—C$_R$—, wherein "—C$_G$—" represents a carbon of a glucose monomer unit of a poly alpha-1,6-glucan carbonate compound, and wherein "—$C_R$—" is comprised in the organic group. In one embodiment, the linkage moiety is —OCOO— and the poly alpha-1,6-glucan derivative comprises a poly alpha-1,6-glucan carbonate compound. A poly alpha-1,6-glucan monocarbonate compound contains the linkage moiety —OCOO— and one type of an organic group. A poly alpha-1,6-glucan mixed carbonate compound contains the linkage moiety —OCOO— and two or more types of an organic group. As a substituent on a derivatized polysaccharide, the carbonate moiety binds to the polysaccharide through a carbon-oxygen bond and the carbonate group is not ionizable.

When linkage moiety is —OCONH— or

a poly alpha-1,6-glucan derivative is termed a glucan "carbamate" or "carbamoyl" compound herein by virtue of comprising the substructure —$C_G$—OCONH—$C_R$— or —$C_G$—OCON—$C_{R2}$—, wherein "—$C_G$—" represents a carbon of a glucose monomer unit of a poly alpha-1,6-glucan carbonate compound, and wherein "—$C_R$—" is comprised in the organic group. In one embodiment, the linkage moiety is —OCONH— and the poly alpha-1,6-glucan derivative comprises a poly alpha-1,6-glucan carbamate compound. A poly alpha-1,6-glucan monocarbamate compound contains the linkage moiety —OCONH— and one type of an organic group. A poly alpha-1,6-glucan mixed carbamate compound contains the linkage moiety —OCONH— and two or more types of organic group. In some of the foregoing aspects, the nitrogen atom of the carbamate/carbamoyl moiety is linked to a hydrogen atom and an organic group. In some aspects, however, the nitrogen atom of the carbamate/carbamoyl moiety is linked to two organic groups (as indicated by "—$C_{R2}$—" above), which can be the same (e.g., two methyl groups, two ethyl groups) or different (e.g., a methyl group and an ethyl group). Thus, all embodiments herein described in terms of having a —OCONH— linkage moiety can alternatively be described as having a carbamate/carbamoyl linkage moiety in which the nitrogen atom is linked to two organic groups

In one embodiment, at least one linkage moiety is —O— and at least one linkage moiety is —OSO$_2$—, and the poly alpha-1,6-glucan derivative comprises both ether and sulfonyl substituents. In another embodiment, at least one linkage moiety is —O— and at least one linkage moiety is —OCOO—, and the poly alpha-1,6-glucan derivative comprises both ether and carbonate substituents. In another embodiment, at least one linkage moiety is —O— and at least one linkage moiety is —OCONH—, and the poly alpha-1,6-glucan derivative comprises both ether and carbamate substituents. In another embodiment, at least one linkage moiety is —OSO$_2$— and at least one linkage moiety is —OCOO—, and the poly alpha-1,6-glucan derivative comprises both sulfonyl and carbonate substituents. In another embodiment, at least one linkage moiety is —OSO$_2$— and at least one linkage moiety is —OCONH—, and the poly alpha-1,6-glucan derivative comprises both sulfonyl and carbamate substituents. In another embodiment, at least one linkage moiety is —OCOO— and at least one linkage moiety is —OCONH—, and the poly alpha-1,6-glucan derivative comprises both carbonate and carbamate substituents.

Compositions disclosed herein can comprise, or consist essentially of, one or more poly alpha-1,6-glucan derivatives as disclosed herein. In one embodiment, a composition can comprise one poly alpha-1,6-glucan derivative. In another embodiment, a composition may comprise two or more poly alpha-1,6-glucan derivatives wherein the linkage moieties are the same and the organic groups are different, or two or more derivatives wherein the linkage moieties are different and the organic groups are the same. A composition may also comprise two or more derivatives wherein both the linkage moieties and the organic groups are different. For example, a composition can comprise at least one poly alpha-1,6-glucan ether compound and at least one poly alpha-1,6-glucan sulfonyl compound, or at least one poly alpha-1,6-glucan ether compound and at least one poly alpha-1,6-glucan carbonate compound, or at least one poly alpha-1,6-glucan ether compound and at least one poly alpha-1,6-glucan carbamate compound. Similarly, a composition can comprise at least one poly alpha-1,6-glucan sulfonyl compound and at least one poly alpha-1,6-glucan carbonate compound, or at least one poly alpha-1,6-glucan sulfonyl compound and at least one poly alpha-1,6-glucan carbamate compound. Alternatively, a composition can comprise at least one poly alpha-1,6-glucan carbonate compound and at least one poly alpha-1,6-glucan carbamate.

The term "degree of substitution" (DoS) as used herein refers to the average number of hydroxyl groups substituted in each monomeric unit (glucose) of a poly alpha-1,6-glucan derivative, which includes the monomeric units within the backbone and within any alpha-1,2 or alpha-1,3 branches which may be present. Since there are at most three hydroxyl groups in a glucose monomeric unit in a poly alpha-1,6-glucan polymer, the overall degree of substitution of a poly alpha-1,6-glucan derivative herein can be no higher than 3.0. It would be understood by those skilled in the art that, since a poly alpha-1,6-glucan derivative as disclosed herein can have a degree of substitution between about 0.001 to about 3.0, the substituents on the polysaccharide cannot only be hydroxyl. The degree of substitution of a poly alpha-1,6-glucan derivative can be stated with reference to a specific substituent or with reference to the overall degree of substitution, that is, the sum of the DoS of each different substituent for a glucan derivative as defined herein. As used herein, when the degree of substitution is not stated with reference to a specific substituent or substituent type, the overall degree of substitution of the poly alpha-1,6-glucan derivative is meant. The target DoS can be chosen to provide the desired solubility and performance of a composition comprising a poly alpha-1,6-glucan derivative in the specific application of interest.

The poly alpha-1,6-glucan derivatives as presently disclosed have a DoS with one or more linkage moieties herein in the range of about 0.001 to about 3.0, for example of about 0.01 to about 1.5, or for example of about 0.01 to about 0.6. In a further embodiment, the derivative has a degree of substitution of about 0.01 to about 0.2. Alternatively, the DoS can be about, at least about, or less than about, 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 0.2-3.0, 0.2-2.5, 0.2-2.0, 0.2-1.5, 0.2-1.4, 0.2-1.3, 0.2-1.2, 0.2-1.1, 0.2-1.0, 0.2-0.9, 0.2-0.8, 0.2-0.7, 0.2-0.6, 0.2-0.5, 0.2-0.4, 0.6-0.9, or any value between 0.001 and 3.0. The degree of substitution of a poly alpha-1,6-glucan derivative can be stated with reference to a specific substituent or with reference to the overall degree of substitution, that is, the sum of the DoS of each different substituent type for a glucan derivative as defined herein. As used herein, when the degree of substitution is not stated with reference to a specific substituent type, the overall degree of substitution of the poly alpha-1,6-glucan derivative is meant.

In one embodiment of a poly alpha-1,6-glucan derivative disclosed herein, at least one organic group comprises a $C_1$ to $C_{18}$ alkyl group, a hydroxy alkyl group, a carboxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of (—$CH_2CH_2O$—), (—$CH_2CH(CH_3)$O—), $CH(CH_3)CH(CH_3)O$—), and/or (—$CH_2CH(CH_2CH_3)O$—) or a mixture thereof, wherein the total number of repeat units is in the range of 2 to 100, or a combination thereof.

The term "alkyl group", as used herein, refers to linear, branched, or cyclic ("cycloalkyl" or "cycloaliphatic") hydrocarbon groups containing no unsaturation. The alkyl group can be substituted, for example with another alkyl group or with at least one hydroxyalkyl group or dihydroxy alkyl group. In one embodiment, the organic group is a $C_1$ to $C_{18}$ alkyl group, for example a $C_4$ to $C_{18}$ alkyl group, or for example a $C_1$ to $C_{10}$ alkyl group. The alkyl group may be, for example, a methyl, ethyl, propyl, butyl, pentyl, hexyl, heptyl, octyl, nonyl, decyl, undecyl, dodecyl, tridecanyl, tetradecanyl, pentadecanyl, hexadecanyl, heptadecanyl, or octadecanyl group. One or more carbons of an alkyl group can be substituted with another alkyl group, making the alkyl group branched. Examples of branched chain isomers of linear alkyl groups include isopropyl, iso-butyl, tert-butyl, sec-butyl, isopentyl, neopentyl, isohexyl, neohexyl, 2-ethylhexyl, 2-propylheptyl, and isooctyl. In one embodiment, the organic group is a methyl group. In one embodiment, the organic group is an ethyl group. In one embodiment, the organic group is a propyl group.

One or more carbons of an alkyl group can be substituted with at least one hydroxyalkyl group. Suitable hydroxyalkyl groups are hydroxymethyl (—$CH_2OH$), hydroxyethyl (e.g., —$CH_2CH_2OH$, —$CH(OH)CH_3$), hydroxypropyl (e.g., —$CH_2CH_2CH_2OH$, —$CH_2CH(OH)CH_3$, —$CH(OH)CH_2CH_3$), hydroxybutyl, and hydroxypentyl groups. Other examples include dihydroxy alkyl groups (diols) such as dihydroxymethyl, dihydroxyethyl, dihydroxypropyl, dihydroxybutyl and dihydroxypentyl. In another embodiment, the alkyl group is a cycloalkyl group, and the cycloalkyl group may be, for example, a cyclopentyl, cyclohexyl, cycloheptyl, cyclooctyl, cyclononyl, or cyclodecyl group. In one embodiment, the cycloalkyl group is a $C_5$ to $C_{10}$ cycloalkyl group. In one embodiment, the organic group is a hydroxy alkyl group.

A substitution on an alkyl group in certain embodiments may be bonded to the terminal carbon atom of the alkyl group, where the terminal carbon group is opposite the carbon atom that is linked to the ether, sulfonyl, carbonate, or carbamate moiety, which in turn is linked to an oxygen of the glucan polymer. An example of this terminal substitution is in the hydroxypropyl group —$CH_2CH_2CH_2OH$. Alternatively, a substitution may be on an internal carbon atom of an alkyl group. An example of an internal substitution is in the hydroxypropyl group —$CH_2CH(OH)CH_3$.

In another embodiment, one or more hydrogen atoms of the alkyl group are substituted with a carboxyl group, forming a substituted alkyl group referred to herein as a "carboxy alkyl" group. The organic group may be a carboxymethyl (—$CH_2COOH$), carboxyethyl (e.g., —$CH_2CH_2COOH$, —$CH(COOH)CH_3$), carboxypropyl (e.g., —$CH_2CH_2CH_2COOH$, —$CH_2CH(COOH)CH_3$, —$CH(COOH)CH_2CH_3$), carboxybutyl, or carboxypentyl group, for example. The carboxylic acid moiety can reside at any substitution site on an alkyl chain. In one embodiment, the organic group is a carboxy alkyl group.

Optionally, an alkyl group can contain one or more heteroatoms such as oxygen, sulfur, and/or nitrogen within the hydrocarbon chain. Examples include alkyl groups containing an alkyl glycerol alkoxylate moiety (-alkylene-$OCH_2CH(OH)CH_2OH$), a moiety derived from ring-opening of 2-ethylhexl glycidyl ether, and a tetrahydropyranyl group, for example as derived from dihydropyran.

In another embodiment, the organic group is a $C_2$ to $C_{18}$ alkenyl group, and the alkenyl group may be linear, branched, or cyclic. As used herein, the term "alkenyl group" refers to hydrocarbon groups containing at least one carbon-carbon double bond. Examples of alkenyl groups include ethenyl, propenyl, butenyl, pentenyl, hexenyl, cyclohexyl, and allyl groups. In other embodiments, one or more carbons of the alkenyl group can have substitution(s) with an alkyl group, or with a hydroxyalkyl or dihydroxy alkyl group. Examples of such substituent alkyl groups include methyl, ethyl, and propyl groups. In one embodiment, the alkenyl group is a $C_4$ to $C_{18}$ alkene group.

Optionally, an alkenyl group can contain one or more heteroatoms such as oxygen, sulfur, and/or nitrogen within the hydrocarbon chain, for example an alkenyl group can contain a moiety derived from ring-opening of an allyl glycidyl ether.

In another embodiment, the organic group is a $C_2$ to $C_{18}$ alkynyl group. As used herein, the term "alkynyl" refers to linear and branched hydrocarbon groups containing at least one carbon-carbon triple bond. The alkynyl group may be, for example, propyne, butyne, pentyne, or hexyne. The alkynyl group may be substituted, for example with alkyl, hydroxyalkyl, or dihydroxy alkyl groups. Optionally, an alkynyl group can contain one or more heteroatoms such as oxygen, sulfur, and/or nitrogen within the hydrocarbon chain.

In another embodiment, the organic group is a polyether comprising repeat units of (—$CH_2CH_2O$—), (—$CH_2CH(CH_3)O$—), or a mixture thereof, wherein the total number of repeat units is in the range of 2 to 100. In one embodiment, the organic group is a polyether group comprising (—$CH_2CH_2O$—)$_{4-100}$. In another embodiment, the organic group is a polyether group comprising (—$CH_2CH(CH_3)O$—)$_{4-100}$. As used herein, the subscript designating a range of values will be used to designate the potential number of repeat units, for example, $(CH_2CH_2O)_{2-100}$ means a polyether group containing in the range of from 2 to 100 repeat units. In some aspects, a polyether group herein can be capped such as with a methoxy, ethoxy, or propoxy group.

In another embodiment, the organic group is an aryl group. As used herein, the term "aryl" means an aromatic/carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl), which is optionally mono-, di-, or trisubstituted with alkyl groups, such as a methyl, ethyl, or propyl group. In one embodiment, the aryl group is a $C_6$ to $C_{20}$ aryl group. In another embodiment, the aryl group is a methyl substituted aryl group, for example a tolyl (—$C_6H_4CH_3$) or xylyl [—$C_6H_3(CH_3)_2$] group. In a further embodiment, the tolyl group is a p-tolyl group. In yet another embodiment, the aryl group is a benzyl group (—CH$_2$—C$_6$H$_5$). The benzyl group can optionally be further substituted with one or more of a halogen, a cyano, an ester, an amide, an ether group, a C$_1$ to C$_6$ alkyl group, an aryl group, a C$_2$ to C$_6$ alkene group, a C$_2$ to C$_6$ alkyne group, or a combination thereof. In an additional embodiment, the aryl group is a phenyl group.

In one embodiment, the poly alpha-1,6-glucan derivative has a DoS of about 0.001 to about 3.0, at least one linkage moiety is —O—, and at least one organic group is a methyl, ethyl, phenyl, benzyl, or p-tolyl group. In another embodiment, the poly alpha-1,6-glucan derivative has a DoS of about 0.01 to about 1.5, at least one linkage moiety is —O—, and at least one organic group is a methyl, ethyl, phenyl, benzyl, or p-tolyl group. In a further embodiment, the poly alpha-1,6-glucan derivative has a DoS of about 0.01 to about 0.6, at least one linkage moiety is —O—, and at least one organic group is a methyl, ethyl, phenyl, benzyl, or p-tolyl group. In yet another embodiment, the poly alpha-1,6-glucan derivative has a DoS of about 0.01 to about 0.2, at least one linkage moiety is —O—, and at least one organic group is a methyl, ethyl, phenyl, benzyl, or p-tolyl group. In another embodiment, the poly alpha-1,6-glucan derivative has a DoS with an organic group of about 0.001 to about 3.0 (e.g., 0.2-1.0, or 0.6-0.9), and at least one linkage moiety is —O—. In this and other embodiments having at least one —O— linkage (or at least one carbamate/carbamoyl, carbonate, or sulfonyl linkage), the poly alpha-1,6-glucan derivative can be substantially free from (or completely lack) hydrophilic substitution via such linkage, for example; instead, it can be substituted with mostly or only hydrophobic groups.

In one embodiment, the poly alpha-1,6-glucan derivative has a DoS of about 0.001 to about 3.0, at least one linkage moiety is —OSO$_2$—, and at least one organic group is a methyl, ethyl, phenyl, benzyl, or p-tolyl group. In another embodiment, the poly alpha-1,6-glucan derivative has a DoS of about 0.01 to about 1.5, at least one linkage moiety is —OSO$_2$—, and at least one organic group is a methyl, ethyl, phenyl, benzyl, or p-tolyl group. In a further embodiment, the poly alpha-1,6-glucan derivative has a DoS of about 0.01 to about 0.6, at least one linkage moiety is —OSO$_2$—, and at least one organic group is a methyl, ethyl, phenyl, benzyl, or p-tolyl group. In yet another embodiment, the poly alpha-1,6-glucan derivative has a DoS of about 0.01 to about 0.2, at least one linkage moiety is —OSO$_2$—, and at least one organic group is a methyl, ethyl, phenyl, benzyl, or p-tolyl group.

In one embodiment, the poly alpha-1,6-glucan derivative has a DoS of about 0.001 to about 3.0, at least one linkage moiety is —O— and at least one linkage moiety is —OSO$_2$—, and at least one organic group is a methyl, ethyl, phenyl, benzyl, or p-tolyl group. In another embodiment, the poly alpha-1,6-glucan derivative has a DoS of about 0.01 to about 1.5, at least one linkage moiety is —O— and at least one linkage moiety is —OSO$_2$—, and at least one organic group is a methyl, ethyl, phenyl, benzyl, or p-tolyl group. In a further embodiment, the poly alpha-1,6-glucan derivative has a DoS of about 0.01 to about 0.6, at least one linkage moiety is —O— and at least one linkage moiety is —OSO$_2$—, and at least one organic group is a methyl, ethyl, phenyl, benzyl, or p-tolyl group. In yet another embodiment, the poly alpha-1,6-glucan derivative has a DoS of about 0.01 to about 0.2, at least one linkage moiety is —O— and at least one linkage moiety is —OSO$_2$—, and at least one organic group is a methyl, ethyl, phenyl, benzyl, or p-tolyl group.

In one embodiment, the poly alpha-1,6-glucan derivative has a DoS of about 0.001 to about 3.0, at least one linkage moiety is —OCOO—, and at least one organic group is a methyl, ethyl, phenyl, benzyl, or p-tolyl group. In another embodiment, the poly alpha-1,6-glucan derivative has a DoS of about 0.01 to about 1.5, at least one linkage moiety is —OCOO—, and at least one organic group is a methyl, ethyl, phenyl, benzyl, or p-tolyl group. In a further embodiment, the poly alpha-1,6-glucan derivative has a DoS of about 0.01 to about 0.6, at least one linkage moiety is —OCOO—, and at least one organic group is a methyl, ethyl, phenyl, benzyl, or p-tolyl group. In yet another embodiment, the poly alpha-1,6-glucan derivative has a DoS of about 0.01 to about 0.2, at least one linkage moiety is —OCOO—, and at least one organic group is a methyl, ethyl, phenyl, benzyl, or p-tolyl group.

In one embodiment, the poly alpha-1,6-glucan derivative has a DoS of about 0.001 to about 3.0, at least one linkage moiety is —OCONH—, and at least one organic group is a methyl, ethyl, phenyl, benzyl, or p-tolyl group. In another embodiment, the poly alpha-1,6-glucan derivative has a DoS of about 0.01 to about 1.5, at least one linkage moiety is —OCONH—, and at least one organic group is a methyl, ethyl, phenyl, benzyl, or p-tolyl group. In a further embodiment, the poly alpha-1,6-glucan derivative has a DoS of about 0.01 to about 0.6, at least one linkage moiety is —OCONH—, and at least one organic group is a methyl, ethyl, phenyl, benzyl, or p-tolyl group. In yet another embodiment, the poly alpha-1,6-glucan derivative has a DoS of about 0.01 to about 0.2, at least one linkage moiety is —OCONH—, and at least one organic group is a methyl, ethyl, phenyl, benzyl, or p-tolyl group.

In one embodiment of a poly alpha-1,6-glucan derivative, the linkage moiety is —O—, the DoS is about 0.001 to about 3.0, and at least one organic group comprises a C$_1$ to C$_{18}$ alkyl group, a hydroxy alkyl group, a carboxy alkyl group, a C$_2$ to C$_{18}$ alkenyl group, a C$_2$ to C$_{18}$ alkynyl group, a benzyl group, a C$_6$ to C$_{20}$ aryl group, a polyether comprising repeat units of (—CH$_2$CH$_2$O—) and/or (—CH$_2$CH(CH$_3$)O—) wherein the total number of repeat units is in the range of 2 to 100, or a combination thereof. In another embodiment, the linkage moiety is —O—, the DoS is about 0.001 to about 3.0, and at least one organic group comprises a C$_1$-C$_{10}$ alkyl group, a C$_1$-C$_{10}$ hydroxyl alkyl group, a polyether comprising repeat units of (—CH$_2$CH$_2$O—) and/or (—CH$_2$CH(CH$_3$)O—) wherein the total number of repeat units is in the range of 2 to 100, or a combination thereof. In an additional embodiment, the linkage moiety is —O—, the DoS is about 0.001 to about 3.0, and at least one organic group comprises a benzyl group or a benzyl group substituted with one or more of a halogen, a cyano, an ester, an amide, an ether group, a C$_1$ to C$_6$ alkyl group, an aryl group, a C$_2$ to C$_6$ alkene group, a C$_2$ to C$_6$ alkyne group, or a combination thereof. In a further embodiment, the linkage moiety is —O—, the DoS is about 0.001 to about 3.0, and at least one organic group comprises a C$_1$-C$_{10}$ alkyl group, C$_1$-C$_{10}$ hydroxyl alkyl group, a polyether comprising repeat units of (—CH$_2$CH$_2$O—) and/or (—CH$_2$CH(CH$_3$)O—) wherein the total number of repeat units is in the range of 2 to 100, a benzyl group, or a combination thereof. In yet another embodiment, the linkage moiety is —O—, the DoS is about 0.001 to about 3.0, and at least one organic group comprises a C$_6$-C$_{20}$ aryl group, optionally substituted with alkyl groups.

In one embodiment of a poly alpha-1,6-glucan derivative, the linkage moiety is —OSO$_2$—, the DoS is about 0.001 to about 3.0, and at least one organic group comprises a C$_1$ to $C_{18}$ alkyl group, a hydroxy alkyl group, a carboxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of (—$CH_2CH_2O$—) and/or (—$CH_2CH(CH_3)O$—) wherein the total number of repeat units is in the range of 2 to 100, or a combination thereof. In another embodiment, the linkage moiety is —$OSO_2$—, the DoS is about 0.001 to about 3.0, and at least one organic group comprises a $C_1$-$C_{10}$ alkyl group, a $C_1$-$C_{10}$ hydroxyl alkyl group, a polyether comprising repeat units of (—$CH_2CH_2O$—) and/or (—$CH_2CH(CH_3)O$—) wherein the total number of repeat units is in the range of 2 to 100, or a combination thereof. In an additional embodiment, the linkage moiety is —$OSO_2$—, the DoS is about 0.001 to about 3.0, and at least one organic group comprises a benzyl group or a benzyl group substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or a combination thereof. In a further embodiment, the linkage moiety is —$OSO_2$—, the DoS is about 0.001 to about 3.0, and at least one organic group comprises a $C_1$-$C_{10}$ alkyl group, $C_1$-$C_{10}$ hydroxyl alkyl group, a polyether comprising repeat units of (—$CH_2CH_2O$—) and/or (—$CH_2CH(CH_3)O$—) wherein the total number of repeat units is in the range of 2 to 100, a benzyl group, or a combination thereof. In yet another embodiment, the linkage moiety is —$OSO_2$—, the DoS is about 0.001 to about 3.0, and at least one organic group comprises a $C_6$-$C_{20}$ aryl group, optionally substituted with alkyl groups.

In one embodiment of a poly alpha-1,6-glucan derivative, the linkage moiety is —OCOO—, the DoS is about 0.001 to about 3.0, and at least one organic group comprises a $C_1$ to $C_{18}$ alkyl group, a hydroxy alkyl group, a carboxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of (—$CH_2CH_2O$—) and/or (—$CH_2CH(CH_3)O$—) wherein the total number of repeat units is in the range of 2 to 100, or a combination thereof. In another embodiment, the linkage moiety is —OCOO—, the DoS is about 0.001 to about 3.0, and at least one organic group comprises a $C_1$-$C_{10}$ alkyl group, a $C_1$-$C_{10}$ hydroxyl alkyl group, a polyether comprising repeat units of (—$CH_2CH_2O$—) and/or (—$CH_2CH(CH_3)O$—) wherein the total number of repeat units is in the range of 2 to 100, or a combination thereof. In an additional embodiment, the linkage moiety is —OCOO—, the DoS is about 0.001 to about 3.0, and at least one organic group comprises a benzyl group or a benzyl group substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or a combination thereof. In a further embodiment, the linkage moiety is —OCOO—, the DoS is about 0.001 to about 3.0, and at least one organic group comprises a $C_1$-$C_{10}$ alkyl group, $C_1$-$C_{10}$ hydroxyl alkyl group, a polyether comprising repeat units of (—$CH_2CH_2O$—) and/or (—$CH_2CH(CH_3)O$—) wherein the total number of repeat units is in the range of 2 to 100, a benzyl group, or a combination thereof. In yet another embodiment, the linkage moiety is —OCOO—, the DoS is about 0.001 to about 3.0, and at least one organic group comprises a $C_6$-$C_{20}$ aryl group, optionally substituted with alkyl groups.

In one embodiment of a poly alpha-1,6-glucan derivative, the linkage moiety is —OCONH—, the DoS is about 0.001 to about 3.0, and at least one organic group comprises a $C_1$ to $C_{18}$ alkyl group, a hydroxy alkyl group, a carboxy alkyl group, a $C_2$ to $C_{18}$ alkenyl group, a $C_2$ to $C_{18}$ alkynyl group, a benzyl group, a $C_6$ to $C_{20}$ aryl group, a polyether comprising repeat units of (—$CH_2CH_2O$—) and/or (—$CH_2CH(CH_3)O$—) wherein the total number of repeat units is in the range of 2 to 100, or a combination thereof. In another embodiment, the linkage moiety is —OCONH—, the DoS is about 0.001 to about 3.0, and at least one organic group comprises a $C_1$-$C_{10}$ alkyl group, a $C_1$-$C_{10}$ hydroxyl alkyl group, a polyether comprising repeat units of (—$CH_2CH_2O$—) and/or (—$CH_2CH(CH_3)O$—) wherein the total number of repeat units is in the range of 2 to 100, or a combination thereof. In an additional embodiment, the linkage moiety is —OCONH—, the DoS is about 0.001 to about 3.0, and at least one organic group comprises a benzyl group or a benzyl group substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or a combination thereof. In a further embodiment, the linkage moiety is —OCONH—, the DoS is about 0.001 to about 3.0, and at least one organic group comprises a $C_1$-$C_{10}$ alkyl group, $C_1$-$C_{10}$ hydroxyl alkyl group, a polyether comprising repeat units of (—$CH_2CH_2O$—) and/or (—$CH_2CH(CH_3)O$—) wherein the total number of repeat units is in the range of 2 to 100, a benzyl group, or a combination thereof. In yet another embodiment, the linkage moiety is —OCONH—, the DoS is about 0.001 to about 3.0, and at least one organic group comprises a $C_6$-$C_{20}$ aryl group, optionally substituted with alkyl groups.

Poly alpha-1,6-glucan may be derivatized to an ether compound by contacting the polysaccharide with at least one etherification agent comprising the desired organic group under alkaline conditions. This step can be performed, for example, by first preparing alkaline conditions by contacting the polysaccharide with a solvent and one or more alkali hydroxides to provide a solution or mixture. The alkaline conditions of the reaction can thus comprise an alkali hydroxide solution. The pH of the alkaline conditions can be about, or at least about, 11.0, 11.2, 11.4, 11.6, 11.8, 12.0, 12.2, 12.4, 12.6, 12.8, or 13.0.

Useful etherification agents may include, for example, dialkyl sulfates, dialkyl carbonates, alkyl halides (e.g., alkyl chloride), iodoalkanes, alkyl triflates (alkyl trifluoromethanesulfonates), alkyl fluorosulfonates, 1,2-epoxyalkyls, and epoxides. Thus, examples of etherification agents for producing methyl poly alpha-1,6-glucan ethers include dimethyl sulfate, dimethyl carbonate, methyl chloride, iodomethane, methyl triflate, methyl fluorosulfonate. Examples of etherification agents for producing ethyl poly alpha-1,6-glucan ethers include diethyl sulfate, diethyl carbonate, ethyl chloride, iodoethane, ethyl triflate and ethyl fluorosulfonate. Examples of etherification agents for producing propyl poly alpha-1,6-glucan ethers include dipropyl sulfate, dipropyl carbonate, propyl chloride, iodopropane, propyl triflate and propyl fluorosulfonate. Examples of etherification agents for producing butyl poly alpha-1,6-glucan ethers include dibutyl sulfate, dibutyl carbonate, butyl chloride, iodobutane, butyl triflate, and 1,2-epoxybutane. Examples of etherification agents for producing benzyl poly alpha-1,6-glucan ethers include benzyl chloride and benzyl bromide.

Poly alpha-1,6-glucan ethers in which an organic group is a polyether (which is an example of a hydrophobic group herein) comprising repeat units of (—$CH_2CH_2O$—), (—$CH_2CH(CH_3)O$—), (—$CH(CH_3)CH(CH_3)O$—), (—$CH_2CH(CH_2CH_3)O$—), or a mixture thereof, may also be obtained by contacting the glucan with an epoxide, for example, ethylene oxide, propylene oxide, 1,2-butylene oxide, 2,3-butylene oxide, or a mixture thereof, in the presence of a base. The hydroxyl group may undergo further reaction with an epoxide, producing a polyether having two or more ether repeat units. Depending on the molar amounts of the epoxide and the poly alpha-1,6-glucan, one or more of the hydroxyl groups of the glucan can be monoalkoxylated or polyalkoxylated.

Etherification agents suitable for preparing a dihydroxyalkyl poly alpha-1,6-glucan ether compound include dihydroxyalkyl halides (e.g., dihydroxyalkyl chloride) such as dihydroxyethyl halide, dihydroxypropyl halide (e.g., 2,3-dihydroxypropyl chloride [i.e., 3-chloro-1,2-propanediol]), or dihydroxybutyl halide, for example. 2,3-Dihydroxypropyl chloride can be used to prepare dihydroxypropyl poly alpha-1,6-glucan, for example.

When producing a poly alpha-1,6-glucan ether compound with two or more different organic groups, two or more different etherification agents would be used, accordingly. For example, both an alkylene oxide and an alkyl chloride could be used as etherification agents to produce an alkyl hydroxyalkyl poly alpha-1,6-glucan ether. Any of the etherification agents disclosed herein may therefore be combined to produce poly glucan ether compounds with two or more different organic groups. Such two or more etherification agents may be used in the reaction at the same time, or may be used sequentially in the reaction. When used sequentially, any of the temperature-treatment (e.g., heating) steps disclosed below may optionally be used between each addition. One may choose sequential introduction of etherification agents in order to control the desired DoS of each organic group. In general, a particular etherification agent would be used first if the organic group it forms in the ether product is desired at a higher DoS compared to the DoS of another organic group to be added.

The amount of etherification agent to be contacted with poly alpha-1,6-glucan in a reaction under alkaline conditions can be determined based on the degree of substitution required in the ether compound being produced. The amount of ether substitution groups on each monomeric unit in poly alpha-1,6-glucan ether compounds produced herein can be determined using nuclear magnetic resonance (NMR) spectroscopy. The molar substitution (MS) value for poly alpha-1,6-glucan has no upper limit. In general, an etherification agent can be used in a quantity of at least about 0.05 mole per mole of poly glucan. There is no upper limit to the quantity of etherification agent that can be used.

Reactions for producing poly alpha-1,6-glucan ether compounds herein can optionally be carried out in a pressure vessel such as a Parr reactor, an autoclave, a shaker tube or any other pressure vessel well known in the art. A shaker tube may be used to perform the reaction in certain embodiments.

A reaction herein can optionally be heated following the step of contacting the poly glucan with an etherification agent under alkaline conditions. The reaction temperatures and time of applying such temperatures can be varied within wide limits. For example, a reaction can optionally be maintained at ambient temperature for up to 14 days. Alternatively, a reaction can be heated, with or without reflux, between about 25° C. to about 200° C. (or any integer between 25 and 200° C.). Reaction time can be varied correspondingly: more time at a low temperature and less time at a high temperature.

In certain embodiments of producing carboxymethyl poly alpha-1,6-glucan, a reaction can be heated to about 55° C. for about 3 hours. Thus, a reaction for preparing a carboxyalkyl poly-glucan herein can be heated to about 50° C. to about 60° C. (or any integer between 50 and 60° C.) for about 2 hours to about 5 hours, for example.

Optionally, a reaction herein can be maintained under an inert gas, with or without heating. As used herein, the term "inert gas" refers to a gas which does not undergo chemical reactions under a set of given conditions, such as those disclosed for preparing a reaction herein.

All of the components of the reactions disclosed herein can be mixed together at the same time and brought to the desired reaction temperature, whereupon the temperature is maintained with or without stirring until the desired poly glucan ether compound is formed. Alternatively, the mixed components can be left at ambient temperature as described above.

Following etherification, the pH of a reaction can be neutralized. Neutralization of a reaction can be performed using one or more acids. The term "neutral pH" as used herein, refers to a pH that is neither substantially acidic or basic (e.g., a pH of about 6-8, or about 6.0, 6.2, 6.4, 6.6, 6.8, 7.0, 7.2, 7.4, 7.6, 7.8, or 8.0). Various acids that can be used for this purpose include, but are not limited to, sulfuric, acetic, hydrochloric, nitric, any mineral (inorganic) acid, any organic acid, or any combination of these acids.

A poly alpha-1,6-glucan derivative produced in a reaction as disclosed herein can optionally be washed one or more times with a liquid that does not readily dissolve the compound. For example, a poly alpha-1,6-glucan ether can be washed with water, alcohol, acetone, aromatics, or any combination of these, depending on the solubility of the ether compound therein (where lack of solubility is desirable for washing). In general, a solvent comprising an organic solvent such as alcohol is preferred for the washing. A poly glucan ether product can be washed one or more times with an aqueous solution containing methanol or ethanol, for example. For example, 70-95 wt % ethanol can be used to wash the product. A poly glucan ether product can be washed with a methanol:acetone (e.g., 60:40) solution in another embodiment. Hot water (about 95-100° C.) can be used in certain embodiments, such as for washing alkyl poly alpha-1,6-glucan ethers (e.g., ethyl poly alpha-1,6-glucan) and alkyl hydroxyalkyl poly alpha-1,6-glucan ethers (e.g., ethyl hydroxyethyl poly alpha-1,6-glucan).

The poly alpha-1,6-glucan can also be modified with one or more benzyl groups. The poly glucan can be benzylated by deprotonating one or more of the hydroxyl groups using a base, for example, sodium hydroxide, potassium hydroxide, sodium alkoxide, potassium alkoxide, sodium hydride followed by treatment with a benzylating agent, for example, a benzyl halide. The benzyl group of the benzylating agent can optionally substituted by one or more of halogen, a cyano, an ester, an amide, an ether group, a $C_1$ to $C_6$ alkyl group, an aryl group, a $C_2$ to $C_6$ alkene group, a $C_2$ to $C_6$ alkyne group, or a combination thereof. In some embodiments, the benzylating agent can be as represented by the following structure:

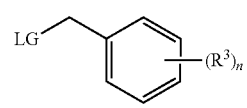

wherein LG is a leaving group, for example, chloride, bromide, iodide; $R^3$ is halogen, cyano, ester, amide, ether, $C_1$ to $C_6$ alkyl, aryl, $C_2$ to $C_6$ alkene, $C_2$ to $C_6$ alkyne; and n is 1, 2, 3, 4 or 5. Halogen can be fluoride, chloride, bromide or iodide. The ester can be benzyl-C(O)O—$R^1$, or the ester can be benzyl-OC(O)—$R^1$, wherein the $R^1$ group is a $C_1$ to $C_6$ alkyl or an aryl group. The ether can be a $C_1$ to $C_6$ alkyl ether or an aryl ether. The amide can be benzyl-C(O)N(R$^2$)$_2$ or benzyl-N(R$^2$)(O)C—, wherein each R$^2$ is independently hydrogen or C$_1$ to C$_6$ alkyl. In each of the above examples, the term 'benzyl' refers to the benzylating agent.

Deprotonation can take place in the presence of a base and an aqueous solvent, a base and an organic solvent, or a base and a mixture of an aqueous and organic solvent. Suitable organic solvents can include, for example, dimethyl sulfoxide, dimethyl acetamide, dimethyl formamide, pyridine, 1-methyl-2-pyrrolidinone or a combination thereof. In some embodiments, the poly glucan can be added to a mixture of the base and the solvent. Optionally, the mixture can be heated. The benzylating agent, for example, benzyl chloride, can then be added. In an aqueous system, as the degree of benzylation increases, the benzyl poly glucan precipitates from the solution, and can be removed by filtration. By utilizing organic solvents, or varying the temperature or concentration, the degree of substitution can be increased above 0.4. The benzyl poly glucan can be isolated using known techniques.

Any of the above etherification reactions can be repeated using a poly alpha-1,6-glucan ether as the starting material for further modification. This approach may be suitable for increasing the DoS of an organic group, and/or adding one or more different organic groups or a sulfonyl group to the ether compound. For example, a benzyl poly alpha-1,6-glucan ether product can be used as a substrate for further modification with carboxymethyl groups. A poly alpha-1,6-glucan methyl ether can be used as a substrate for further modification with a benzyl ether group.

Poly alpha-1,6-glucan can be derivatized to a glucan sulfonyl compound by contacting the polysaccharide with a sulfonyl halide in aqueous solution in the presence of a base.

Poly alpha-1,6-glucan can be derivatized to a glucan carbonate compound by reacting the polysaccharide with a chloroformate comprising the desired organic group. For example, the polysaccharide can be modified by dissolving or suspending with a solvent, add an organic base, and then adding the chloroformate reagent and stir for specified time. An aprotic solvent such as DMSO, DMF, or DMAc can be used. The polysaccharide to solvent weight ratio can range from 5:1 to 30:1, for example 10:1 to 20:1. The polysaccharide may be dissolved by heating in the aprotic solvent for 80-120 C for 30 min to 2 hours. The polysaccharide solution or suspension is then cooled to room temperature and a base is added. The organic base may be selected, for example, from pyridine, triethylamine, 4-dimethylaminopyridine. The chloroformate reagent may be added at 0 to 25 C. The molar ratio of monoisocyanate to polysaccharide can range from 0.1:1 to 10:1, depending on the desired final degree of substitution. After the addition of the monoisocyanate, the mixture can be held at temperature for 0.1 to 24 hours, for example 0.5 to 4 hours. The derivatized polysaccharide can be precipitated by pouring the reactor contents into agitated water, methanol, isopropanol, ethanol, acetone, or mixtures thereof in a volume to weight ratio of 2-8 liters to 1 kilogram, for example at a volume to weight ratio of 4. The precipitated polysaccharide derivative can be filtered and dried.

Poly alpha-1,6-glucan can be derivatized to a glucan carbamate compound by contacting the polysaccharide with a monoisocyanate comprising the desired organic group. For example, the polysaccharide can be modified by first dissolving or suspending the polysaccharide with a solvent and then adding the monoisocyanate and heating the mixture to 30-100° C. for a period of time. An aprotic solvent such as DMSO, DMF, or DMAc can be used. The polysaccharide to solvent weight ratio can range from 5:1 to 30:1, for example 10:1 to 20:1. The monoisocyanate can be added at a temperature in the range of 25° C. up to the boiling temperature of the system, for example at a temperature in the range of 40 to 80° C. The molar ratio of monoisocyanate to polysaccharide can range from 0.1:1 to 4.0:1, depending on the desired final degree of substitution. After the addition of the monoisocyanate, the mixture can be held at temperature for 0.1 to 24 hours, for example 0.5 to 4 hours. The derivatized polysaccharide can be precipitated by pouring the reactor contents into agitated water, methanol, isopropanol, ethanol, acetone, or mixtures thereof in a volume to weight ratio of 2-8 liters to 1 kilogram, for example at a volume to weight ratio of 4. The precipitated polysaccharide derivative can be filtered, washed with solvents to remove impurities, and dried.

In one embodiment, the poly alpha-1,6-glucan derivative contains at least one carbamate substituent derived from an aliphatic, cycloaliphatic, or aromatic monoisocyanate. At least one carbamate substituent of the polysaccharide derivative can be derived from an aromatic monoisocyanate, for example phenyl, benzyl, diphenyl methyl, or diphenyl ethyl isocyanate, wherein the organic group corresponds to phenyl, benzyl, diphenyl methyl, or diphenyl ethyl, respectively. In one embodiment, at least one carbamate substituent is a phenyl carbamate group, wherein the organic group is phenyl. In another embodiment, at least one carbamate substituent of the polysaccharide derivative can be derived from an aliphatic monoisocyanate, for example ethyl, propyl, butyl, tert-butyl, pentyl, hexyl, heptyl, octyl, nonyl, decyl, undecyl, or octadecyl isocyanate, wherein the organic group corresponds to an ethyl, propyl, butyl, tert-butyl, pentyl, hexyl, heptyl, octyl, nonyl, decyl, undecyl, or octadecyl group, respectively. In a further embodiment, at least one carbamate substituent of the polysaccharide derivative can be derived from a cycloaliphatic monoisocyanate, for example cyclohexyl, cycloheptyl, or cyclododecyl isocyanate, wherein the organic group corresponds to a cyclohexyl, cycloheptyl, or cyclododecyl group, respectively. Useful monoisocyanates are commercially available.

Depending upon the desired application, compositions comprising a poly alpha-1,6-glucan derivative as disclosed herein can be formulated, for example, blended, mixed, or incorporated into, with one or more other materials and/or active ingredients suitable for use in various compositions, for example compositions for use in laundry care, textile/fabric care, and/or personal care products. The term "compositions comprising a poly alpha-1,6-glucan derivative" in this context may include, for example, aqueous formulations, rheology modifying compositions, fabric treatment/care compositions, laundry care formulations/compositions, fabric softeners or personal care compositions (hair, skin and oral care), each comprising a poly alpha-1,6-glucan derivative as disclosed herein.

As used herein, the term "effective amount" refers to the amount of the substance used or administered that is suitable to achieve the desired effect. The effective amount of material may vary depending upon the application. One of skill in the art will typically be able to determine an effective amount for a particular application or subject without undo experimentation.

The term "resistance to enzymatic hydrolysis" refers to the relative stability of the poly alpha-1,6-glucan derivative to enzymatic hydrolysis. Having a resistance to hydrolysis is important for the use of these materials in applications wherein enzymes are present, such as in detergent, fabric care, and/or laundry care applications. In some embodiments, the polysaccharide derivative is resistant to cellulases. In other embodiments, the polysaccharide derivative is resistant to proteases. In still further embodiments, the polysaccharide derivative is resistant to amylases. In yet other embodiments, the polysaccharide derivative is resistant to lipase. In yet other embodiments, the polysaccharide derivative is resistant to mannanases. In other embodiments, the polysaccharide derivative is resistant to multiple classes of enzymes, for example, two or more cellulases, proteases, amylases, lipases, mannanases, or combinations thereof. Resistance to any particular enzyme will be defined as having at least 10, 20, 30, 40, 50, 60, 70, 80, 90, 95 or 100% of the materials remaining after treatment with the respective enzyme. The percentage remaining may be determined by measuring the supernatant after enzyme treatment using SEC-HPLC. The assay to measure enzyme resistance can be determined using the following procedure: A sample of the poly alpha-1,6-glucan derivative is added to water in a vial and mixed using a PTFE magnetic stir bar to create a 1 percent by weight aqueous solution. The aqueous mixture is produced at pH 7.0 and 20° C. After the poly alpha-1,6-glucan derivative thereof has completely dissolved, 1.0 milliliter (mL) (1 percent by weight of the enzyme formulation) of cellulase (PURADEX® EGL), amylase (PURASTAR® ST L) protease (SAVINASE® 16.0 L), or lipase (Lipex® 100 L) is added and mixed for 72 hours (hrs) at 20° C. After 72 hrs of stirring, the reaction mixture is heated to 70° C. for 10 minutes to inactivate the added enzyme, and the resulting mixture is cooled to room temperature and centrifuged to remove any precipitate. The supernatant is analyzed by SEC-HPLC for recovered poly alpha-1,6-glucan derivative and compared to a control where no enzyme was added to the reaction mixture. Percent changes in area counts for the respective poly alpha-1,6-glucan derivative thereof may be used to test the relative resistance of the materials to the respective enzyme treatment. Percent changes in area versus the total will be used to assess the relative amount of materials remaining after treatment with a particular enzyme. Materials having a percent recovery of at least 10%, preferably at least 50, 60, 70, 80, 90, 95 or 100% will be considered "resistant" to the respective enzyme treatment.

The phrase "aqueous composition" herein refers to a solution or mixture in which the solvent is at least about 1% by weight of water and which comprises the poly alpha-1,6-glucan derivative.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of the poly alpha-1,6-glucan derivative in water or aqueous solution.

The term "aqueous solution" herein refers to a solution in which the solvent is water. The poly alpha-1,6-glucan derivative can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles, for example, any ingredient of a personal care product, pharmaceutical product, food product, household product or industrial product that are scattered, or uniformly distributed, throughout the aqueous composition. It is believed that the poly alpha-1,6-glucan derivative can act as dispersants in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cps) and Pascal-second (Pa-s). A centipoise is one one-hundredth of a poise; one poise is equal to $0.100$ kg·m$^{-1}$·s$^{-1}$. Thus, the terms "viscosity modifier" and "viscosity-modifying agent" as used herein refer to anything that can alter/modify the viscosity of a fluid or aqueous composition.

The terms "fabric", "textile", and "cloth" are used interchangeably herein to refer to a woven or non-woven material having a network of natural and/or artificial fibers. Such fibers can be thread or yarn, for example.

A "fabric care composition" herein is any composition suitable for treating fabric in some manner. Suitable examples of such a composition include non-laundering fiber treatments (for desizing, scouring, mercerizing, bleaching, coloration, dying, printing, bio-polishing, anti-microbial treatments, anti-wrinkle treatments, stain resistance treatments, etc.), laundry care compositions (e.g., laundry care detergents), and fabric softeners.

The terms "detergent composition", "heavy duty detergent" and "all-purpose detergent" are used interchangeably herein to refer to a composition useful for regular washing of a substrate, for example, dishware, cutlery, vehicles, fabrics, carpets, apparel, white and colored textiles at any temperature. Detergent compositions for treating of fabrics, hard surfaces and any other surfaces in the area of fabric and home care, include: laundry detergents, fabric conditioners (including softeners), laundry and rinse additives and care compositions, fabric freshening compositions, laundry prewash, laundry pretreat, hard surface treatment compositions, car care compositions, dishwashing compositions (including hand dishwashing and automatic dishwashing products), air care products, detergent contained on or in a porous substrate or nonwoven sheet, and other cleaner products for consumer or institutional use The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In some embodiments, the fabric hand may be measured using a PHABROMETER® System (available from Nu Cybertek, Inc. Davis, California) for measuring the relative hand value as given by the American Association of Textile Chemists and Colorists (AATCC test method "202-2012, Relative Hand Value of Textiles: Instrumental Method").

The composition can be in the form of a liquid, a gel, a powder, a hydrocolloid, an aqueous solution, a granule, a tablet, a capsule, a bead or pastille, a single compartment sachet, a multi-compartment sachet, a single compartment pouch, or a multi-compartment pouch. In some embodiments, the composition is in the form of a liquid, a gel, a powder, a single compartment sachet, or a multi-compartment sachet.

In some embodiments, compositions comprising a poly alpha-1,6-glucan derivative as disclosed herein can be in the form of a fabric care composition. A fabric care composition can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition. In other embodiments, a fabric care composition can be in a dry form such as a granular detergent or dryer-added fabric softener sheet. Other non-limiting examples of fabric care compositions can include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists; water-soluble unit dose articles.

In some embodiments, compositions comprising the poly alpha-1,6-glucan derivative can be in the form of a personal care product. Personal care products include, but are not limited to, hair care compositions, skin care compositions, sun care compositions, body cleanser compositions, oral care compositions, wipes, beauty care compositions, cosmetic compositions, antifungal compositions, and antibacterial compositions. The personal care products can include cleansing, cleaning, protecting, depositing, moisturizing, conditioning, occlusive barrier, and emollient compositions.

As used herein, "personal care products" also includes products used in the cleaning, bleaching and/or disinfecting of hair, skin, scalp, and teeth, including, but not limited to shampoos, body lotions, shower gels, topical moisturizers, toothpaste, toothgels, mouthwashes, mouth rinses, antiplaque rinses, and/or other topical cleansers. In some embodiments, these products are utilized on humans, while in other embodiments, these products find use with non-human animals (e.g., in veterinary applications). In one aspect, "personal care products" includes hair care products. The hair care product can be in the form of a powder, paste, gel, liquid, oil, ointment, spray, foam, tablet, a hair shampoo, a hair conditioner rinse or any combination thereof.

The product formulation comprising the poly alpha-1,6-glucan derivative described herein may be optionally diluted with water, or a solution predominantly comprised of water, to produce a formulation with the desired poly alpha-1,6-glucan derivative concentration for the target application. Clearly one of skill in the art can adjust the reaction components and/or dilution amounts to achieve the desired poly alpha-1,6-glucan derivative concentration for the chosen personal care product.

The personal care compositions described herein may further comprise one or more dermatologically or cosmetically acceptable components known or otherwise effective for use in hair care or other personal care products, provided that the optional components are physically and chemically compatible with the essential components described herein, or do not otherwise unduly impair product stability, aesthetics, or performance. Non-limiting examples of such optional components are disclosed in *International Cosmetic Ingredient Dictionary*, Ninth Edition, 2002, and CTFA Cosmetic Ingredient Handbook, Tenth Edition, 2004.

In one embodiment, the dermatologically acceptable carrier may comprise from about 10 wt % to about 99.9 wt %, alternatively from about 50 wt % to about 95 wt %, and alternatively from about 75 wt % to about 95 wt %, of a dermatologically acceptable carrier. Carriers suitable for use with the composition(s) may include, for example, those used in the formulation of hair sprays, mousses, tonics, gels, skin moisturizers, lotions, and leave-on conditioners. The carrier may comprise water; organic oils; silicones such as volatile silicones, amino or non-amino silicone gums or oils, and mixtures thereof; mineral oils; plant oils such as olive oil, castor oil, rapeseed oil, coconut oil, wheatgerm oil, sweet almond oil, avocado oil, macadamia oil, apricot oil, safflower oil, candlenut oil, false flax oil, tamanu oil, lemon oil and mixtures thereof; waxes; and organic compounds such as $C_2$-$C_{10}$ alkanes, acetone, methyl ethyl ketone, volatile organic $C_1$-$C_{12}$ alcohols, esters (with the understanding that the choice of ester(s) may be dependent on whether or not it may act as a carboxylic acid ester substrates for the perhydrolases) of $C_1$-$C_{20}$ acids and of $C_1$-$C_8$ alcohols such as methyl acetate, butyl acetate, ethyl acetate, and isopropyl myristate, dimethoxyethane, diethoxyethane, $C_{10}$-$C_{30}$ fatty alcohols such as lauryl alcohol, cetyl alcohol, stearyl alcohol, and behenyl alcohol; $C_{10}$-$C_{30}$ fatty acids such as lauric acid and stearic acid; $C_{10}$-$C_{30}$ fatty amides such as lauric diethanolamide; $C_{10}$-$C_{30}$ fatty alkyl esters such as $C_{10}$-$C_{30}$ fatty alkyl benzoates; hydroxypropylcellulose, and mixtures thereof. In one embodiment, the carrier comprises water, fatty alcohols, volatile organic alcohols, and mixtures thereof.

The composition(s) disclosed herein further may comprise from about 0.1% to about 10%, and alternatively from about 0.2% to about 5.0%, of a gelling agent to help provide the desired viscosity to the composition(s). Non-limiting examples of suitable optional gelling agents include crosslinked carboxylic acid polymers; unneutralized crosslinked carboxylic acid polymers; unneutralized modified crosslinked carboxylic acid polymers; crosslinked ethylene/maleic anhydride copolymers; unneutralized crosslinked ethylene/maleic anhydride copolymers (e.g., EMA 81 commercially available from Monsanto); unneutralized crosslinked alkyl ether/acrylate copolymers (e.g., SALCARE™ SC90 commercially available from Allied Colloids); unneutralized crosslinked copolymers of sodium polyacrylate, mineral oil, and PEG-1 trideceth-6 (e.g., SALCARE™ SC91 commercially available from Allied Colloids); unneutralized crosslinked copolymers of methyl vinyl ether and maleic anhydride (e.g., STABILEZE™ QM-PVM/MA copolymer commercially available from International Specialty Products); hydrophobically modified nonionic cellulose polymers; hydrophobically modified ethoxylate urethane polymers (e.g., UCARE™ Polyphobe Series of alkali swellable polymers commercially available from Union Carbide); and combinations thereof. In this context, the term "unneutralized" means that the optional polymer and copolymer gelling agent materials contain unneutralized acid monomers. Preferred gelling agents include water-soluble unneutralized crosslinked ethylene/maleic anhydride copolymers, water-soluble unneutralized crosslinked carboxylic acid polymers, water-soluble hydrophobically modified nonionic cellulose polymers and surfactant/fatty alcohol gel networks such as those suitable for use in hair conditioning products.

The poly alpha-1,6-glucan derivatives described herein may be incorporated into hair care compositions and products, such as but not limited to, hair conditioning agents. Hair conditioning agents are well known in the art, see for example Green et al. (WO0107009), and are available commercially from various sources. Suitable examples of hair conditioning agents include, but are not limited to, cationic polymers, such as cationized guar gum, diallyl quaternary ammonium salt/acrylamide copolymers, quaternized polyvinylpyrrolidone and derivatives thereof, and various polyquaternium-compounds; cationic surfactants, such as stearalkonium chloride, centrimonium chloride, and sapamin hydrochloride; fatty alcohols, such as behenyl alcohol; fatty amines, such as stearyl amine; waxes; esters; nonionic polymers, such as polyvinylpyrrolidone, polyvinyl alcohol, and polyethylene glycol; silicones; siloxanes, such as decamethylcyclopentasiloxane; polymer emulsions, such as amodimethicone; and nanoparticles, such as silica nanoparticles and polymer nanoparticles.

The hair care products may also include additional components typically found in cosmetically acceptable media. Non-limiting examples of such components are disclosed in International Cosmetic Ingredient Dictionary, Ninth Edition, 2002, and CTFA Cosmetic Ingredient Handbook, Tenth Edition, 2004. A non-limiting list of components often included in a cosmetically acceptable medium for hair care are also described by Philippe et al. in U.S. Pat. No. 6,280,747, and by Omura et al. in U.S. Pat. No. 6,139,851 and Cannell et al. in U.S. Pat. No. 6,013,250, all of which are incorporated herein by reference. For example, hair care compositions can be aqueous, alcoholic or aqueous-alcoholic solutions, the alcohol preferably being ethanol or isopropanol, in a proportion of from about 1 to about 75% by weight relative to the total weight, for the aqueous-alcoholic solutions. Additionally, the hair care compositions may contain one or more conventional cosmetic or dermatological additives or adjuvants including but not limited to, antioxidants, preserving agents, fillers, surfactants, UVA and/or UVB sunscreens, fragrances, thickeners, gelling agents, wetting agents and anionic, nonionic or amphoteric polymers, and dyes or pigments.

The hair care compositions and methods may also include at least one coloring agents such as any dye, lake, pigment, and the like that may be used to change the color of hair, skin, or nails. Hair coloring agents are well known in the art (see for example Green et al. supra, *CFTA International Color Handbook*, $2^{nd}$ ed., Micelle Press, England (1992) and *Cosmetic Handbook*, US Food and Drug Administration, FDA/IAS Booklet (1992)), and are available commercially from various sources (for example Bayer, Pittsburgh, PA; Ciba-Geigy, Tarrytown, NY; ICI, Bridgewater, NJ; Sandoz, Vienna, Austria; BASF, Mount Olive, NJ; and Hoechst, Frankfurt, Germany). Suitable hair coloring agents include, but are not limited to dyes, such as 4-hydroxypropylamino-3-nitrophenol, 4-amino-3-nitrophenol, 2-amino-6-chloro-4-nitrophenol, 2-nitro-paraphenylenediamine, N,N-hydroxyethyl-2-nitro-phenylenediamine, 4-nitro-indole, Henna, HC Blue 1, HC Blue 2, HC Yellow 4, HC Red 3, HC Red 5, Disperse Violet 4, Disperse Black 9, HC Blue 7, HC Blue 12, HC Yellow 2, HC Yellow 6, HC Yellow 8, HC Yellow 12, HC Brown 2, D&C Yellow 1, D&C Yellow 3, D&C Blue 1, Disperse Blue 3, Disperse violet 1, eosin derivatives such as D&C Red No. 21 and halogenated fluorescein derivatives such as D&C Red No. 27, D&C Red Orange No. 5 in combination with D&C Red No. 21 and D&C Orange No. 10; and pigments, such as D&C Red No. 36 and D&C Orange No. 17, the calcium lakes of D&C Red Nos. 7, 11, 31 and 34, the barium lake of D&C Red No. 12, the strontium lake of D&C Red No. 13, the aluminum lakes of FD&C Yellow No. 5, of FD&C Yellow No. 6, of D&C Red No. 27, of D&C Red No. 21, and of FD&C Blue No. 1, iron oxides, manganese violet, chromium oxide, titanium dioxide, titanium dioxide nanoparticles, zinc oxide, barium oxide, ultramarine blue, bismuth citrate, and carbon black particles. In one embodiment, the hair coloring agents are D&C Yellow 1 and 3, HC Yellow 6 and 8, D&C Blue 1, HC Blue 1, HC Brown 2, HC Red 5, 2-nitro-paraphenylenediamine, N,N-hydroxyethyl-2-nitro-phenylenediamine, 4-nitro-indole, and carbon black. Metallic and semiconductor nanoparticles may also be used as hair coloring agents due to their strong emission of light (U.S. Patent Application Publication No. 2004-0010864 to Vic et al.).

Hair care compositions may include, but are not limited to, shampoos, conditioners, lotions, aerosols, gels, mousses, and hair dyes.

Personal care products may be in the form of lotions, creams, pastes, balms, ointments, pomades, gels, liquids, or combinations thereof. A personal care product can also be in the form of makeup, lipstick, mascara, rouge, foundation, blush, eyeliner, lip liner, lip gloss, other cosmetics, sunscreen, sun block, nail polish, mousse, hair spray, styling gel, nail conditioner, bath gel, shower gel, body wash, face wash, shampoo, hair conditioner (leave-in or rinse-out), cream rinse, hair dye, hair coloring product, hair shine product, hair serum, hair anti-frizz product, hair split-end repair product, lip balm, skin conditioner, cold cream, moisturizer, body spray, soap, body scrub, exfoliant, astringent, scruffing lotion, depilatory, permanent waving solution, antidandruff formulation, antiperspirant composition, deodorant, shaving product, pre-shaving product, after-shaving product, cleanser, skin gel, rinse, dentifrice composition, toothpaste, or mouthwash, for example.

Personal care products can include the poly alpha-1,6-glucan derivatives as disclosed herein, and can further comprise personal care active ingredient materials including sun screen agents, moisturizers, humectants, benefiting agents for hair, skin, nails and mouth, depositing agents such as surfactants, occlusive agents, moisture barriers, lubricants, emollients, anti-aging agents, antistatic agents, abrasive, antimicrobials, conditioners, exfoliants, fragrances, viscosifying agents, salts, lipids, phospholipids, vitamins, foam stabilizers, pH modifiers, preservatives, suspending agents, silicone oils, silicone derivatives, essential oils, oils, fats, fatty acids, fatty acid esters, fatty alcohols, waxes, polyols, hydrocarbons, and mixtures thereof.

In certain embodiments, a skin care product can include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example. Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil.

Various examples of personal care formulations comprising at least one poly alpha-1,6-glucan derivative as presently disclosed are disclosed below (1-3)

(1) A hair conditioner composition comprising: cetyl alcohol (1-3%), isopropyl myristate (1-3%), hydroxyethyl cellulose (Natrosol® 250 HHR), 0.1-1%, poly alpha-1,6-glucan derivative (0.1-2%), potassium salt (0.1-0.5%), Germaben® preservative II (0.5%, available from International Specialty Products), and the balance being water.

(2) A hair shampoo composition comprising: 5-20% sodium laureth sulfate, 1-2 wt % cocamidopropyl betaine, 1-2 wt % sodium chloride, 0.1-2% poly alpha-1,6-glucan derivative, preservative (0.1-0.5%), and the balance being water.

(3) A skin lotion composition comprising: 1-5% glycerin, 1-5% glycol stearate, 1-5% stearic acid, 1-5% mineral oil, 0.5-1% acetylated lanolin (Lipolan® 98), 0.1-0.5 cetyl alcohol, 0.2-1% triethanolamine, 0.1-1 wt % Germaben® II preservative, 0.5-2 wt % poly alpha-1,6-glucan derivative, and the balance being water.

Personal care compositions disclosed herein can be in the form of an oral care composition. Examples of oral care compositions include dentifrices, toothpaste, mouth wash, mouth rinse, chewing gum, and edible strips that provide some form of oral care (e.g., treatment or prevention of cavities [dental caries], gingivitis, plaque, tartar, and/or periodontal disease). An oral care composition can also be for treating an "oral surface", which encompasses any soft or hard surface within the oral cavity including surfaces of the tongue, hard and soft palate, buccal mucosa, gums and dental surfaces. A "dental surface" herein is a surface of a natural tooth or a hard surface of artificial dentition including a crown, cap, filling, bridge, denture, or dental implant, for example.

One or more poly alpha-1,6-glucan derivatives comprised in an oral care composition typically are provided therein as a thickening agent and/or dispersion agent, which may be useful to impart a desired consistency and/or mouth feel to the composition. An oral care composition herein can comprise about 0.01-15.0 wt % (e.g., ~0.1-10 wt % or ~0.1-5.0 wt %, ~0.1-2.0 wt %) of one or more poly alpha-1,6-glucan derivatives disclosed herein. One or more other thickening agents or dispersion agents can also be provided in an oral care composition herein, such as a carboxyvinyl polymer, carrageenan (e.g., L-carrageenan), natural gum (e.g., karaya, xanthan, gum arabic, tragacanth), colloidal magnesium aluminum silicate, or colloidal silica, for example.

An oral care composition herein may be a toothpaste or other dentifrice, for example. Such compositions, as well as any other oral care composition herein, can additionally comprise, without limitation, one or more of an anticaries agent, antimicrobial or antibacterial agent, anticalculus or tartar control agent, surfactant, abrasive, pH-modifying agent, foam modulator, humectant, flavorant, sweetener, pigment/colorant, whitening agent, and/or other suitable components.

An anticaries agent herein can be an orally acceptable source of fluoride ions. Suitable sources of fluoride ions include fluoride, monofluorophosphate and fluorosilicate salts as well as amine fluorides, including olaflur (N'-octadecyltrimethylendiamine-N,N,N'-tris(2-ethanol)-dihydrofluoride), for example. An anticaries agent can be present in an amount providing a total of about 100-20000 ppm, about 200-5000 ppm, or about 500-2500 ppm, fluoride ions to the composition, for example. In oral care compositions in which sodium fluoride is the sole source of fluoride ions, an amount of about 0.01-5.0 wt %, about 0.05-1.0 wt %, or about 0.1-0.5 wt %, sodium fluoride can be present in the composition, for example.

An antimicrobial or antibacterial agent suitable for use in an oral care composition herein includes, for example, phenolic compounds (e.g., 4-allylcatechol; p-hydroxybenzoic acid esters such as benzylparaben, butylparaben, ethylparaben, methylparaben and propylparaben; 2-benzylphenol; butylated hydroxyanisole; butylated hydroxytoluene; capsaicin; carvacrol; creosol; eugenol; guaiacol; halogenated bisphenolics such as hexachlorophene and bromochlorophene; 4-hexylresorcinol; 8-hydroxyquinoline and salts thereof; salicylic acid esters such as menthyl salicylate, methyl salicylate and phenyl salicylate; phenol; pyrocatechol; salicylanilide; thymol; halogenated diphenylether compounds such as triclosan and triclosan monophosphate), copper (II) compounds (e.g., copper (II) chloride, fluoride, sulfate and hydroxide), zinc ion sources (e.g., zinc acetate, citrate, gluconate, glycinate, oxide, and sulfate), phthalic acid and salts thereof (e.g., magnesium monopotassium phthalate), hexetidine, octenidine, sanguinarine, benzalkonium chloride, domiphen bromide, alkylpyridinium chlorides (e.g. cetylpyridinium chloride, tetradecylpyridinium chloride, N-tetradecyl-4-ethylpyridinium chloride), iodine, sulfonamides, bisbiguanides (e.g., alexidine, chlorhexidine, chlorhexidine digluconate), piperidino derivatives (e.g., delmopinol, octapinol), *magnolia* extract, grapeseed extract, rosemary extract, menthol, geraniol, citral, eucalyptol, antibiotics (e.g., augmentin, amoxicillin, tetracycline, doxycycline, minocycline, metronidazole, neomycin, kanamycin, clindamycin), and/or any antibacterial agents disclosed in U.S. Pat. No. 5,776,435, which is incorporated herein by reference. One or more antimicrobial agents can optionally be present at about 0.01-10 wt % (e.g., 0.1-3 wt %), for example, in the disclosed oral care composition.

An anticalculus or tartar control agent suitable for use in an oral care composition herein includes, for example, phosphates and polyphosphates (e.g., pyrophosphates), polyaminopropanesulfonic acid (AMPS), zinc citrate trihydrate, polypeptides (e.g., polyaspartic and polyglutamic acids), polyolefin sulfonates, polyolefin phosphates, diphosphonates (e.g., azacycloalkane-2,2-diphosphonates such as azacycloheptane-2,2-diphosphonic acid), N-methyl azacyclopentane-2,3-diphosphonic acid, ethane-1-hydroxy-1,1-diphosphonic acid (EHDP), ethane-1-amino-1,1-diphosphonate, and/or phosphonoalkane carboxylic acids and salts thereof (e.g., their alkali metal and ammonium salts). Useful inorganic phosphate and polyphosphate salts include, for example, monobasic, dibasic and tribasic sodium phosphates, sodium tripolyphosphate, tetrapolyphosphate, mono-, di-, tri- and tetra-sodium pyrophosphates, disodium dihydrogen pyrophosphate, sodium trimetaphosphate, sodium hexametaphosphate, or any of these in which sodium is replaced by potassium or ammonium. Other useful anticalculus agents in certain embodiments include anionic polycarboxylate polymers (e.g., polymers or copolymers of acrylic acid, methacrylic, and maleic anhydride such as polyvinyl methyl ether/maleic anhydride copolymers). Still other useful anticalculus agents include sequestering agents such as hydroxycarboxylic acids (e.g., citric, fumaric, malic, glutaric and oxalic acids and salts thereof) and aminopolycarboxylic acids (e.g., EDTA). One or more anticalculus or tartar control agents can optionally be present at about 0.01-50 wt % (e.g., about 0.05-25 wt % or about 0.1-15 wt %), for example, in the disclosed oral care composition.

A surfactant suitable for use in an oral care composition herein may be anionic, non-ionic, or amphoteric, for example. Suitable anionic surfactants include, without limitation, water-soluble salts of $C_{8-20}$ alkyl sulfates, sulfonated monoglycerides of $C_{8-20}$ fatty acids, sarcosinates, and taurates. Examples of anionic surfactants include sodium lauryl sulfate, sodium coconut monoglyceride sulfonate, sodium lauryl sarcosinate, sodium lauryl isoethionate, sodium laureth carboxylate and sodium dodecyl benzenesulfonate. Suitable non-ionic surfactants include, without limitation, poloxamers, polyoxyethylene sorbitan esters, fatty alcohol ethoxylates, alkylphenol ethoxylates, tertiary amine oxides, tertiary phosphine oxides, and dialkyl sulfoxides. Suitable amphoteric surfactants include, without limitation, derivatives of $C_{8-20}$ aliphatic secondary and tertiary amines having an anionic group such as a carboxylate, sulfate, sulfonate, phosphate or phosphonate. An example of a suitable amphoteric surfactant is cocoamidopropyl betaine. One or more surfactants are optionally present in a total amount of about 0.01-10 wt % (e.g., about 0.05-5.0 wt % or about 0.1-2.0 wt %), for example, in the disclosed oral care composition.

An abrasive suitable for use in an oral care composition herein may include, for example, silica (e.g., silica gel, hydrated silica, precipitated silica), alumina, insoluble phosphates, calcium carbonate, and resinous abrasives (e.g., a urea-formaldehyde condensation product). Examples of insoluble phosphates useful as abrasives herein are orthophosphates, polymetaphosphates and pyrophosphates, and include dicalcium orthophosphate dihydrate, calcium pyrophosphate, beta-calcium pyrophosphate, tricalcium phosphate, calcium polymetaphosphate and insoluble sodium polymetaphosphate. One or more abrasives are optionally present in a total amount of about 5-70 wt % (e.g., about 10-56 wt % or about 15-30 wt %), for example, in the disclosed oral care composition. The average particle size of an abrasive in certain embodiments is about 0.1-30 microns (e.g., about 1-20 microns or about 5-15 microns).

An oral care composition in certain embodiments may comprise at least one pH-modifying agent. Such agents may be selected to acidify, make more basic, or buffer the pH of a composition to a pH range of about 2-10 (e.g., pH ranging from about 2-8, 3-9, 4-8, 5-7, 6-10, or 7-9). Examples of pH-modifying agents useful herein include, without limitation, carboxylic, phosphoric and sulfonic acids; acid salts (e.g., monosodium citrate, disodium citrate, monosodium malate); alkali metal hydroxides (e.g. sodium hydroxide, carbonates such as sodium carbonate, bicarbonates, sesquicarbonates); borates; silicates; phosphates (e.g., monosodium phosphate, trisodium phosphate, pyrophosphate salts); and imidazole.

A foam modulator suitable for use in an oral care composition herein may be a polyethylene glycol (PEG), for example. High molecular weight PEGs are suitable, including those having an average molecular weight of about 200000-7000000 (e.g., about 500000-5000000 or about 1000000-2500000), for example. One or more PEGs are optionally present in a total amount of about 0.1-10 wt % (e.g. about 0.2-5.0 wt % or about 0.25-2.0 wt %), for example, in the disclosed oral care composition.

An oral care composition in certain embodiments may comprise at least one humectant. A humectant in certain embodiments may be a polyhydric alcohol such as glycerin, sorbitol, xylitol, or a low molecular weight PEG. Most suitable humectants also may function as a sweetener herein. One or more humectants are optionally present in a total amount of about 1.0-70 wt % (e.g., about 1.0-50 wt %, about 2-25 wt %, or about 5-15 wt %), for example, in the disclosed oral care composition.

A natural or artificial sweetener may optionally be comprised in an oral care composition herein. Examples of suitable sweeteners include dextrose, sucrose, maltose, dextrin, invert sugar, mannose, xylose, ribose, fructose, levulose, galactose, corn syrup (e.g., high fructose corn syrup or corn syrup solids), partially hydrolyzed starch, hydrogenated starch hydrolysate, sorbitol, mannitol, xylitol, maltitol, isomalt, aspartame, neotame, saccharin and salts thereof, dipeptide-based intense sweeteners, and cyclamates. One or more sweeteners are optionally present in a total amount of about 0.005-5.0 wt %, for example, in the disclosed oral care composition.

A natural or artificial flavorant may optionally be comprised in an oral care composition herein. Examples of suitable flavorants include vanillin; sage; marjoram; parsley oil; spearmint oil; cinnamon oil; oil of wintergreen (methylsalicylate); peppermint oil; clove oil; bay oil; anise oil; *eucalyptus* oil; citrus oils; fruit oils; essences such as those derived from lemon, orange, lime, grapefruit, apricot, banana, grape, apple, strawberry, cherry, or pineapple; bean- and nut-derived flavors such as coffee, cocoa, cola, peanut, or almond; and adsorbed and encapsulated flavorants. Also encompassed within flavorants herein are ingredients that provide fragrance and/or other sensory effect in the mouth, including cooling or warming effects. Such ingredients include, without limitation, menthol, menthyl acetate, menthyl lactate, camphor, *eucalyptus* oil, eucalyptol, anethole, eugenol, *cassia*, oxanone, Irisone®, propenyl guaiethol, thymol, linalool, benzaldehyde, cinnamaldehyde, N-ethyl-p-menthan-3-carboxamine, N,2,3-trimethyl-2-isopropylbutanamide, 3-(1-menthoxy)-propane-1,2-diol, cinnamaldehyde glycerol acetal (CGA), and menthone glycerol acetal (MGA). One or more flavorants are optionally present in a total amount of about 0.01-5.0 wt % (e.g., about 0.1-2.5 wt %), for example, in the disclosed oral care composition.

An oral care composition in certain embodiments may comprise at least one bicarbonate salt. Any orally acceptable bicarbonate can be used, including alkali metal bicarbonates such as sodium or potassium bicarbonate, and ammonium bicarbonate, for example. One or more bicarbonate salts are optionally present in a total amount of about 0.1-50 wt % (e.g., about 1-20 wt %), for example, in the disclosed oral care composition.

An oral care composition in certain embodiments may comprise at least one whitening agent and/or colorant. A suitable whitening agent is a peroxide compound such as any of those disclosed in U.S. Pat. No. 8,540,971, which is incorporated herein by reference. Suitable colorants herein include pigments, dyes, lakes and agents imparting a particular luster or reflectivity such as pearling agents, for example. Specific examples of colorants useful herein include talc; mica; magnesium carbonate; calcium carbonate; magnesium silicate; magnesium aluminum silicate; silica; titanium dioxide; zinc oxide; red, yellow, brown and black iron oxides; ferric ammonium ferrocyanide; manganese violet; ultramarine; titaniated mica; and bismuth oxychloride. One or more colorants are optionally present in a total amount of about 0.001-20 wt % (e.g., about 0.01-10 wt % or about 0.1-5.0 wt %), for example, in the disclosed oral care composition.

Additional components that can optionally be included in an oral composition herein include one or more enzymes (above), vitamins, and anti-adhesion agents, for example. Examples of vitamins useful herein include vitamin C, vitamin E, vitamin B5, and folic acid. Examples of suitable anti-adhesion agents include solbrol, ficin, and quorum-sensing inhibitors.

The composition can be in any useful form, for example, as powders, granules, pastes, bars, unit dose, or liquid.

The unit dose form may be water-soluble, for example, a water-soluble unit dose article comprising a water-soluble film and a liquid or solid laundry detergent composition, also referred to as a pouch. A water-soluble unit dose pouch comprises a water-soluble film which fully encloses the liquid or solid detergent composition in at least one compartment. The water-soluble unit dose article may comprise a single compartment or multiple compartments. The water-soluble unit dose article may comprise at least two compartments or at least three compartments. The compartments may be arranged in a superposed orientation or in a side-by-side orientation.

A unit dose article is typically a closed structure, made of the water-soluble film enclosing an internal volume which comprises the liquid or solid laundry detergent composition. The pouch can be of any form and shape which is suitable to hold and protect the composition, e.g. without allowing the release of the composition from the pouch prior to contact of the pouch to water.

A liquid detergent composition may be aqueous, typically containing up to about 70% by weight of water and 0% to about 30% by weight of organic solvent. It may also be in the form of a compact gel type containing less than or equal to 30% by weight water.

The poly alpha-1,6-glucan derivatives disclosed herein can be used as an ingredient in the desired product or may be blended with one or more additional suitable ingredients and used as, for example, fabric care applications, laundry care applications, and/or personal care applications. Any of the disclosed compositions, for example, a fabric care, a laundry care, or a personal care composition can comprise in the range of 0.01 to 99 percent by weight of the poly alpha-1,6-glucan derivative, based on the total dry weight of the composition (dry solids basis). The term "total dry weight" means the weight of the composition excluding any solvent, for example, any water that might be present. In other embodiments, the composition comprises 0.1 to 10% or 0.1 to 9% or 0.5 to 8% or 1 to 7% or 1 to 6% or 1 to 5% or 1 to 4% or 1 to 3% or 5 to 10% or 10 to 15% or 15 to 20% or 20 to 25% or 25 to 30% or 30 to 35% or 35 to 40% or 40 to 45% or 45 to 50% or 50 to 55% or 55 to 60% or 60 to 65% or 65 to 70% or 70 to 75% or 75 to 80% or 80 to 85% or 85 to 90% or 90 to 95% or 95 to 99% by weight of the poly alpha-1,6-glucan derivative, wherein the percentages by weight are based on the total dry weight of the composition.

The composition can further comprise at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agents, or a combination thereof. In one embodiment, the enzyme is a cellulase. In another embodiment, the enzyme is a protease. In yet another embodiment, the enzyme is an amylase. In a further embodiment, the enzyme is a lipase.

The composition can be a detergent composition useful for, for example, fabric care, laundry care and/or personal care and may further contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, nucleases, amylases, or a combination thereof. In some embodiments, a combination of two or more enzymes can be used in the composition. In some embodiments, the two or more enzymes are cellulase and one or more of proteases, hemicellulases, peroxidases, lipolytic enzymes, xylanases, lipases, phospholipases, esterases, perhydrolases, cutinases, pectinases, pectate lyases, mannanases, keratinases, reductases, oxidases, phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, nucleases, amylases, or a combination thereof. One or more of the foregoing enzymes can be comprised in any other composition disclosed herein.

A cellulase can have endocellulase activity (EC 3.2.1.4), exocellulase activity (EC 3.2.1.91), or cellobiase activity (EC 3.2.1.21). A cellulase is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose.

The cellulase may be derived from any microbial source, such as a bacteria or fungus. Chemically-modified cellulases or protein-engineered mutant cellulases are included. Suitable cellulases include, for example, cellulases from the genera *Bacillus, Pseudomonas, Streptomyces, Trichoderma, Humicola, Fusarium, Thielavia* and *Acremonium*. As other examples, the cellulase may be derived from *Humicola insolens, Myceliophthora thermophile, Fusarium oxysporum, Trichoderma reesei* or a combination thereof. The cellulase, such as any of the foregoing, can be in a mature form lacking an N-terminal signal peptide. Commercially available cellulases useful herein include CELLUSOFT®, CELLUCLEAN®, CELLUZYME® and CAREZYME® (Novozymes A/S); CLAZINASE® and PURADAX® HA and REVITALENZ™ (DuPont Industrial Biosciences), BIOTOUCH® (AB Enzymes); and KAC-500(B)® (Kao Corporation).

Alternatively, a cellulase herein may be produced by any means known in the art, for example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

The cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t½) given in minutes, hours, or days, during which time period half the cellulase activity is lost under defined conditions.

The cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan.

Suitable enzymes are known in the art and can include, for example, MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURAZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus* subtilisin; Kao Corp., Tokyo, Japan) proteases; MANNASTAR®, PURABRITE™, and MANNAWAY® mannanases; M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan) lipases; STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences) amylases; GUARDZYME™ (Novo Nordisk A/S and Novozymes A/S) peroxidases or a combination thereof.

In some embodiments, the enzymes in the composition can be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. The surfactant may be petroleum-derived (also referred to as synthetic) or non-petroleum-derived (also referred to as natural). A detergent will usually contain an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap.

The detergent composition may comprise an alcohol ethoxysulfate of the formula $R^1$—$(OCH_2CH_2)_x$—O—$SO_3M$, wherein $R^1$ is a non-petroleum derived, linear or branched fatty alcohol consisting of even numbered carbon chain lengths of from about $C_8$ to about $C_{20}$, and wherein x is from about 0.5 to about 8, and where M is an alkali metal or ammonium cation. The fatty alcohol portion of the alcohol ethoxysulfate ($R^1$) is derived from a renewable source (e.g., animal or plant derived) rather than geologically derived (e.g., petroleum-derived). Fatty alcohols derived from a renewable source may be referred to as natural fatty alcohols. Natural fatty alcohols have an even number of carbon atoms with a single alcohol (—OH) attached to the terminal carbon. The fatty alcohol portion of the surfactant ($R^1$) may comprise distributions of even number carbon chains, e.g., C12, C14, C16, C18, and so forth.

In addition, a detergent composition may optionally contain a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide. The detergent composition may comprise an alcohol ethoxylate of formula $R^2$—$(OCH_2CH_2)_y$—OH, wherein $R^2$ is a non-petroleum derived, linear or branched fatty alcohol consisting of even numbered carbon chain lengths of from about $C_{10}$ to about $C_{18}$, and wherein y is from about 0.5 to about 15. The fatty alcohol portion of the alcohol ethoxylate ($R^2$) is derived from a renewable source (e.g., animal or plant derived) rather than geologically derived (e.g., petroleum-derived). The fatty alcohol portion of the surfactant ($R^2$) may comprise distributions of even number carbon chains, e.g., C12, C14, C16, C18, and so forth.

The composition can further comprise one or more detergent builders or builder systems. Builders include, for example, the alkali metal, ammonium and/or alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

The composition can further comprise at least one chelating agent. Suitable chelating agents include, for example, copper, iron and/or manganese chelating agents and mixtures thereof.

The composition can further comprise at least one deposition aid. Suitable deposition aids include, for example, polyethylene glycol, polypropylene glycol, polycarboxylate, soil release polymers such as polyterephthalic acid, clays such as kaolinite, montmorillonite, atapulgite, illite, bentonite, halloysite, or a combination thereof.

The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof or a combination thereof.

The composition can further comprise silicates. Suitable silicates can include, for example, sodium silicates, sodium disilicate, sodium metasilicate, crystalline phyllosilicates or a combination thereof.

The composition can further comprise dispersants. Suitable water-soluble organic materials can include, for example, homo- or co-polymeric acids or their salts, in which the polycarboxylic acid comprises at least two carboxyl radicals separated from each other by not more than two carbon atoms.

The composition can further comprise one or more other types of polymers in addition to the present poly alpha-1,6-glucan derivatives. Examples of other types of polymers useful herein include carboxymethyl cellulose (CMC), poly(vinylpyrrolidone) (PVP), polyethylene glycol (PEG), poly(vinyl alcohol) (PVA), polycarboxylates such as polyacrylates, maleic/acrylic acid copolymers and lauryl methacrylate/acrylic acid copolymers.

The composition can further comprise a bleaching system. For example, the bleaching system can comprise an $H_2O_2$ source such as perborate, percarbonate, perhydrate salts, mono or tetra hydrate sodium salt of perborate, persulfate, perphosphate, persilicate, percarboxylic acids and salts, percarbonic acids and salts, perimidic acids and salts, peroxymonosulfuric acids and salts, sulfonated zinc phthalocyanines, sulfonated aluminum phthalocyanines, xanthene dyes which may be combined with a peracid-forming bleach activator such as, for example, dodecanoyl oxybenzene sulfonate, decanoyl oxybenzene sulfonate, decanoyl oxybenzoic acid or salts thereof, tetraacetylethylenediamine (TAED) or nonanoyloxybenzenesulfonate (NOBS). Alternatively, a bleaching system may comprise peroxyacids (e.g., amide, imide, or sulfone type peroxyacids). In other embodiments, the bleaching system can be an enzymatic bleaching system comprising perhydrolase. Combinations of any of the above may also be used.

The composition can further comprise conventional detergent ingredients such as fabric conditioners, clays, foam boosters, suds suppressors, anti-corrosion agents, soil-suspending agents, anti-soil redeposition agents, dyes, bactericides, tarnish inhibitors, optical brighteners, or perfumes.

The pH of a detergent composition herein (measured in aqueous solution at use concentration) can be neutral or alkaline (e.g., pH of about 7.0 to about 11.0).

The composition can be a detergent composition and optionally, a heavy duty (all purpose) laundry detergent composition.

The composition can be a detergent composition, optionally including, for example, a surfactancy boosting polymer consisting of amphiphilic alkoxylated grease cleaning polymers. Suitable amphiphilic alkoxylated grease cleaning polymers can include, for example, alkoxylated polymers having branched hydrophilic and hydrophobic properties, such as alkoxylated polyalkylenimines, random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof.

Suitable heavy duty laundry detergent compositions can optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers, include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Daltons (Da); and polymeric carboxylate (such as maleate/acrylate random copolymer or polyacrylate homopolymer).

The heavy duty laundry detergent composition can optionally further include saturated or unsaturated fatty acids, preferably saturated or unsaturated $C_{12}$-$C_{24}$ fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic starch, cationic polyacrylamides, or a combination thereof.

The compositions disclosed herein can be in the form of a dishwashing detergent composition. Examples of dishwashing detergents include automatic dishwashing detergents (typically used in dishwasher machines) and handwashing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); antifoaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

Additional examples of personal care, household care, and other products and ingredients herein can be any as disclosed in U.S. Pat. No. 8,796,196, which is incorporated herein by reference. Examples of personal care, household care, and other products and ingredients herein include perfumes, fragrances, air odor-reducing agents, insect repellents and insecticides, bubble-generating agents such as surfactants, pet deodorizers, pet insecticides, pet shampoos, disinfecting agents, hard surface (e.g., floor, tub/shower, sink, toilet bowl, door handle/panel, glass/window) treatment agents (e.g., cleaning, disinfecting, and/or coating agents), wipes and other non-woven materials, colorants, preservatives, antioxidants, emulsifiers, emollients, oils, medicaments, flavors, and suspending agents.

In other embodiments, the disclosure relates to a method for treating a substrate, the method comprising the steps:
  A) providing a composition comprising a poly alpha-1,6-glucan derivative, the derivative comprising:
   i) poly alpha-1,6-glucan substituted with at least one organic group linked to the poly alpha-1,6-glucan through a linkage moiety selected from —O—, —OSO$_2$—, —OCOO—, or —OCONH—/

ii) a weight average degree of polymerization of at least 5; and
   iii) a degree of substitution of about 0.001 to about 3.0 (e.g., 0.001-1.5); wherein the poly alpha-1,6-glucan comprises a backbone of glucose monomer units wherein greater than or equal to 40% of the glucose monomer units are linked via alpha-1,6-glycosidic linkages, and optionally at least 5% of the backbone glucose monomer units have branches via alpha-1,2- and/or alpha-1,3-glycosidic linkages;
  B) contacting the substrate with the composition; and
  C) optionally rinsing the substrate;
wherein the substrate is, for example, a textile, a fabric, carpet, upholstery, apparel, or a surface. Optionally, the step of contacting the substrate can be performed in the presence of water. The compositions comprising a poly alpha-1,6-glucan derivative are as disclosed herein.

In one embodiment, the method of treating the substrate can impart anti-greying properties to the substrate, by which is meant that soil which is detached from a fabric during washing of the fabric is suspended in the wash liquor and thus prevented from being redeposited on the fabric. In another embodiment, the method of treating the substrate can impart anti-redeposition properties to a substrate. The effectiveness of anti-greying and anti-redeposition agents can be determined with the use of a tergotometer and multiple washings of pre-soiled fabrics in the presence of initially clean fabrics which act as redeposition monitors, for example using methods known in the art.

In one embodiment, the substrate can be a textile, a fabric, carpet, or apparel. In another embodiment, the substrate can be carpet, upholstery, or a surface. In yet another embodiment, the substrate can be a textile, a fabric, carpet, upholstery, apparel, or a surface. By "upholstery" is meant the soft, padded textile covering that is fixed to furniture such as armchairs and sofas. The treatment provides a benefit to the substrate, for example, one or more of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, improved whiteness retention, or a combination thereof. In another embodiment, the substrate can be a surface, for example a wall, a floor, a door, or a panel, or paper, or the substrate can be a surface of an object, such as a table. The treatment provides a benefit to the substrate, for example improved resistance to soil deposition, improved stain resistance, improved cleaning performance, or a combination thereof.

A fabric herein can comprise natural fibers, synthetic fibers, semi-synthetic fibers, or any combination thereof. A semi-synthetic fiber is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelasse, oxford, percale, poplin, plisse, sateen, seersucker, sheers, terry cloth, twill, velvet), rayon (e.g., viscose, modal, lyocell), linen, and TENCEL®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) includes those with both a cotton fiber and polyester, for example. Materials/articles containing one or more fabrics include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams. Fabrics are typically of woven or knit construction.

The step of contacting can be performed at a variety of conditions, for example, times, temperatures, wash/rinse volumes. Methods for contacting a fabric or textile substrate, for example, a fabric care method or laundry method are generally well known. For example, a material comprising fabric can be contacted with the disclosed composition: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0% by weight; or any combination of (i)-(iv). The contacting step in a fabric care method or laundry method can comprise any of washing, soaking, and/or rinsing steps, for example. In some embodiments, the rinsing step is a step of rinsing with water.

Other substrates that can be contacted include, for example, surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, and polystyrene) and wood (collectively referred to herein as "tableware").

Examples of conditions (e.g., time, temperature, wash volume) for conducting a dishwashing or tableware washing method are known in the art. In other examples, a tableware article can be contacted with the composition herein under a suitable set of conditions such as any of those disclosed above with regard to contacting a fabric-comprising material.

Certain embodiments of a method of treating a substrate further comprise a drying step, in which a material is dried after being contacted with the composition. The drying step can be performed directly after the contacting step, or following one or more additional steps that might follow the contacting step, for example, drying of a fabric after being rinsed, in water for example, following a wash in an aqueous composition. Drying can be performed by any of several means known in the art, such as air drying at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein.

In another embodiment, the substrate can be a surface, for example a wall, a floor, a door, or a panel, or the substrate can be a surface of an object, such as a table or dish. The treatment provides a benefit to the substrate, for example improved resistance to soil deposition, improved stain resistance, improved cleaning performance, or a combination thereof. The step of contacting can include wiping or spraying the substrate with the composition.

The present disclosure also concerns poly alpha-1,3-glucan substituted with at least one organic group. Such a poly alpha-1,3-glucan derivative can contain any organic group and substitution (via —O—, —OSO$_2$—, —OCOO—, or —OCONH—/

linkage) as disclosed herein for poly alpha-1,6-glucan derivatives.

A poly alpha-1,3-glucan derivative can comprise about, or at least about, 30%, 40%, 50%, 60%, 70%, 80%, 85%, 90%, 91%, 92%, 93%, 94%, 95%, 96%, 97%, 98%, 99%, 99.5%, or 100% alpha-1,3 glycosidic linkages, for example. Typically, the glycosidic linkages that are not alpha-1,3 are mostly or entirely alpha-1,6. In some aspects, a poly alpha-1,3-glucan derivative has no branch points or less than about 5%, 4%, 3%, 2%, or 1% branch points as a percent of the glycosidic linkages in the glucan derivative.

The DPw, DPn, or DP of insoluble alpha-1,3-glucan used for preparing a derivative can be about, or at least about, or less than about, 11, 12, 15, 20, 25, 30, 35, 40, 45, 50, 55, 60, 65, 70, 75, 80, 85, 90, 95, 100, 150, 200, 300, 400, 500, 600, 700, 800, 900, 1000, 1100, 1200, 1300, 1400, 1500, 2000, 3000, or 4000. DPw, DPn, or DP can optionally be expressed as a range between any two of these values. DP can be referenced, for example, for alpha-1,3-glucan of relatively low molecular weight such as 200, 100, 50, or less.

Poly alpha-1,3-glucan for derivatization can optionally be produced by an enzymatic reaction comprising at least water, sucrose and a glucosyltransferase enzyme that synthesizes poly alpha-1,3-glucan. Glucosyltransferases, reaction conditions, and/or processes useful for producing poly alpha-1,3-glucan herein are disclosed in U.S. Pat. Nos. 7,000,000, 8,871,474, 10,301,604 and 10,260,053, and U.S. Patent Appl. Publ. Nos. 2020/0165360, 2019/0276806, 2019/0112456, 2019/0078062, 2019/0078063, 2018/0340199, 2018/0021238, 2018/0273731, 2017/0002335 and 2015/0064748, for example, all of which are incorporated herein by reference.

Non-limiting examples of the embodiments disclosed herein include:

1. A poly alpha-1,6-glucan derivative comprising: (i) poly alpha-1,6-glucan substituted with at least one organic group linked to the poly alpha-1,6-glucan through a linkage moiety selected from —O—, —OSO$_2$—, —OCOO—, or —OCONH—/—

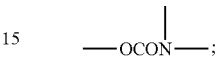

(ii) a weight average degree of polymerization of at least 5; and (iii) a degree of substitution of about 0.001 to about 3.0; wherein the poly alpha-1,6-glucan comprises a backbone of glucose monomer units, and wherein greater than or equal to 40% of the glucose monomer units are linked via alpha-1,6 glycosidic linkages; optionally wherein the poly alpha-1,6-glucan is substituted with (a) only one type of the linkage moiety selected from —O—, —OSO$_2$—, —OCOO—, or —OCONH—/

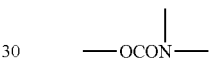

(and no other types of substitutions), (b) two or more different types of linkage moieties selected from —O—, —OSO$_2$—, —OCOO—, or —OCONH—/—

(and no other types of substitutions), or (c) not substituted with a hydrophilic group.

2. A poly alpha-1,6-glucan derivative of embodiment 1, wherein at least 5% of the backbone glucose monomer units have branches via alpha-1,2 and/or alpha-1,3 glycosidic linkages.

3. A poly alpha-1,6-glucan derivative of embodiment 1, wherein at least 5% of the backbone glucose monomer units have branches via alpha-1,2 glycosidic linkages.

4. A poly alpha-1,6-glucan derivative of embodiment 1, wherein at least 5% of the backbone glucose monomer units have branches via alpha-1,3 glycosidic linkages 5. A poly alpha-1,6-glucan derivative of embodiment 1, 2, 3, or 4, wherein the degree of substitution is about 0.01 to about 1.5.

6. A poly alpha-1,6-glucan derivative of embodiment 1, 2, 3, or 4, wherein the degree of substitution is about 0.01 to about 0.6.

7. A poly alpha-1,6-glucan derivative of embodiment 1, 2, 3, or 4, wherein the degree of substitution is about 0.01 to about 0.2.

8. A poly alpha-1,6-glucan derivative of embodiment 1, 2, 3, 4, 5, 6, or 7, wherein the poly alpha-1,6-glucan derivative has a weight average degree of polymerization in the range of about 5 to about 4000.

9. A poly alpha-1,6-glucan derivative of embodiment 1, 2, 3, 4, 5, 6, 7, or 8, wherein at least one linkage moiety is —O—.

10. A poly alpha-1,6-glucan derivative of embodiment 1, 2, 3, 4, 5, 6, 7, 8, or 9, wherein at least one linkage moiety is —OSO$_2$—.

11. A poly alpha-1,6-glucan derivative of embodiment 1, 2, 3, 4, 5, 6, 7, 8, 9, or 10, wherein at least one linkage moiety is —OCOO—.

12. A poly alpha-1,6-glucan derivative of embodiment 1, 2, 3, 4, 5, 6, 7, 8, 9, 10, or 11, wherein at least one linkage moiety is —OCONH—/

13. A poly alpha-1,6-glucan derivative of embodiment 1, 2, 3, 4, 5, 6, 7, 8, 9, 10, 11, or 12, wherein at least one organic group comprises a $C_1$ to $C_{18}$ alkyl group, a hydroxy alkyl group, a carboxy alkyl group, a $C_2$ to $C_{18}$ alkenyl group, a $C_2$ to $C_{18}$ alkynyl group, a benzyl group, a $C_6$ to $C_{20}$ aryl group, or a polyether comprising repeat units of (—CH$_2$CH$_2$O—) and/or (—CH$_2$CH(CH$_3$)O—) wherein the total number of repeat units is in the range of 2 to 100, or a combination thereof.

14. A poly alpha-1,6-glucan derivative of embodiment 1, 2, 3, 4, 5, 6, 7, 8, 9, 10, 11, 12, or 13, wherein at least one organic group is a $C_1$-$C_{10}$ alkyl, $C_1$-$C_{10}$ hydroxyl alkyl group, or a polyether comprising repeat units of (—CH$_2$CH$_2$O—) and/or (—CH$_2$CH(CH$_3$)O—) wherein the total number of repeat units is in the range of 2 to 100, or a combination thereof.

15. A poly alpha-1,6-glucan derivative of embodiment 1, 2, 3, 4, 5, 6, 7, 8, 9, 10, 11, 12, 13, or 14, wherein at least one organic group comprises a benzyl group or a benzyl group substituted with one or more of a halogen, a cyano group, an ester group, an amide group, an ether group, a $C_1$ to $C_6$ alkyl group, an aryl group, a $C_2$ to $C_6$ alkene group, a $C_2$ to $C_6$ alkyne group, or a combination thereof.

16. A poly alpha-1,6-glucan derivative of embodiment 1, 2, 3, 4, 5, 6, 7, 8, 9, 10, 11, 12, 13, 14, or 15, wherein at least one organic group is a methyl, ethyl, phenyl, benzyl, or p-tolyl group.

17. A poly alpha-1,6-glucan derivative of embodiment 1, 2, 3, 4, 5, 6, 7, 8, 9, 10, 11, 12, 13, 14, 15, or 16, wherein at least one organic group comprises a $C_1$-$C_{10}$ alkyl group; $C_1$-$C_{10}$ hydroxyl alkyl group; a polyether comprising repeat units of (—CH$_2$CH$_2$O—), (—CH$_2$CH(CH$_3$)O—), (—CH(CH$_3$)CH(CH$_3$)O—), and/or (—CH$_2$CH(CH$_2$CH$_3$)O—), wherein the total number of repeat units is in the range of 2 to 100; a benzyl group; or a combination thereof, and the linkage moiety is —O—.

18. A poly alpha-1,6-glucan derivative of embodiment 1, 2, 3, 4, 5, 6, 7, 8, 9, 10, 11, 12, 13, 14, 15, 16, or 17, wherein at least one organic group comprises a $C_6$-$C_{20}$ aryl group, optionally substituted with alkyl groups, and the linkage moiety is —OSO$_2$—.

19. A poly alpha-1,6-glucan derivative of embodiment 18, wherein the aryl group is a tolyl group.

20. A poly alpha-1,6-glucan derivative of embodiment 1, 2, 3, 4, 5, 6, 7, 8, 9, 10, 11, 12, 13, 14, 15, 16, 17, 18, or 19, wherein the poly alpha-1,6-glucan derivative has a biodegradability as determined by the Carbon Dioxide Evolution Test Method of at least 10% after 90 days.

21. A composition comprising a poly alpha-1,6-glucan derivative of embodiment 1, 2, 3, 4, 5, 6, 7, 8, 9, 10, 11, 12, 13, 14, 15, 16, 17, 18, 19, or 20.

22. A composition of embodiment 21, wherein the composition is in the form of a liquid, a gel, a powder, a hydrocolloid, an aqueous solution, a granule, a tablet, a capsule, a bead or pastille, a single compartment sachet, a multi-compartment sachet, a single compartment pouch, or a multi-compartment pouch.

23. A composition of embodiment 22, further comprising at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

24. A composition of embodiment 23, wherein the enzyme is a cellulase, a protease, a lipase, an amylase, a lipase, or a combination thereof.

25. A personal care product, a home care product, an industrial product, or a fabric care product comprising a composition of embodiment 21, 22, 23, or 24.

26. A personal care product comprising a poly alpha-1,6-glucan derivative of embodiment 1, 2, 3, 4, 5, 6, 7, 8, 9, 10, 11, 12, 13, 14, 15, 16, 17, 18, 19, or 20.

27. An industrial product comprising a poly alpha-1,6-glucan derivative of embodiment 1, 2, 3, 4, 5, 6, 7, 8, 9, 10, 11, 12, 13, 14, 15, 16, 17, 18, 19, or 20.

28. A home care product comprising a poly alpha-1,6-glucan derivative of embodiment 1, 2, 3, 4, 5, 6, 7, 8, 9, 10, 11, 12, 13, 14, 15, 16, 17, 18, 19, or 20.

29. A product comprising the poly alpha-1,6-glucan derivative of embodiment 1, 2, 3, 4, 5, 6, 7, 8, 9, 10, 11, 12, 13, 14, 15, 16, 17, 18, 19, or 20, wherein (i) the product further comprises one or more of a perfume, fragrance, flavor, air odor-reducing agent, insect repellent, insecticide, bubble-generating agent, non-woven material, colorant, preservative, antioxidant, emulsifier, emollient, oil, medicament, suspending agent; and/or (ii) the product is a disinfecting product, cleaning product, coating product, wipe, or hard surface cleaner such as for a floor, countertop, table, desk, tub/shower, sink, toilet bowl, door/cabinet handle/panel, or glass/window.

30. A method for treating a substrate, the method comprising the steps: (a) providing a composition of embodiment 21, 22, 23, 24, 25, 26, 27, or 28; (b) contacting the substrate with the composition; and (c) optionally rinsing the substrate; wherein the substrate is a textile, fabric, carpet, upholstery, apparel, or surface.

31. A method of embodiment 30, wherein the substrate is a surface.

Further non-limiting examples of the embodiments disclosed herein include:

1. A composition, such as any disclosed herein, comprising a poly alpha-1,6-glucan derivative, wherein the poly alpha-1,6-glucan derivative comprises: (i) a poly alpha-1,6-glucan backbone of glucose monomer units, wherein greater than or equal to 40% of the glucose monomer units are linked via alpha-1,6 glycosidic linkages, and optionally at least 5% of the backbone glucose monomer units have branches via alpha-1,2 and/or alpha-1,3 glycosidic linkages; and (ii) at least one hydrophobic organic group linked to the poly alpha-1,6-glucan backbone through an ether linkage (—O—) moiety; wherein the poly alpha-1,6-glucan backbone has a weight-average degree of polymerization of at least 5, wherein the poly alpha-1,6-glucan derivative has a degree of substitution of ether linkage moiety of 0.2 to 1.0; and wherein the poly alpha-1,6-glucan derivative is substantially free from hydrophilic substitution.

2. The composition of embodiment 1, wherein the poly alpha-1,6-glucan derivative further comprises one or more additional hydrophobic organic groups linked to the poly alpha-1,6-glucan backbone through a linkage moiety selected from ester (—O—CO—), —OSO$_2$—, —OCOO—, or —OCONH—/

.

3. The composition of any preceding embodiment, wherein no hydrophilic organic groups are linked to the poly alpha-1,6-glucan backbone through the ether linkage moiety.

4. The composition of any preceding embodiment, wherein the poly alpha-1,6-glucan derivative is substantially free from hydrophilic groups selected from: carboxylic acid, carboxylic acid salt, sulfonic acid derivative, sulfonic acid derivative salt, sulfuric acid derivative, sulfuric acid derivative salt, thiosulfate, thiosulfate salt, phosphoric acid derivative, phosphoric acid derivative salt, alkyl amine, alkyl substituted ammonium salt, quaternized pyridine salt, quaternized imidazole salt, or any combination thereof.

5. The composition of any preceding embodiment, wherein the alpha-1,6-glucan backbone of the poly alpha-1,6-glucan derivative has a weight average degree of polymerization of either 5 to 95, or 125 to 4000.

6. The composition of any preceding embodiment, wherein, the poly alpha-1,6-glucan derivative has a degree of substitution of ether linkage moiety of 0.6 to 0.9.

7. The composition of any preceding embodiment, wherein 5% to 9%, or 26% to 40%, of the backbone glucose monomer units have branches via alpha-1,2 or alpha-1,3 glycosidic linkages.

8. The composition of any preceding embodiment, wherein the hydrophobic organic group is selected from: a $C_1$ to $C_{18}$ alkyl group; a hydroxy alkyl group; a $C_2$ to $C_{18}$ alkenyl group; a $C_2$ to $C_{18}$ alkynyl group; a benzyl group; a $C_6$ to $C_{20}$ aryl group; a polyether comprising repeat units of (—CH$_2$CH$_2$O—) and/or (—CH$_2$CH(CH$_3$)O—) wherein the total number of repeat units is in the range of 2 to 100; or any combination thereof.

9. The composition of any preceding embodiment, wherein the hydrophobic organic group is selected from: a $C_1$-$C_{10}$ alkyl group; a $C_1$-$C_{10}$ hydroxyl alkyl group; a polyether comprising repeat units of (—CH$_2$CH$_2$O—), (—CH$_2$CH(CH$_3$)O—), (—CH(CH$_3$)CH(CH$_3$)O—), (—CH$_2$CH(CH$_2$CH$_3$)O—), or a mixture thereof, wherein the total number of repeat units is in the range of 2 to 100; or any combination thereof.

10. The composition of any preceding embodiment, wherein the hydrophobic organic group is a benzyl group, wherein the benzyl group may be substituted with one or more of: a halogen, a cyano group, an ester group, an amide group, an ether group, a $C_1$ to $C_6$ alkyl group, an aryl group, a $C_2$ to $C_6$ alkene group, a $C_2$ to $C_6$ alkyne group, or any combination thereof.

11. The composition of any preceding embodiment, wherein the poly alpha-1,6-glucan derivative has a biodegradability as determined by the Carbon Dioxide Evolution Test Method of at least 10% after 90 days.

12. The composition of any preceding embodiment, wherein the composition is in the form of a liquid, a gel, a powder, a hydrocolloid, an aqueous solution, a granule, a tablet, a capsule, a bead or pastille, a single compartment sachet, a pad, a multi-compartment sachet, a single compartment pouch, or a multi-compartment pouch.

13. The composition of any preceding embodiment, wherein the composition further comprises an ingredient selected from: a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or any combination thereof.

14. The composition of any preceding embodiment, wherein the composition comprises an enzyme selected from: a cellulase, a protease, a nuclease, an amylase, a lipase, or any combination thereof.

Further non-limiting examples of the embodiments disclosed herein include:

1. A composition, such as any disclosed herein, comprising a poly alpha-1,6-glucan derivative, wherein the poly alpha-1,6-glucan derivative comprises: (i) a poly alpha-1,6-glucan backbone of glucose monomer units, wherein greater than or equal to 40% of the glucose monomer units are linked via alpha-1,6 glycosidic linkages, and wherein 0% to less than 30% of the glucose monomer units are linked via alpha-1,3 glycosidic linkages, and optionally at least 5% of the backbone glucose monomer units have branches via alpha-1,2 and/or alpha-1,3 glycosidic linkages; and (ii) at least one organic group linked to the poly alpha-1,6-glucan backbone through a —OCONH—/

(carbamoyl or carbamate) linkage moiety; wherein the poly alpha-1,6-glucan backbone has a weight average degree of polymerization of at least 5; and wherein the poly alpha-1,6-glucan derivative has a degree of substitution of the —OCONH—/

linkage moiety of 0.001 to 3.0.

2. The composition of embodiment 1, wherein the organic group linked to the poly alpha-1,6-glucan backbone is a hydrophobic organic group.

3. The composition of any preceding embodiment, wherein the poly alpha-1,6-glucan derivative further comprises one or more additional organic groups linked to the poly alpha-1,6-glucan backbone through linkage moiety selected from one or more of ester (—O—CO—), carbonate (—OCOO—), sulfonyl (—OSO$_2$—), and ether (—O—).

4. The composition of any preceding embodiment, wherein the poly alpha-1,6-glucan derivative is substantially free from hydrophilic substitution.

5. The composition of any preceding embodiment, wherein the poly alpha-1,6-glucan derivative is substantially free from hydrophilic groups selected from: carboxylic acid, carboxylic acid salt, sulfonic acid derivative, sulfonic acid derivative salt, sulfuric acid derivative, sulfuric acid derivative salt, thiosulfate, thiosulfate salt, phosphoric acid derivative, phosphoric acid derivative salt, alkyl amine, alkyl substituted ammonium salt, quaternized pyridine salt, quaternized imidazole salt, or any combination thereof.

6. The composition of any preceding embodiment, wherein the alpha-1,6-glucan backbone of the poly alpha-1,6-glucan derivative has a weight average degree of polymerization of either from 5 to 95, or from 125 to 4000.

7. The composition of any preceding embodiment, wherein the poly alpha-1,6-glucan derivative has a degree of substitution with the —OCONH—/

linkage moiety of from 0.2 to 1.0, or 0.60 to 0.90.

8. The composition of any preceding embodiment, wherein either 5% to 9%, or 26% to 40% of the backbone glucose monomer units have branches via alpha-1,2 or alpha-1,3 glycosidic linkages.

9. The composition of any preceding embodiment, wherein the organic group is selected from: a $C_1$ to $C_{18}$ alkyl group; a hydroxy alkyl group; a $C_2$ to $C_{18}$ alkenyl group; a $C_2$ to $C_{18}$ alkynyl group; a benzyl group; a $C_6$ to $C_{20}$ aryl group; a polyether comprising repeat units of (—CH$_2$CH$_2$O—) and/or (—CH$_2$CH(CH$_3$)O—) wherein the total number of repeat units is in the range of 2 to 100; or any combination thereof.

10. The composition of any preceding embodiment, wherein the organic group is selected from: a $C_1$-$C_{10}$ alkyl group; a $C_1$-$C_{10}$ hydroxyl alkyl group; a polyether comprising repeat units of (—CH$_2$CH$_2$O—), (—CH$_2$CH(CH$_3$)O—), (—CH(CH$_3$)CH(CH$_3$)O—), (—CH$_2$CH(CH$_2$CH$_3$)O—), or a mixture thereof, wherein the total number of repeat units is in the range of 2 to 100; or any combination thereof.

11. The composition of any preceding embodiment, wherein the organic group is a benzyl group, wherein the benzyl group may be substituted with one or more of: a halogen, a cyano group, an ester group, an amide group, an ether group, a $C_1$ to $C_6$ alkyl group, an aryl group, a $C_2$ to $C_6$ alkene group, a $C_2$ to $C_6$ alkyne group, or any combination thereof.

12. The composition of any preceding embodiment, wherein the poly alpha-1,6-glucan derivative has a biodegradability as determined by the OECD 301B Ready Biodegradability CO$_2$ Evolution Test Method of at least 10% after 90 days.

13. The composition of any preceding embodiment, wherein the composition is in the form of a liquid, a gel, a powder, a hydrocolloid, an aqueous solution, a granule, a tablet, a capsule, a bead or pastille, a single compartment sachet, a pad, a multi-compartment sachet, a single compartment pouch, or a multi-compartment pouch.

14. The composition of any preceding embodiment, wherein the composition further comprises an ingredient selected from: surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or any combination thereof.

15. The composition of any preceding embodiment, wherein the composition comprises an enzyme selected from: a cellulase, a protease, an amylase, a lipase, or any combination thereof.

Further non-limiting examples of the embodiments disclosed herein include:

1. A composition, such as any disclosed herein, comprising a poly alpha-1,6-glucan derivative, wherein the poly alpha-1,6-glucan derivative comprises: (i) a poly alpha-1,6-glucan backbone of glucose monomer units, wherein greater than or equal to 40% of the glucose monomer units are linked via alpha-1,6 glycosidic linkages, and optionally at least 5% of the backbone glucose monomer units have branches via alpha-1,2 and/or alpha-1,3 glycosidic linkages; and (ii) at least one organic group linked to the poly alpha-1,6-glucan backbone through a carbonate linkage moiety (—OCOO—); wherein the poly alpha-1,6-glucan backbone has a weight average degree of polymerization of at least 5; and wherein the poly alpha-1,6-glucan derivative has a degree of substitution with carbonate linkage moiety of 0.001 to 3.00.

2. The composition of embodiment 1, wherein the organic group linked to the poly alpha-1,6-glucan backbone is a hydrophobic organic group.

3. The composition of any preceding embodiment, wherein the poly alpha-1,6-glucan derivative further comprises one or more additional organic groups linked to the poly alpha-1,6-glucan backbone through a linkage moiety selected from one or more of ester (—O—CO—), carbamoyl or carbamate (—OCONH—/

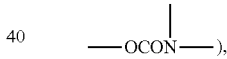

sulfonyl (—OSO$_2$—), and ether (—O—).

4. The composition of any preceding embodiment, wherein the poly alpha-1,6-glucan derivative is substantially free from hydrophilic substitution.

5. The composition of any preceding embodiment, wherein the poly alpha-1,6-glucan derivative is substantially free from hydrophilic groups selected from: carboxylic acid, carboxylic acid salt, sulfonic acid derivative, sulfonic acid derivative salt, sulfuric acid derivative, sulfuric acid derivative salt, thiosulfate, thiosulfate salt, phosphoric acid derivative, phosphoric acid derivative salt, alkyl amine, alkyl substituted ammonium salt, quaternized pyridine salt, quaternized imidazole salt, or any combination thereof.

6. The composition of any preceding embodiment, wherein the alpha-1,6-glucan backbone of the poly alpha-1,6-glucan derivative has a weight average degree of polymerization of either 5 to 95, or 125 to 4000.

7. The composition of any preceding embodiment, wherein the poly alpha-1,6-glucan derivative has a degree of substitution of carbonate linkage moiety of 0.2 to 1.0, or 0.60 to 0.90.

8. The composition of any preceding embodiment, wherein either 5% to 9%, or 26% to 40%, of the backbone glucose monomer units have branches via alpha-1,2 or alpha-1,3 glycosidic linkages.

9. The composition of any preceding embodiment, wherein the organic group is selected from: a $C_1$ to $C_{18}$ alkyl group; a hydroxy alkyl group; a $C_2$ to $C_{18}$ alkenyl group; a $C_2$ to $C_{18}$ alkynyl group; a benzyl group; a $C_6$ to $C_{20}$ aryl group; a polyether comprising repeat units of (—$CH_2CH_2O$—) and/or (—$CH_2CH(CH_3)O$—) wherein the total number of repeat units is in the range of 2 to 100; or any combination thereof.

10. The composition of any preceding embodiment, wherein the organic group is selected from: a $C_1$-$C_{10}$ alkyl group; a $C_1$-$C_{10}$ hydroxyl alkyl group; a polyether comprising repeat units of (—$CH_2CH_2O$—), (—$CH_2CH(CH_3)O$—), (—$CH(CH_3)CH(CH_3)O$—), (—$CH_2CH(CH_2CH_3)O$—), or a mixture thereof, wherein the total number of repeat units is in the range of 2 to 100; or any combination thereof.

11. The composition of any preceding embodiment, wherein the organic group is a benzyl group, wherein the benzyl group may be substituted with one or more of: a halogen, a cyano group, an ester group, an amide group, an ether group, a $C_1$ to $C_6$ alkyl group, an aryl group, a $C_2$ to $C_6$ alkene group, a $C_2$ to $C_6$ alkyne group, or any combination thereof.

12. The composition of any preceding embodiment, wherein the poly alpha-1,6-glucan derivative has a biodegradability as determined by the OECD 301B Ready Biodegradability $CO_2$ Evolution Test Method of at least 10% after 90 days.

13. The composition of any preceding embodiment, wherein the composition is in the form of a liquid, a gel, a powder, a hydrocolloid, an aqueous solution, a granule, a tablet, a capsule, a bead or pastille, a single compartment sachet, a pad, a multi-compartment sachet, a single compartment pouch, or a multi-compartment pouch.

14. The composition of any preceding embodiment, wherein the composition further comprises an ingredient selected from: surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or any combination thereof.

15. The composition of any preceding embodiment, wherein the composition comprises an enzyme selected from: a cellulase, a protease, an amylase, a lipase, or any combination thereof.

Further non-limiting examples of the embodiments disclosed herein include:

1. A composition, such as any disclosed herein, comprising a poly alpha-1,6-glucan derivative, wherein the poly alpha-1,6-glucan derivative comprises: (i) a poly alpha-1,6-glucan backbone of glucose monomer units, wherein greater than or equal to 40% of the glucose monomer units are linked via alpha-1,6 glycosidic linkages, and optionally at least 5% of the backbone glucose monomer units have branches via alpha-1,2 and/or alpha-1,3 glycosidic linkages; and (ii) at least one hydrophobic organic group linked to the poly alpha-1,6-glucan backbone through a sulfonyl linkage moiety (—$OSO_2$—); wherein, the poly alpha-1,6-glucan backbone has a weight average degree of polymerization of at least 5; wherein, the poly alpha-1,6-glucan derivative has a degree of substitution with the sulfonyl linkage moiety of 0.001 to 3.00; and wherein the poly alpha-1,6-glucan derivative is substantially free from hydrophilic substitution.

2. The composition of embodiment 1, where the hydrophobic organic group linked to the poly alpha-1,6-glucan backbone through the sulfonyl linkage moiety is a hydrophobic group.

3. The composition of any preceding embodiment, wherein the poly alpha-1,6-glucan derivative further comprises one or more additional hydrophobic organic groups linked to the poly alpha-1,6-glucan backbone through a linkage moiety selected from one or more of ester (—O—CO—), carbamoyl or carbamate (—OCONH—/

ether (—O—), and carbonate ester (—OCOO—).

4. The composition of any preceding embodiment, wherein no hydrophilic organic groups are linked to the poly alpha-1,6-glucan backbone through the sulfonyl linkage moiety.

5. The composition of any preceding embodiment, wherein the poly alpha-1,6-glucan derivative is substantially free from hydrophilic groups selected from: carboxylic acid, carboxylic acid salt, sulfonic acid derivative, sulfonic acid derivative salt, sulfuric acid derivative, sulfuric acid derivative salt, thiosulfate, thiosulfate salt, phosphoric acid derivative, phosphoric acid derivative salt, alkyl amine, alkyl substituted ammonium salt, quaternized pyridine salt, quaternized imidazole salt, or any combination thereof.

6. The composition of any preceding embodiment, wherein the alpha-1,6-glucan backbone of the poly alpha-1,6-glucan derivative has a weight average degree of polymerization of either 5 to 95, or 125 to 4000.

7. The composition of any preceding embodiment, wherein the poly alpha-1,6-glucan derivative has a degree of substitution of the sulfonyl linkage moiety of 0.1 to 2.00.

8. The composition of any preceding embodiment, wherein either 5% to 9%, or 26% to 40%, of the backbone glucose monomer units have branches via alpha-1,2 or alpha-1,3 glycosidic linkages.

9. The composition of any preceding embodiment, wherein the hydrophobic organic group is selected from: a $C_1$ to $C_{18}$ alkyl group; a hydroxy alkyl group; a $C_2$ to $C_{18}$ alkenyl group; a $C_2$ to $C_{18}$ alkynyl group; a benzyl group; a $C_6$ to $C_{20}$ aryl group; a polyether comprising repeat units of (—$CH_2CH_2O$—) and/or (—$CH_2CH(CH_3)O$—) wherein the total number of repeat units is in the range of 2 to 100; or any combination thereof.

10. The composition of any preceding embodiment, wherein the hydrophobic organic group is selected from: a $C_1$-$C_{10}$ alkyl group; a $C_1$-$C_{10}$ hydroxyl alkyl group; a polyether comprising repeat units of (—$CH_2CH_2O$—), (—$CH_2CH(CH_3)O$—), (—$CH(CH_3)CH(CH_3)O$—), (—$CH_2CH(CH_2CH_3)O$—), or a mixture thereof, wherein the total number of repeat units is in the range of 2 to 100; or any combination thereof.

11. The composition of any preceding embodiment, wherein the hydrophobic organic group is a benzyl group, wherein the benzyl group may be substituted with one or more of: a halogen, a cyano group, an ester group, an amide group, an ether group, a $C_1$ to $C_6$ alkyl group, an aryl group, a $C_2$ to $C_6$ alkene group, a $C_2$ to $C_6$ alkyne group, or any combination thereof.

12. The composition of any preceding embodiment, wherein the poly alpha-1,6-glucan derivative has a biodegradability as determined by the OECD 301B Ready Biodegradability $CO_2$ Evolution Test Method of at least 10% after 90 days.

13. The composition of any preceding embodiment, wherein the composition is in the form of a liquid, a gel, a powder, a hydrocolloid, an aqueous solution, a granule, a tablet, a capsule, a bead or pastille, a single compartment sachet, a pad, a multi-compartment sachet, a single compartment pouch, or a multi-compartment pouch.

14. The composition of any preceding embodiment, wherein the composition further comprising an ingredient selected from: surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer-inhibiting agent, a chelating agent, a hueing dye, a calcium cation, a magnesium cation, a visual signaling ingredient, an anti-foam, a structurant, a thickener, an anti-caking agent, a starch, sand, a gelling agent, or any combination thereof.

15. The composition of any preceding embodiment, wherein the composition comprises an enzyme selected from: a cellulase, a protease, an amylase, a lipase, or any combination thereof.

EXAMPLES

Unless otherwise stated, all ingredients are available from Sigma-Aldrich, St. Louis, Missouri and were used as received.

As used herein, "Comp. Ex." Means Comparative Example; "Ex." means Example; "std dev" means standard deviation; "g" means gram(s); "mL" means milliliter(s); "uL" means microliter(s); "wt" means weight; "L" means liter(s); "min" means minute(s); "kDa" means kilodaltons; "PES" means polyethersulfone.

Method for Determining Anomeric Linkages by NMR Spectroscopy

Glycosidic linkages in water soluble oligosaccharides and polysaccharide products synthesized by a glucosyltransferase GTF8117 and alpha-1,2 branching enzyme were determined by $^1$H NMR (Nuclear Magnetic Resonance Spectroscopy). Dry oligosaccharide/polysaccharide polymer (6 mg to 8 mg) was dissolved in a solution of 0.7 mL of 1 mM DSS (4,4-dimethyl-4-silapentane-1-sulfonic acid; NMR reference standard) in $D_2O$. The sample was stirred at ambient temperature overnight. 525 uL of the clear homogeneous solution was transferred to a 5 mm NMR tube. 2D $^1$H,$^{13}$C homo/hetero-nuclear suite of NMR experiments were used to identify AGU (anhydroglucose unit) linkages. The data were collected at 20° C. and processed on a Bruker Avance III NMR spectrometer, operating at either 500 MHz or 600 MHz. The systems are equipped with a proton optimized, helium cooled cryoprobe. The 1 D $^1$H NMR spectrum was used to quantify glycosidic linkage distribution and finds the polysaccharide backbone as primarily alpha-1,6. The results reflect the ratio of the integrated intensity of a NMR resonance representing an individual linkage type divided by the integrated intensity of the sum of all peaks which represent glucose linkages, multiplied by 100.

$^1$H Nuclear Magnetic Resonance (NMR) Method for Determining Molar Substitution of Poly Alpha-1,6-Glucan Derivatives Approximately 30 mg of poly alpha-1,6-glucan derivative was weighed into a vial on an analytical balance. The vial was removed from the balance and 1.0 mL of deuterium oxide was added to the vial. A magnetic stir bar was added to the vial and the mixture was stirred to suspend the solid. Deuterated sulfuric acid (50% v/v in $D_2O$), 1.0 mL, was then added to the vial and the mixture was heated at 90° C. for 1 hour in order to depolymerize and solubilize the polymer. The solution was allowed to cool to room temperature and then a 0.8-mL portion of the solution was transferred into a 5-mm NMR tube using a glass pipet. A quantitative $^1$H NMR spectrum was acquired using an Agilent VNMRS 400 MHz NMR spectrometer equipped with a 5-mm Autoswitchable Quad probe. The spectrum was acquired at a spectral frequency of 399.945 MHz, using a spectral window of 6410.3 Hz, an acquisition time of 3.744 seconds, an inter-pulse delay of 10 seconds and 64 pulses. The time domain data were transformed using exponential multiplication of 0.50 Hz.

Determination of Weight Average Molecular Weight and/or Degree of Polymerization Degree of polymerization (DP) was determined by size-exclusion chromatography (SEC). For SEC analysis, dry poly alpha-1,6-glucan derivative was dissolved in phosphate-buffered saline (PBS) (0.02-0.2 mg/mL). The chromatographic system used was an Alliance™ 2695 liquid chromatograph from Waters Corporation (Milford, MA) coupled with three on-line detectors: a differential refractometer 410 from Waters, a multi-angle light-scattering photometer Heleos™ 8+ from Wyatt Technologies (Santa Barbara, CA), and a differential capillary viscometer ViscoStar™ from Wyatt Technologies. The columns used for SEC were two Tosoh Haas Bioscience TSK GMPWXL g3K and g4K G3000PW and G4000PW polymeric columns for aqueous polymers. The mobile phase was PBS. The chromatographic conditions used were 30° C. at column and detector compartments, 30° C. at sample and injector compartments, a flow rate of 0.5 mL/min, and injection volume of 100 µL. The software packages used for data reduction were Astra version 6 from Wyatt (triple detection method with column calibration).

Water Solubility Test Method

The following method was used to determine if a poly alpha-1,6-glucan derivative was water soluble. The derivative was suspended at a determined weight in deionized water and shaken or stirred overnight at room temperature. The polymer is soluble if no solid is detected.

Biodegradation Test Method

The biodegradability of the polysaccharide derivative was determined by the Carbon Dioxide Evolution Test Method (OECD Guideline 301B). In the $CO_2$ test, inoculated mineral medium was dosed with a known amount of test substance (s) as the nominal sole source of organic carbon and aerated with $CO_2$-free air. The $CO_2$ produced from the mineralization of organic carbon within the test chambers was displaced by the flow of $CO_2$-free air and trapped as $K_2CO_3$ in KOH trapping solution. The amount of $CO_2$ produced by the test substance (corrected for that evolved by the blank inoculum) is expressed as a percentage of the theoretical amount of $CO_2$ ($TCO_2$) that could have been produced if complete biodegradation of the test substance occurred.

Method for Evaluating Whiteness Performance of Polymers

Whiteness maintenance, also referred to as whiteness preservation, is the ability of a detergent to keep white items from whiteness loss when they are washed in the presence of soils. White garments can become dirty/dingy looking over time when soils are removed from dirty clothes and suspended in the wash water, then these soils can re-deposit onto clothing, making the clothing less white each time they are washed. The whiteness benefit of poly alpha-1,6-glucan derivatives disclosed herein is evaluated using automatic Miniwasher with 5 pots. SBL2004 test soil strips supplied by WFK Testgewebe GmbH are used to simulate consumer soil levels (mix of body soil, food, dirt, grass, etc.). On average, every 1 SBL2004 strip is loaded with 8 g soil. White Fabric swatches of Table 1 below purchased from WFK Testgewebe GmbH are used as whiteness tracers. Before wash test, L, a, b values of all whiteness tracers are measured using a Konica Minolta CM-3610D spectrophotometer.

TABLE 1

White Fabric Swatches

| Code | % Fiber Content | Fiber Construction | Fabric Density (g/m) | Whiteness Index (WI) A* | Whiteness Index (WI) D65** | Size |
|---|---|---|---|---|---|---|
| Cotton Terry | 100 | Woven | ~540 | ~93 | ~163 | 8" × 8" (20 × 20 cm) |
| Cotton Knit | 100 | Weft Knit | ~220 | ~96 | ~165 | 8" × 8" (20 × 20 cm) |
| Polyester/Cotton | 65/35 | Plain Woven | ~125 | ~98 | ~156 | 8" × 8" (20 × 20 cm) |
| Polyester | 100 | Weft Knit | ~200 | ~95 | ~156 | 8" × 8" (20 × 20 cm) |
| Cotton/Spandex | 98/2 | Woven Twill | ~180 | ~86 | ~158 | 8" × 8" (20 × 20 cm) |

*WI(A) - illuminant A (indoor lighting)
**WI(D65) - illuminant D65 (outdoor lighting)

Three cycles of wash are needed to complete the test:
Cycle 1: desired amount of detergent is fully dissolved by mixing with 7.57 L water (at defined hardness) in each Miniwasher tube. 3.5 SBL2004 strips (~28 g of soil) and 3 whiteness tracers (internal replicate) of each fabric type are washed and rinsed in the Miniwasher under defined conditions, then dried.
Cycle 2: The above whiteness tracers are washed again with new set of SBL2004 sheet, and dried. All other conditions remain same as cycle 1.
Cycle 3: The above whiteness tracers are washed again with new set of SBL2004 sheet, and dried. All other conditions remain same as cycle 1.
After Cycle 3, all whiteness tracers are dried and then measured again using Konica Minolta CM-3610D spectrophotometer. The changes in Whiteness Index (ΔWI(CIE)) are calculated based on L, a, b measure before and after wash:

ΔWI(CIE)=WI(CIE)(after wash)−WI(CIE)(before wash).

Miniwasher have 5 pots, 5 products can be tested in one test. In a typical polymer whiteness performance test, one reference product containing comparative polymer or no polymer is tested together with 4 products containing inventive polyglucan derivatives as disclosed herein, and "ΔWI versus reference" is reported.

ΔWI(CIE)versus reference=ΔWI(CIE)(product)−ΔWI(CIE)(reference)

Representative Preparation of Poly Alpha-1,3-Glucan
Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).
Poly alpha-1,3-glucan polymer can be synthesized following the procedures disclosed in U.S. Appl. Publ. No. 2014/0179913, now U.S. Pat. No. 9,139,718 (see Example 12 therein, for example), both of which are incorporated herein by reference in their entirety.

Preparation of Poly Alpha-1,6-Glucan Samples
Methods to prepare poly alpha-1,6-glucan containing various amounts of alpha-1,2 branching are disclosed in published patent application WO2017/091533, which is incorporated herein by reference. Reaction parameters such as sucrose concentration, temperature, and pH can be adjusted to provide poly alpha-1,6-glucan having various levels of alpha-1,2-branching and molecular weight. A representative procedure for the preparation of alpha-1,2-branched poly alpha-1,6-glucan is provided below (containing 19% alpha-1,2-branching and 81% alpha-1,6 linkages). The 1D $^1$H NMR spectrum was used to quantify glycosidic linkage distribution. Additional samples of poly alpha-1,6-glucan with alpha-1,2-branching were prepared similarly. For example, one sample contained 32% alpha-1,2-branching and 68% alpha-1,6 linkages, and another contained 10% alpha-1,2-branching and 90% alpha-1,6 linkages.

Preparation of Poly Alpha-1,6-Glucan with 19% Alpha-1,2 Branching
Soluble alpha-1,2-branched poly alpha-1,6-glucan was prepared using stepwise combination of glucosyltransferase GTF8117 and alpha-1,2 branching enzyme GTFJ18T1, according to the following procedure.
A reaction mixture (2 L) comprised of sucrose (450 g/L), GTF8117 (9.4 U/mL), and 50 mM sodium acetate was adjusted to pH 5.5 and stirred at 47° C. Aliquots (0.2-1 mL) were withdrawn at predetermined times and quenched by heating at 90° C. for 15 min. The resulting heat-treated aliquots were passed through 0.45-μm filter. The flow-through was analyzed by HPLC to determine the concentration of sucrose, glucose, fructose, leucrose, oligosaccharides and polysaccharides. After 23.5 h, the reaction mixture was heated to 90° C. for 30 minutes. An aliquot of the heat-treated reaction mixture was passed through 0.45-μm filter and the flow-through was analyzed for soluble mono/disaccharides, oligosaccharides, and polysaccharides. A major product was linear dextran with a DPw of 93.
A second reaction mixture was prepared by adding 238.2 g of sucrose and 210 mL of alpha-1,2-branching enzyme GTFJ18T1 (5.0 U/mL) to the leftover heat-treated reaction mixture that was obtained from the GTF8117 reaction described immediately above. The mixture was stirred at 30° C. with a volume of ~2.2 L. Aliquots (0.2-1 mL) were withdrawn at predetermined times and quenched by heating at 90° C. for 15 min. The resulting heat-treated aliquots were passed through 0.45-µm filter. The flow-through was analyzed by HPLC to determine the concentration of sucrose, glucose, fructose, leucrose, oligosaccharides and polysaccharides. After 95 h, the reaction mixture was heated to 90° C. for 30 minutes. An aliquot of the heat-treated reaction mixture was passed through 0.45-µm filter and the flow-through was analyzed for soluble mono/disaccharides, oligosaccharides, and polysaccharides. Leftover heat-treated mixture was centrifuged using 1 L centrifugation bottles. The supernatant was collected and cleaned more than 200-fold using ultrafiltration system with 1 or 5 KDa MWCO cassettes and deionized water. The cleaned oligo/polysaccharide product solution was dried. Dry sample was then analyzed by $^1$H NMR spectroscopy to determine the anomeric linkages of the oligosaccharides and polysaccharides.

Comparative Example

Preparation of Benzyl Poly Alpha-1,3-Glucan (DPw 800) with Low DoS

To a 4-neck 2 liter flask was added with stirring 980 mL of water and, portion-wise, poly alpha-1,3-glucan (270 g of 40 wt % solid). Sodium hydroxide (55 g of 50 wt % aqueous solution) was added dropwise over a 10-minute period while the reaction mixture was stirred at 20-25° C., then at room temperature for 2 hours. The reaction mixture was heated to 75° C. and benzyl chloride (77 g) was added. The reaction mixture was heated to 85° C. and kept at 85° C. for 3.5 hours. The reaction mixture was cooled and filtered. The wet cake was washed with water (3×700 mL), ethanol (50 wt %, 800 mL), methanol (80 wt %, 800 mL), acetone (800 mL), and hexanes (2×500 mL). The resulting wet cake was dried on frit with vacuum and $N_2$ purge for 3 hours to afford a white solid. The solid was dried in vacuum oven at 80° C. overnight with nitrogen sweep to give a white solid, 96 g. The degree of benzyl substitution was determined by $^1$H NMR analysis to be 0.17. This material is not water soluble at 0.1 wt %.

Example 1

Modification of Poly Alpha-1,6-Glucan (Alpha-1,2-Branched) with Benzyl Chloride

Poly alpha-1,6-glucan (20 kDa, 27% alpha-1,2-branching and 73% alpha 1,6 linkages, 100 g, 6% water content) was added to water (150 mL) portion by portion at room temperature while the aqueous phase was stirred. The mixture was stirred at room temperature until solids were dissolved. Sodium hydroxide solution (24.5 g, 50 wt %) was added to the solution at room temperature. Slight yellow color was observed. The reaction mixture was heated to 72° C. (the color darkened to brownish) and benzyl chloride (32 g) was added. The reaction mixture was stirred at 75-80° C. for 3 hours. Water (500 mL) was added and the pH of the resulting mixture was adjusted to about 7 by HCl (18.5 wt. %, 4.3 g). Then the mixture was diluted with water to a total volume of about 3 L, which was filtered to remove any solids. The filtrate was purified on ultra-filtration (10K membrane). The retentant was concentrated and washed with isopropyl alcohol (IPA), dried on the filter with $N_2$ flash, then in a 40° C. vacuum oven overnight with nitrogen flash, then under full vacuum (0.1 mm Hg) at 50° C. for 6 hours to give a solid (100.5 g). Based on $^1$H NMR analysis, the DoS was 0.26 (benzyl group). This material is water soluble at greater than 0.1 wt %.

Example 2

Modification of Poly Alpha-1,6-Glucan (Alpha-1,2-Branched) with 1,2-Epoxy-3-Phenoxypropane Poly alpha-1,6-glucan powder (21 kDa, 31% alpha-1,2-branching and 69% alpha-1,6 linkages, 20 g) was dissolved in 50 mL deionized (DI) water in a 3 neck flask under $N_2$. To this was added sodium hydroxide solution (50 wt %, 6 g) and the mixture was stirred at room temperature for 15 min to yield a yellow solution. To this was added 1,2-epoxy-3-phenoxypropane (9 g). The mixture was heated to 70° C. under nitrogen for 4 hours, then cooled overnight under $N_2$, yielding a white gummy (stirrable) material. To this was added 20 mL water, and the mixture was heated to 70° C. for another 6 hours. The gummy material was diluted with approximately 50 mL water, and neutralized with 18 wt % HCl. The product was further diluted to about 1.5 L water, filtered (no visible solid collected), purified by TFF (MWCO 10 kD, 3 membranes with about 4×diafiltration volume), and freeze-dried to yield a light tan solid. The degree of substitution was determined by $^1$H NMR analysis to be 0.25. This material is water soluble at greater than 0.1 wt %.

Example 3

Modification of Poly Alpha-1,6-Glucan (Alpha-1,2-Branched) with Allyl Glycidyl Ether Poly alpha-1,6-glucan powder (15 kDa, 9% alpha-1,2-branching and 91% alpha-1,6 linkages, 20 g) was dissolved in 100 mL deionized water in a 3 neck flask. The solution was cooled to 0-5° C. To this was added 21 g 50 wt % sodium hydroxide solution. The solution was stirred for 15 min. To this was added allyl glycidyl ether (58 g) dropwise via the additional funnel. The mixture was heated to 65° C. under nitrogen for 6 hours. The amber solution was cooled, neutralized to pH 7 with 18 wt % HCl. The light yellow solution was diluted to 1.5 L, purified by nanofiltration (3×MWCO 5 kD, approx. 6 L of water was passed through). The solution was concentrated by ROTAVAP and freeze dried to yield a white powder. The degree of substitution was determined by $^1$H NMR analysis to be 0.7. This material is water soluble.

Example 4

Modification of Poly Alpha-1,6-Glucan with (Alpha-1,2-Branched) 2-Ethyl Hexyl Glycidyl Ether Sodium hydride (2.5 g) was added in small portions to 50 mL stirred dimethyl sulfoxide (DMSO) solution under nitrogen. The mixture was stirred for 24 hours. To this was added poly alpha-1,6-glucan solution (5 g glucan in 50 mL DMSO). The poly alpha-1,6-glucan had a molecular weight of 21 kDa and 31% alpha-1,2-branching and 69% alpha-1,6 linkages. The mixture was stirred at room temperature under nitrogen for 24 hours. To this was added 2-ethyl hexyl glycidyl ether (2 g) and the mixture was stirred for 4 days at room temperature. This mixture was diluted to about 200 mL and neutralized with 18 wt % HCl. The neutralized mixture was diluted to a total of about 700 mL and dialyzed (3.5 MWCO) for about 2 exchanges of water. The dialysate was then purified by diafiltration (5K MWCO PES membrane, 3×) with about 3 L water exchanged. The purified product was freeze dried to yield a light tan solid. The degree of substitution was determined by $^1$H NMR analysis to be 0.08. This material is water soluble at greater than 0.1 wt %.

Example 5

Modification of Poly Alpha-1,6-Glucan (Alpha-1,2-Branched) with Glycidyl Triethylene Glycol Monomethyl Ether Poly alpha-1,6-glucan (21 kDa, 31% alpha-1,2-branching and 6869% alpha 1,6-linkages, 20 g) was dissolved in 50 mL dd water. The solution was cooled to 0-5° C. in an ice/water bath under nitrogen. To this was added 9.8 g of 50 wt % sodium hydroxide solution via the additional funnel. The mixture was stirred at 5° C. for 15 min. To this was added glycidyl triethylene glycol (27 g). The ice bath was removed. The mixture was heated to 65° C. under nitrogen for 6 hours. The mixture was neutralized with HCl and purified by nanofiltration (MWCO 5 kD), freeze-dried to yield a white solid. The degree of substitution was determined by $^1$H NMR analysis to be 0.2. This material is water soluble at greater than 0.1 wt %.

Example 6

Modification of Poly Alpha-1,6-Glucan (Alpha-1,2-Branched) with Benzyl Chloride

Poly alpha-1,6-glucan (17 kDa, 18% alpha-1,2-branching and 82% alpha 1,6 linkages, 100 g, 5% water content) was added to water (150 mL) portion by portion at room temperature with stirring. The mixture was stirred at room temperature until solids were dissolved. Sodium hydroxide solution (26.3 g, 50 wt %) was added to the solution at room temperature. Slight yellow color was observed. The reaction mixture was heated to 71° C. (the color darkened to brownish) and benzyl chloride (34.1 g) was added. The reaction mixture was stirred at 70-75° C. for 3 hours. Water (500 mL) was added and the pH of the resulting mixture was adjusted to about 7 by HCl (18.5 wt. %). Then the mixture was diluted with water to total volume about 3 L, which was filtered to remove any solids. The filtrate was purified by ultra-filtration (10K membrane). The product was concentrated and dried to give a solid (92.7 g). Based on $^1$H NMR analysis, its DoS was 0.23. This material is water soluble at greater than 0.1 wt %.

Example 7

Modification of Poly Alpha-1,6-Glucan (Alpha-1,2-Branched) with p-Toluenesulfonyl Chloride Poly alpha-1,6-glucan (21 kDa, 31% alpha-1,2-branching and 69% alpha 1,6-linkages, 20.0 grams) was dissolved in an aqueous solution (deionized water, 30 mL) of NaOH (4.5 g, 50% concentration) and urea (3.9 g). After that, p-toluenesulfonyl chloride (9.2 g) and polyethylene glycol alkyl ($C_{11}$-$C_{15}$) ether (5 mL) were added. The mixture was stirred vigorously in an ice-bath for at least 3 hours and warmed up to room temperature overnight. The crude product was precipitated and washed thoroughly with isopropanol to afford 29.5 g of desired product in quantitative yield. The degree of substitution (DoS) was measured by elemental analysis to be 0.15. This material is water insoluble at 0.1 wt %.

Example 8

Modification of Poly Alpha-1,6-Glucan (Alpha-1,2-Branched) with p-Toluenesulfonyl Chloride Poly alpha-1,6-glucan (21 kDa, 31% alpha-1,2-branching and 69% alpha 1,6 linkages, 120 grams) was dissolved in an aqueous solution (deionized water, 282 mL) of NaOH (59 g, 50% concentration) and urea (50 g). After that, p-toluenesulfonyl chloride (120 g) and polyethylene glycol alkyl ($C_{11}$-$C_{15}$) ether (30 mL) were added. The mixture was stirred vigorously in an ice-bath for at least 3 hours and warmed up to room temperature overnight. The crude product was precipitated and washed thoroughly with isopropanol to afford 171 g of desired product in quantitative yield. The degree of substitution (DoS) was measured by elemental analysis and NMR to be 0.3. This material is water insoluble at 0.1 wt %.

Example 9

Modification of Poly Alpha-1,6-Glucan (Alpha-1,2-Branched) with p-Toluenesulfonyl Chloride NaOH (46 g, 50% concentration), urea (40 g), and water (230 mL) were mixed and stirred to obtain a clear solution. To which, poly alpha-1,6-glucan (17 kDa, 18% alpha-1,2-branching and 82% alpha-1,6 linkages, 20 g) was added with stirring. The mixture was cooled to −10° C. and vigorously stirred for 2-3 hours to obtain a transparent solution. p-Toluenesulfonyl chloride (0.49 mol, 94 g) and polyethylene glycol alkyl ($C_{11}$-$C_{15}$) ether (20 mL) were then added. The mixture was stirred vigorously in an ice-bath for at least 3 hours and warmed up to room temperature overnight. The crude product was precipitated in ethanol, washed thoroughly with ethanol (200 mL/each, 5 times) to afford 39 g of desired product in quantitative yield. The degree of substitution (DoS) was measured by elemental analysis to be 0.97. This material is water insoluble at 0.1 wt %.

Example 10

Modification of Poly Alpha-1,6-Glucan (Alpha-1,2-Branched) with Styrene Oxide

A 4-neck, 250 mL round bottom flask containing a stir rod, thermocouple, addition funnel and condenser with $N_2$ inlet on top was charged with 36.7 g of poly alpha-1,6-glucan (17 kDa, 18% alpha-1,2-branching and 82% alpha-1,6 linkages) and water (60 mL). The mixture was stirred at room temperature overnight to dissolve the solid. The mixture was stirred while 2.64 g of 50 wt. % sodium hydroxide solution was added over a 5-minute period. The reaction mixture was heated with an 85° C. oil bath for one hour. Styrene oxide (10.4 g) was added in 5 min. The reaction was allowed to stir for 3-4 hours at in the 85° C. oil bath. The temperature was cooled to 25° C. The pH of the mixture was adjusted to about 7 by the addition of 18.5 wt. % hydrochloric acid. The mixture was diluted with water to about 800 mL in total volume and filtered through a 0.22 micron filter. The filtrate was further purified by ultrafiltration (10K membrane). The product was concentrated and dried to give a solid. $^1$H NMR analysis indicated the DoS as 0.25.

Example 11

Modification of Poly Alpha-1,6-Glucan (Alpha-1,2-Branched) with Dihydropyran in DMSO Poly alpha-1,6-glucan powder (40 kDa, 15-25% alpha-1,2-branching and 75-85% alpha-1,6 linkages, 20.10 g) was dissolved in DMSO (100 mL) and stirred at 85° C. for 30 minutes. The solution was cooled to 50° C., followed by the addition of HCl in dioxane (4.0 M, 1.0 mL) and the dropwise addition of dihydropyran (6.33 g). The reaction mixture was stirred at 50° C. for 5 h. The product was precipitated and purified using isopropanol yielding 25.25 g of a white powder after vacuum drying. The modified poly alpha-1,6-glucan had a DoS of 0.20.

Example 12

Modification of Poly Alpha-1,6-Glucan (Alpha-1,2-Branched) with Dihydropyran in DMSO Poly alpha-1,6-glucan powder (40 kDa, 15-25% alpha-1,2-branching and 75-85% alpha-1,6 linkages, 20.11 g) was dissolved in DMSO (100 mL) and stirred at 85° C. for 30 minutes. The solution was cooled to 50° C., followed by the addition of HCl in dioxane (4.0 M, 1.0 mL) and the dropwise addition of dihydropyran (18.82 g). The reaction mixture was stirred at 50° C. for 5.5 h. The product was precipitated and purified using isopropanol yielding 22.97 g of a white powder after vacuum drying. The modified poly alpha-1,6-glucan had a DoS of 0.60.

Example 13

Modification of Poly Alpha-1,6-Glucan (Alpha-1,2-Branched) with Dihydropyran in DMSO (Water-Precipitated)

Poly alpha-1,6-glucan powder (17 kDa, 40% alpha-1,2-branching and 60% alpha-1,6 linkages, 20.12 g) was dissolved in DMSO (100 mL) and stirred at 85° C. for 30 minutes. The solution remained slightly opaque. The solution was cooled to 50° C., followed by the addition of HCl in dioxane (4.0 M, 1.0 mL) and the dropwise addition of dihydropyran (18.86 g). The reaction mixture was stirred at 50° C. for 3.5 h. The product was precipitated and purified using water yielding 14.33 g of a white powder after vacuum drying. The modified poly alpha-1,6-glucan had a DoS of 0.60.

Example 14

Modification of Poly Alpha-1,6-Glucan (Alpha-1,3-Branched) with Dihydropyran in DMSO (Water-Precipitated)

Poly alpha-1,6-glucan powder (15.4 kDa, ~10% alpha-1,3 branching and ~90% alpha-1,6 linkages, 20.14 g) was dissolved in DMSO (100 mL) and stirred at 85° C. for 30 minutes. The solution was cooled to 50° C., followed by the addition of HCl in dioxane (4.0 M, 1.0 mL) and the dropwise addition of dihydropyran (18.85 g). The reaction mixture was stirred at 50° C. for 4 h. The product was precipitated and purified using water yielding 22.91 g of a white powder after vacuum drying. The modified poly alpha-1,6-glucan had a DoS of 0.60.

Example 15

Modification of Poly Alpha-1,6-1,3-Glucan (Alpha-1,2-Branched) with Dihydropyran in DMSO (Water-Precipitated)

Poly alpha-1,6-1,3-glucan powder (3.5 kDa, ~10% alpha-1,2 branching and ~90% alpha-1,6 linkages, 20.11 g) was dissolved in DMSO (100 mL) and stirred 85° C. for 30 minutes. The solution was cooled to 50° C., followed by the addition of HCl in dioxane (4.0 M, 1.0 mL) and the dropwise addition of dihydropyran (18.86 g). The reaction mixture was stirred at 50° C. for 5 h. The product was precipitated and purified using water yielding 22.91 g of a white powder after vacuum drying. The modified poly alpha-1,6-glucan had a DoS of 0.60.

Example 16

Modification of Poly Alpha-1,6-Glucan (Alpha-1,2-Branched) with Dihydrofuran in DMSO Poly alpha-1,6-glucan powder (40 kDa, 15-25% alpha-1,2 branching and 75-85% alpha-1,6 linkages, 10.11 gram) was dissolved in DMSO (50 mL) and stirred 85° C. for 30 minutes. The solution was cooled to 50° C., followed by the addition of HCl in dioxane (4.0 M, 0.5 mL) and the dropwise addition of dihydrofuran (7.82 g). The reaction mixture was stirred at 50° C. for 4.5 h. The product was precipitated and purified using isopropanol yielding 11.59 g of a white powder after vacuum drying. The modified poly alpha-1,6-glucan had a DoS of 0.60.

Example 17

Modification of Poly Alpha-1,6-Glucan (Alpha-1,2-Branched) with Styrene Oxide A 4-neck, 250 mL round bottom flask containing a stir rod, thermocouple, addition funnel and condenser with $N_2$ inlet on top was charged with 10.5 g (61.7 mmoles) of powder glucan (68 kDa, 33% alpha-1,2-branching and 67% alpha-1,6 linkages), and water (18 mL). The mixture was stirred at room temperature overnight to dissolve the solid. The mixture was stirred while 0.65 g (8 mmoles NaOH) of 50 wt. % sodium hydroxide solution was added over a 5-minute period. The reaction mixture was heated with an 85° C. oil bath for one hour. Styrene oxide (4.5 g, 37.5 mmoles) was added in 5 min. The reaction was allowed to stir for 3-4 hours at in the 85° C. oil bath. The temperature was cooled to 25° C. The pH of the mixture was adjusted to about 7 by the addition of 18.5 wt % hydrochloric acid. The mixture was diluted with water to about 800 mL in total volume and filtered through a 0.22 micron filter. The filtrate was further purified by ultrafiltration (10K membrane). The product was concentrated and dried to give a solid (10 g). $^1$H NMR analysis indicated the DoS as 0.24. The material is soluble at greater than 0.1 wt %.

Example 18

Modification of Poly Alpha-1,6-Glucan (Alpha-1,2-Branched) with Allyl Glycidyl Ether Poly alpha-1,6-glucan powder (15 kDa, 9% alpha-1,2-branching and 91% alpha-1,6 linkages, 41 g) was dissolved in 100 mL deionized water in a 3 neck flask. The solution was cooled to 0-5° C. To this was added 21 g 50 wt % sodium hydroxide solution. The solution was stirred for 15 min. To this was added allyl glycidyl ether (29 g) dropwise via the additional funnel. The mixture was heated to 65° C. under nitrogen for 6 hours. The amber solution was cooled, neutralized to pH 7 with 18 wt % HCl. The light yellow solution was diluted to 1.5 L, purified by ultrafiltration (3×MWCO 5 kD, approx. 6 L of water was passed through). The solution was concentrated by ROTAVAP and freeze dried to yield a white powder. The degree of substitution was determined by $^1$H NMR analysis to be 0.3. This material is water soluble at greater than 0.1 wt %.

Example 19

Modification of Poly Alpha-1,6-Glucan (Alpha-1,2-Branched) with Phenyl Isocyanate Poly alpha-1,6-glucan (21 kDa, 31% alpha-1,2-branching and 69% alpha-1,6 linkages, 20.0 g) was heated with 200 mL dimethyl formamide at 90° C. for 1 hour under nitrogen. The mixture was cooled to 55° C. To this was added phenyl isocyanate (14 g). The mixture was heated to 70° C. for 3 hours. After cooling to room temperature, the mixture was poured into 300 mL isopropanol to precipitate out the product. The product was collected by filtration, washed with isopropanol (3×100 mL) and acetone (100 mL). The degree of substitution was determined by $^1$H NMR analysis to be 0.24. This material is water soluble at greater than 0.1 wt %.

Example 20

Modification of Poly Alpha-1,6-Glucan (Alpha-1,2-Branched) with Phenyl Chloroformate Poly alpha-1,6-glucan (21 kDa, 31% alpha-1,2-branching and 69% alpha-1,6 linkages, 10.0 g) was suspended in 200 mL dimethyl acetamide and 4 g lithium chloride. The mixture was heated at 90° C. for 1.5 hour under nitrogen. The mixture was cooled to room temperature. To this was added pyridine (4.2 g). The mixture was cooled in a salt/ice bath. To the cooled mixture was added phenyl chloroformate (9 g) dropwise. The mixture was stirred at 0-5° C. for 2 hours, then warmed to room temperature and stirred for 72 hours. Ice (10 g) was added to the mixture and the resulting mixture was stirred for 30 min at room temperature. The contents were poured into 300 mL isopropanol to yield a fine white precipitate. The solid was collected by filtration, washed with isopropanol (3×100 mL) and acetone (100 mL). The degree of substitution with a carbonate group was determined by $^1$H NMR analysis to be 0.4.

Example 21

Modification of Poly Alpha-1,6-Glucan (Alpha-1,2-Branched) with Phenyl Isocyanate Poly alpha-1,6-glucan powder (56 kDa, 15-25% alpha-1,2-branching, 75-85% alpha-1,6 linkages, 20.14 g) was suspended in DMAc (100 mL) and stirred overnight at room temperature. DMAc (37 g) was distilled off at 85° C. and 20 torr, followed by the dropwise addition of phenyl isocyanate (19.21 g) to the material remaining in the pot. The reaction mixture was stirred at 85° C. for 3 h. The product was precipitated and purified using isopropanol yielding 34.99 g of a white powder after vacuum drying. Calculated DoS based on reagent feed: 0.43

Example 22

Modification of Poly Alpha-1,6-Glucan (Alpha-1,2-Branched) with Phenyl Isocyanate Poly alpha-1,6-glucan powder (56 kDa, 15-25% alpha-1, 2-branching, 75-85% alpha-1,6 linkages, 20.07 g) was suspended in DMAc (100 mL) and stirred overnight at room temperature. DMAc (34.09 g) was distilled off at 87° C. and 22 torr, followed by the dropwise addition of phenyl isocyanate (26.14 g) to the material remaining in the pot. The reaction mixture was stirred at 85° C. for 4 h. The product was precipitated and purified using isopropanol yielding 29.41 g of a powder after vacuum drying. Calculated DoS based on reagent feed: 0.59.

Example 23

Modification of Poly Alpha-1,6-Glucan (Alpha-1,2-Branched) with Phenyl Isocyanate Poly alpha-1,6-glucan powder (40 kDa, 15-25% alpha-1, 2-branching, 75-85% alpha-1,6 linkages, 20.20 g) was suspended in DMAc (100 mL) and stirred overnight at room temperature. DMAc (24.52 g) was distilled off at 88° C. and 30 torr, followed by the dropwise addition of phenyl isocyanate (10.77 g) to the material remaining in the pot. The reaction mixture was stirred at 85° C. for 2 h. The product was precipitated and purified using isopropanol yielding 31.92 g of a powder after vacuum drying. Calculated DoS based on reagent feed: 0.24.

Example 24

Modification of Poly Alpha-1,6-Glucan (Alpha-1,2-Branched) with Diethylcarbamoyl Chloride Poly alpha-1,6-glucan powder (56 kDa, 15-25% alpha-1, 2-branching, 75-85% alpha-1,6 linkages, 20.22 g) was suspended in DMAc (100 mL) and stirred overnight at room temperature. DMAc (33.62 g) was distilled off at 84° C. and 20 torr followed, by the dropwise addition of diethylcarbamoyl chloride (10.06 g) to the material remaining in the pot. The reaction mixture was stirred at 85° C. for 4.5 h. The product was precipitated and purified using isopropanol yielding 21.20 g of a light tan powder after vacuum drying. Calculated DoS based on reagent feed: 0.20.

Example 25

Modification of Poly Alpha-1,6-Glucan (Alpha-1,2-Branched) with Diethylcarbamoyl Chloride Poly alpha-1,6-glucan powder (56 kDa, 15-25% alpha-1, 2-branching, 75-85% alpha-1,6 linkages, 20.20 g) was suspended in DMAc (100 mL) and stirred overnight at room temperature. DMAc (40.01 g) was distilled off at 88° C. and 20 torr, followed by the dropwise addition of diethylcarbamoyl chloride (20.16 g) to the material remaining in the pot. The reaction mixture was stirred at 85° C. for 7 h followed by stirring with cooling to room temperature for 15 hours. The product was precipitated and purified using isopropanol yielding 12.19 g of a light tan powder after vacuum drying. Calculated DoS based on reagent feed: 0.40.

Example 26

Modification of Poly Alpha-1,6-Glucan (Alpha-1,2-Branched) with Dihydropyran

Poly alpha-1,6-glucan powder (56 kDa, 15-25% alpha-1, 2-branching, 75-85% alpha-1,6 linkages, 20.20 g) was dissolved in DMSO (100 mL) and stirred 85° C. for 30 minutes. The solution was cooled to 50° C. followed by the addition of HCl in dioxane (4.0 M, 1.0 mL) and the dropwise addition of dihydropyran (12.46 g). The reaction mixture was stirred at 50° C. for 4 h. The product was precipitated and purified using isopropanol yielding 26.28 g of a white powder after vacuum drying. Calculated DoS based on reagent feed: 0.40.

Example 27

Modification of Poly Alpha-1,6-Glucan (Alpha-1,2-Branched) with p-Toluenesulfonyl Isocyanate Poly alpha-1,6-glucan powder (56 kDa, 15-25% alpha-1, 2-branching, 75-85% alpha-1,6 linkages, 20.05 g) was suspended in DMAc (100 mL) and stirred overnight at room temperature. DMAc (45.56 g) was distilled off at 88° C. and 22 torr, followed by the dropwise addition of p-toluenesulfonyl isocyanate (15.47 g) to the material remaining in the pot. The reaction mixture was stirred at 88° C. for 23 h. The product was precipitated and purified using isopropanol yielding 26.51 g of a powder after vacuum drying. Calculated DoS based on reagent feed: 0.21.

Example 28

Modification of Poly Alpha-1,6-Glucan (Alpha-1,2-Branched) with Phenyl Isocyanate in Water Poly alpha-1,6-glucan powder (21 kDa, 31% alpha-1,2-branching, 69% alpha-1,6 linkages, 20.0 g) was dissolved in 200 mL water. To this was added 50% NaOH solution (4.9 g) and the mixture was stirred for 15 minutes at room temperature. To the stirred solution was added phenylisocyanate (10 g) slowly via an addition funnel. The mixture was stirred for three days at room temperature. Isopropanol (300 mL) was added and the mixture was filtered. The filtrate was concentrated and then precipitated into isopropanol. The solids were collected. The DoS was determined by $^1$H NMR analysis to be 0.14.

Example 29

Modification of Poly Alpha-1,6-Glucan (Alpha-1,2-Branched) with Phenyl Isocyanate in Water Poly alpha-1,6-glucan powder (56 kDa, 15-25% alpha-1, 2-branching, 75-85% alpha-1,6-linkages, 20.15 g) was dissolved in water (80.10 g) followed by the addition of NaOH (0.25 N, ~2 mL) to increase the pH to 11. Phenyl isocyanate (17.52 g) was added dropwise followed by stirring at room temperature for 3.5 hours. The product was precipitated and purified using isopropanol yielding 31.35 g of a white powder after vacuum drying. Calculated DoS based on reagent feed: 0.39

Example 30

Modification of Poly Alpha-1,6-Glucan (Alpha-1,2-Branched) with Benzyl Isocyanate Poly alpha-1,6-glucan powder (560 kDa, 15-25% alpha-1,2-branching, 75-85% alpha-1,6 linkages, 10.08 g) was dissolved in water (40.40 g) followed by the addition of NaOH (0.25 N, ~1 mL) to increase the pH to 11. Benzyl isocyanate (9.79 g) was added dropwise followed by stirring at room temperature for 4 hours. The product was precipitated and purified using isopropanol yielding 13.40 g of a powder after vacuum drying. Calculated DoS based on reagent feed: 0.39.

Example 31

Modification of Poly Alpha-1,6-Glucan (Alpha-1,2-Branched) with Benzyl Chloride

Poly alpha-1,6-glucan (15 kDa, 9% alpha-1,2-branching and 91% alpha-1,6 linkages, 415 g) was added to water (600 mL) portion by portion at room temperature with stirring. The mixture was stirred at room temperature until solids were dissolved. Sodium hydroxide solution (236 g, 50 wt %) was added to the solution at room temperature. The reaction mixture was heated to 75° C. and benzyl chloride (312 g) was added. The reaction mixture was stirred at 75-80° C. for 3 hours. The reaction mixture was stirred at 75-80° C. for 3 hours. The reaction mixture was washed with water (2×1200 mL) and adjusted the pH to about 7. The glue-like mass was divided into three portions and each was washed with IPA repeatedly (3×1000 mL). The resulting solid was collected and dried. The degree of substitution was determined by $^1$H NMR analysis to be 0.65.

Example 32

Modification of Poly Alpha-1,6-Glucan (Alpha-1,2-Branched) with Allyl Glycidyl Ether Poly alpha-1,6-glucan powder (15 kDa, 9% alpha-1,2-branching and 91% alpha-1,6 linkages, 41 g) was dissolved in 100 mL deionized water in a 3-neck flask. The solution was cooled to 0-5° C. To this was added 21 g 50 wt % sodium hydroxide solution. To this was added allyl glycidyl ether (90 g) dropwise. The preparation was heated to 65° C. under nitrogen for 6 hours. The resulting amber solution was cooled and neutralized to pH 7 with 18 wt % HCl. The resulting light yellow solution was diluted to 3 L, and then purified by nanofiltration (3×MWCO 5-kD PES membrane). The solution was concentrated by ROTAVAP and then freeze-dried to yield a white powder. The degree of substitution was determined by $^1$H NMR analysis to be 1.3. This material is water soluble.

Example 33

Modification of Poly Alpha-1,6-Glucan (Alpha-1,2-Branched) with Benzaldehyde Dimethyl Acetal Poly alpha-1,6-glucan powder (21 kDa, 31% alpha-1,2-branching and 69% alpha-1,6 linkages, 20 gram) was dissolved in a solution of dimethylformamide (DMF, 100 mL) and lithium chloride (3 g) at 80° C. (external temperature). Toluene (75 mL) was added and the mixture was distilled for 1 hour, which removed about 63 mL of liquid. Benzaldehyde dimethyl acetal (22 g) and p-toluenesulfonic acid (6.0 g) were added to the mixture. The ensuing reaction was heated in an 80° C. oil bath for 6 hours. The crude material was diluted with DI-water and purified by tangential flow filtration (TFF), 3 kDa MWCO) to afford 13.5 g of pure product. This product was determined by $^1$H-NMR analysis to have a DoS (phenyl acetal) of 0.07.

Example 34

Biodegradation Test Results

The biodegradability of the poly alpha-1,6-glucan derivatives of Examples 1, 18, and 19 was determined by the Carbon Dioxide Evolution Test Method (OECD Guideline 301B). In the $CO_2$ test, inoculated mineral medium was dosed with a known amount of test substance(s) as the nominal sole source of organic carbon and aerated with $CO_2$-free air. The $CO_2$ produced from the mineralization of organic carbon within the test chambers was displaced by the flow of $CO_2$-free air and trapped as $K_2CO_3$ in KOH trapping solution. The amount of $CO_2$ produced by the test substance (corrected for that evolved by the blank inoculum) is expressed as a percentage of the theoretical amount of $CO_2$ ($TCO_2$) that could have been produced if complete biodegradation of the test substance occurred.

TABLE 2

Biodegradation Test Results

| Polysaccharide Derivative from | % $ThCO_2$ evolution at 56 Days |
|---|---|
| Example 1 | 43.2 ± 6.7 |
| Example 18 | 66.9 ± 2.1 |
| Example 19 | 88 |

The biodegradation test results (Table 2) show the materials have degraded by more than 40% at 56 days.

Example 35

Polymer Performance in Liquid Detergent

Liquid detergents were prepared by traditional means known to those of ordinary skill in the art by mixing the following listed ingredients:

| Detergent Ingredient | A | B | C |
|---|---|---|---|
| Sodium Lauryl Sulfate (%) | 11.09 | 11.09 | 11.09 |
| C24EO9 (%) | 7.58 | 7.58 | 7.58 |
| C12/14 Amine Oxide (%) | 1.88 | 1.88 | 1.88 |
| C1218 Fatty acid (%) | 2.95 | 2.95 | 2.95 |
| Solvent (1,2-Propanediol) (%) | 11.89 | 11.89 | 11.89 |
| Silicone (%) | 0.005 | 0.005 | 0.005 |
| NaOH (%) | 1.64 | 1.64 | 1.64 |
| Sodium Tetraborate (%) | 0.96 | 0.96 | 0.96 |
| Citric Acid (%) | 2.45 | 2.45 | 2.45 |
| Ethanol (%) | 0.82 | 0.82 | 0.82 |
| Enzymes (%) | 0.08 | 0.08 | 0.08 |
| Sodium formate (%) | 0.07 | 0.07 | 0.07 |
| Perfume (%) | 0.45 | 0.45 | 0.45 |
| Poly Alpha-1,6-glucan derivative of Example 1 (%) | 0 | 2.45 | 0.00 |
| Poly alpha-1,6-glucan derivative of Example 31 (%) | 0 | 0.00 | 2.45 |
| Water | balance | balance | balance |
| ΔWI(CIE) versus reference on PE (100% polyester knit) | reference | 23.1 | 10.5 |

The whiteness maintenance performance of comparative formulation A, formulation B and formulation C were evaluated according to the method for evaluating whiteness performance of polymers (above). Poly alpha-1,6-glucan derivatives of Examples 1 and 31 provided significant improvement on whiteness performance to formulations B and C.

Example 36

Polymer Performance in Liquid Detergent

Liquid detergents below were prepared by traditional means known to those of ordinary skill in the art by mixing the following listed ingredients:

| Detergent ingredient | A | B | C |
|---|---|---|---|
| AES (%) | 5.78 | 5.78 | 5.78 |
| NI C45EO7 (%) | 6.57 | 6.57 | 6.57 |
| NI C24EO9 (%) | 0.10 | 0.10 | 0.10 |
| LAS (%) | 10.60 | 10.60 | 10.60 |
| DTPA (%) | 0.46 | 0.46 | 0.46 |
| Monoethanolamine (MEA) (%) | 2.52 | 2.52 | 2.52 |
| Sodium cumene sulfonate (%) | 1.21 | 1.21 | 1.21 |
| NaOH (%) | 0.43 | 0.43 | 0.43 |
| Sodium Tetraborate (%) | 1.21 | 1.21 | 1.21 |
| Citric acid (%) | 1.60 | 1.60 | 1.60 |
| Calcium formate (%) | 0.12 | 0.12 | 0.12 |
| Ethanol (%) | 1.61 | 1.61 | 1.61 |
| Brightener (%) | 0.16 | 0.16 | 0.16 |
| Dye (%) | 0.04 | 0.04 | 0.04 |
| Enzyme (Protease, Amylase, Mannanase) (%) | 0.08 | 0.08 | 0.08 |
| Perfume (%) | 0.57 | 0.57 | 0.57 |
| Antifoam | 0.20 | 0.20 | 0.20 |
| Structurant | 0.10 | 0.10 | 0.10 |
| Poly alpha-1,6-glucan derivative of Example 19 (%) | 0.00 | 2.65 | 0.00 |
| Poly alpha-1,6-glucan derivative of Example 21 (%) | 0.00 | 0.00 | 2.65 |
| Water | balance | balance | balance |
| ΔWI(CIE) versus reference on PE (100% polyester knit) | reference | 2.57 | 4.66 |

The whiteness maintenance performance of comparative formulation A, formulation B and formulation C were evaluated according to the method for evaluating whiteness performance of polymers (above). Poly alpha-1,6-glucan derivatives of Examples 19 and 21 provided clear improvement on whiteness performance to formulations B and C.

Example 37

Heavy Duty Liquid Laundry Detergent Compositions

Seven different heavy duty laundry detergent compositions (1-7) are listed in the following table comprising a poly alpha-1,6-glucan derivative as presently disclosed. A poly alpha-1,6-glucan derivative in each of these compositions (listed as "Polymer 5" below) can be any derivative herein.

| Ingredients | 1 | 2 | 3 | 4 % weight | 5 | 6 | 7 |
|---|---|---|---|---|---|---|---|
| $AE_{1.8}S$ | 6.77 | 5.16 | 1.36 | 1.30 | — | — | — |
| $AE_3S$ | — | — | — | — | 0.45 | — | — |
| LAS | 0.86 | 2.06 | 2.72 | 0.68 | 0.95 | 1.56 | 3.55 |
| HSAS | 1.85 | 2.63 | 1.02 | — | — | — | — |
| AE9 | 6.32 | 9.85 | 10.20 | 7.92 | | | |
| AE8 | | | | | | | 35.45 |
| AE7 | | | | | 8.40 | 12.44 | |
| $C_{12-14}$ dimethyl Amine Oxide | 0.30 | 0.73 | 0.23 | 0.37 | — | — | — |
| $C_{12-18}$ Fatty Acid | 0.80 | 1.90 | 0.60 | 0.99 | 1.20 | — | 15.00 |
| Citric Acid | 2.50 | 3.96 | 1.88 | 1.98 | 0.90 | 2.50 | 0.60 |
| Optical Brightener 1 | 1.00 | 0.80 | 0.10 | 0.30 | 0.05 | 0.50 | 0.001 |
| Optical Brightener 3 | 0.001 | 0.05 | 0.01 | 0.20 | 0.50 | — | 1.00 |
| Sodium formate | 1.60 | 0.09 | 1.20 | 0.04 | 1.60 | 1.20 | 0.20 |
| DTI | 0.32 | 0.05 | — | 0.60 | — | 0.60 | 0.01 |
| Sodium hydroxide | 2.30 | 3.80 | 1.70 | 1.90 | 1.70 | 2.50 | 2.30 |
| Monoethanolamine | 1.40 | 1.49 | 1.00 | 0.70 | — | — | — |
| Diethylene glycol | 5.50 | — | 4.10 | — | — | — | — |
| Chelant 1 | 0.15 | 0.15 | 0.11 | 0.07 | 0.50 | 0.11 | 0.80 |
| 4-Formyl-phenylboronic acid | — | — | — | — | 0.05 | 0.02 | 0.01 |
| Sodium tetraborate | 1.43 | 1.50 | 1.10 | 0.75 | — | 1.07 | — |
| Ethanol | 1.54 | 1.77 | 1.15 | 0.89 | — | 3.00 | 7.00 |
| Polymer 1 | 0.10 | — | — | — | — | — | 2.00 |
| Polymer 2 | 0.30 | 0.33 | 0.23 | 0.17 | — | — | — |
| Polymer 3 | — | — | — | — | — | — | 0.80 |
| Polymer 4 | 0.80 | 0.81 | 0.60 | 0.40 | 1.00 | 1.00 | — |
| Polymer 5 | 0.50 | 1.00 | 2.00 | 2.50 | 3.00 | 2.50 | 1.50 |
| 1,2-Propanediol | — | 6.60 | — | 3.30 | 0.50 | 2.00 | 8.00 |
| Structurant | 0.10 | — | — | — | — | — | 0.10 |
| Perfume | 1.60 | 1.10 | 1.00 | 0.80 | 0.90 | 1.50 | 1.60 |
| Perfume encapsulate | 0.10 | 0.05 | 0.01 | 0.02 | 0.10 | 0.05 | 0.10 |
| Protease | 0.80 | 0.60 | 0.70 | 0.90 | 0.70 | 0.60 | 1.50 |
| Mannanase | 0.07 | 0.05 | 0.045 | 0.06 | 0.04 | 0.045 | 0.10 |
| Amylase 1 | 0.30 | — | 0.30 | 0.10 | — | 0.40 | 0.10 |
| Amylase 2 | — | 0.20 | 0.10 | 0.15 | 0.07 | — | 0.10 |
| Xyloglucanase | 0.20 | 0.10 | — | — | 0.05 | 0.05 | 0.20 |
| Lipase | 0.40 | 0.20 | 0.30 | 0.10 | 0.20 | — | — |
| Polishing enzyme | — | 0.04 | — | — | — | 0.004 | — |
| Nuclease | 0.05 | — | — | — | — | — | 0.003 |
| Dispersin B | — | — | — | 0.05 | 0.03 | 0.001 | 0.001 |
| Liquitint® V200 | 0.01 | — | — | — | — | — | 0.005 |
| Leuco colorant | 0.05 | 0.035 | 0.01 | 0.02 | 0.004 | 0.002 | 0.004 |
| Dye control agent | — | 0.3 | — | 0.03 | — | 0.3 | 0.3 |
| Water, dyes & minors | | | | balance (to 100 wt %) | | | |
| pH | | | | 8.2 | | | |

Above table: based on total cleaning and/or treatment composition weight.
Enzyme levels are reported as raw material.
Key for above table:
- AE1.8S is $C_{12-15}$ alkyl ethoxy (1.8) sulfate.
- AE3S is $C_{12-15}$ alkyl ethoxy (3) sulfate.
- AE7 is $C_{12-13}$ alcohol ethoxylate, with an average degree of ethoxylation of 7.
- AE8 is $C_{12-13}$ alcohol ethoxylate, with an average degree of ethoxylation of 8.
- AE9 is $C_{12-13}$ alcohol ethoxylate, with an average degree of ethoxylation of 9.
- Amylase 1 is Stainzyme®, 15 mg active/g, supplied by Novozymes.
- Amylase 2 is Natalase®, 29 mg active/g, supplied by Novozymes.
- Xyloglucanase is Whitezyme®, 20 mg active/g, supplied by Novozymes.
- Chelant 1 is diethylene triamine pentaacetic acid.
- Chelant 2 is 1-hydroxyethane 1,1-diphosphonic acid.
- Dispersin B is a glycoside hydrolase, reported as 1000 mg active/g.
- DTI is either poly(4-vinylpyridine-1-oxide) (such as Chromabond S-403E®), or poly(1-vinylpyrrolidone-co-1-vinylimidazole) (such as Sokalan HP56®).
- Dye control agent is dye control agent as disclosed herein, such as Suparex® O.IN (M1), Nylofixan® P (M2), Nylofixan® PM (M3), or Nylofixan® HF (M4).
- HSAS is mid-branched alkyl sulfate as disclosed in U.S. Pat. Nos. 6,020,303 and 6,060,443, which are incorporated herein by reference.
- LAS is linear alkylbenzenesulfonate having an average aliphatic carbon chain length of $C_9$-$C_{15}$ (HLAS is acid form).
- Leuco colorant is any suitable leuco colorant or mixture thereof as presently disclosed.
- Lipase is Lipex®, 18 mg active/g, supplied by Novozymes.
- Liquitint® V200 is a thiophene azo dye provided by Milliken.
- Mannanase is Mannaway®, 25 mg active/g, supplied by Novozymes.
- Nuclease is a phosphodiesterase, reported as 1000 mg active/g.
- Optical Brightener 1 is disodium 4,4'-bis{[4-anilino-6-morpholino-s-triazin-2-yl]-amino}-2,2'-stilbenedisulfonate.
- Optical Brightener 3 is Optiblanc SPL10® from 3V Sigma.

Perfume encapsulate is a core-shell melamine formaldehyde perfume microcapsule preparation.

Polishing enzyme is para-nitrobenzyl esterase, reported as 1000 mg active/g.

Polymer 1 is bis(($C_2H_5O$)($C_2H_{40}$)n)($CH_3$)—$N^+$—$C_xH_{2x}$—$N^+$—($CH_3$)—bis(($C_2H_5O$)($C_2H_{40}$)n), wherein n=20-30, x=3 to 8 or sulphated or sulfonated variants thereof.

Polymer 2 is ethoxylated ($EO_{15}$) tetraethylene pentamine.

Polymer 3 is ethoxylated polyethylenimine.

Polymer 4 is ethoxylated hexamethylene diamine.

Polymer 5 is a poly alpha-1,6-glucan derivative as presently disclosed.

Protease is Purafect Prime®, 40.6 mg active/g, supplied by DuPont.

Structurant is hydrogenated castor oil.

Example 38

Formulation Suitable for Unit Dose Application

The formulation listed in the following table is water-soluble and suitable for use in a unit dose format. This formulation can be part of a single chamber water-soluble unit dose article or can be split over multiple compartments; if the latter, the below-listed concentrations are as they would be averaged across all the compartments of the full article.

| Ingredients | wt % |
| --- | --- |
| Fatty alcohol ethoxylate non-ionic surfactant, $C_{12-14}$ average degree of ethoxylation of 7 | 3.8 |
| Lutensol XL100 | 0.5 |
| Linear $C_{11-14}$ alkylbenzene sulphonate | 24.6 |
| AE3S ethoxylated alkyl sulphate with an average degree of ethoxylation of 3 | 12.5 |
| Citric acid | 0.7 |
| Palm kernel fatty acid | 5.3 |
| Nuclease enzyme (wt % active protein) | 0.01 |
| Protease enzyme (wt % active protein) | 0.07 |
| Amylase enzyme (wt % active protein) | 0.005 |
| Xyloglucanase enzyme (wt % active protein) | 0.005 |
| Mannanase enzyme (wt % active protein) | 0.003 |
| Ethoxylated polyethyleneimine | 1.6 |
| Amphiphilic graft copolymer | 2.6 |
| Zwitterionic polyamine | 1.8 |
| Poly alpha-1,6-glucan derivative as presently disclosed | 5.0 |
| Anionic polyester terephthalate | 0.6 |
| HEDP | 2.2 |
| Brightener 49 | 0.4 |
| Silicone anti-foam | 0.3 |
| Hueing dye | 0.05 |
| 1,2 Propanediol | 12.3 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| $K_2SO_3$ | 0.4 |
| $MgCl_2$ | 0.3 |
| Water | 10.8 |
| Hydrogenated castor oil | 0.1 |
| Perfume | 2.1 |
| Aesthetic dye & minors | balance to 100 |
| pH (10% product concentration in demineralized water at 20° C.) | 7.4 |

Example 39

Examples of solid free-flowing particulate laundry detergent compositions are provided in the following table:

| Ingredient | Amount in Composition |
| --- | --- |
| Anionic detersive surfactant (such as alkyl benzene sulphonate, alkyl ethoxylated sulphate and mixtures thereof) | 8 wt % to 15 wt % |
| Non-ionic detersive surfactant (such as alkyl ethoxylated alcohol) | 0.1 wt % to 4 wt % |
| Cationic detersive surfactant (such as quaternary ammonium compounds) | 0 wt % to 4 wt % |
| Other detersive surfactant (such as zwitterionic detersive surfactants, amphoteric surfactants and mixtures thereof) | 0 wt % to 4 wt % |
| Carboxylate polymer (such as co-polymers of maleic acid and acrylic acid and/or carboxylate polymers comprising ether moieties and sulfonate moieties) | 0.1 wt % to 4 wt % |
| Polyethylene glycol polymer (such as a polyethylene glycol polymer comprising polyvinyl acetate side chains) | 0 wt % to 4 wt % |
| Polyester soil release polymer (such as Repel-o-tex and/or Texcare polymers) | 0 wt % to 2 wt % |
| Cellulosic polymer (such as carboxymethyl cellulose, methyl cellulose and combinations thereof) | 0.5 wt % to 2 wt % |
| Poly alpha-1,6-glucan derivative as presently disclosed | 0.1 wt % to 8 wt % |
| Other polymer (such as care polymers) | 0 wt % to 4 wt % |
| Zeolite builder and phosphate builder (such as zeolite 4A and/or sodium tripolyphosphate) | 0 wt % to 4 wt % |
| Other co-builder (such as sodium citrate and/or citric acid) | 0 wt % to 3 wt % |
| Carbonate salt (such as sodium carbonate and/or sodium bicarbonate) | 0 wt % to 20 wt % |
| Silicate salt (such as sodium silicate) | 0 wt % to 10 wt % |
| Filler (such as sodium sulphate and/or bio-fillers) | 10 wt % to 70 wt % |
| Source of hydrogen peroxide (such as sodium percarbonate) | 0 wt % to 20 wt % |

-continued

| Ingredient | Amount in Composition |
| --- | --- |
| Bleach activator (such as tetraacetylethylene diamine (TAED) and/or nonanoyloxybenzenesulphonate (NOBS)) | 0 wt % to 8 wt % |
| Bleach catalyst (such as oxaziridinium-based bleach catalyst and/or transition metal bleach catalyst) | 0 wt % to 0.1 wt % |
| Other bleach (such as reducing bleach and/or pre-formed peracid) | 0 wt % to 10 wt % |
| Photobleach (such as zinc and/or aluminum sulphonated phthalocyanine) | 0 wt % to 0.1 wt % |
| Chelant (such as ethylenediamine-N'N'-disuccinic acid (EDDS) and/or hydroxyethane diphosphonic acid (HEDP)) | 0.2 wt % to 1 wt % |
| Hueing agent (such as direct violet 9, 66, 99, acid red 50, solvent violet 13 and any combination thereof) | 0 wt % to 1 wt % |
| Brightener (C.I. fluorescent brightener 260 or C.I. fluorescent brightener 351) | 0.1 wt % to 0.4 wt % |
| Protease (such as Savinase, Savinase Ultra, Purafect, FN3, FN4 and any combination thereof) | 0.1 wt % to 0.4 wt % |
| Amylase (such as Termamyl, Termamyl ultra, Natalase, Optisize, Stainzyme, Stainzyme Plus and any combination thereof) | 0 wt % to 0.2 wt % |
| Cellulase (such as Carezyme and/or Celluclean) | 0 wt % to 0.2 wt % |
| Lipase (such as Lipex, Lipolex, Lipoclean and any combination thereof) | 0 wt % to 1 wt % |
| Other enzyme (such as xyloglucanase, cutinase, pectate lyase, mannanase, bleaching enzyme) | 0 wt % to 2 wt % |
| Fabric softener (such as montmorillonite clay and/or polydimethylsiloxane (PDMS)) | 0 wt % to 15 wt % |
| Flocculant (such as polyethylene oxide) | 0 wt % to 1 wt % |
| Suds suppressor (such as silicone and/or fatty acid) | 0 wt % to 4 wt % |
| Perfume (such as perfume microcapsule, spray-on perfume, starch encapsulated perfume accords, perfume loaded zeolite, and any combination thereof) | 0.1 wt % to 1 wt % |
| Aesthetics (such as coloured soap rings and/or coloured speckles/noodles) | 0 wt % to 1 wt % |
| Miscellaneous | balance to 100 wt % |

What is claimed is:

1. A composition comprising a poly alpha-1,6-glucan derivative that comprises:
   (i) poly alpha-1,6-glucan substituted with at least one organic group linked to the poly alpha-1,6-glucan through a linkage moiety selected from —O—, —OSO$_2$—, —OCOO—, or —OCONH—/—OCON'—;
   (ii) a weight-average degree of polymerization of about 5 to about 4000; and
   iii) a degree of substitution of about 0.001 to about 3.0;
   wherein the poly alpha-1,6-glucan comprises a backbone of glucose monomer units, wherein greater than or equal to 90% of the backbone glucose monomer units are linked via alpha-1,6 glycosidic linkages, at least about 5% of the backbone glucose monomer units have branches via alpha-1,2 glycosidic linkages, less than 1% of the glycosidic linkages of the poly alpha-1,6-glucan are alpha-1,3 glycosidic linkages,
   and wherein the poly alpha-1,6-glucan is not substituted with a hydrophilic group.

2. The composition of claim 1, wherein the degree of substitution is about 0.01 to about 1.5.

3. The composition of claim 1, wherein the degree of substitution is about 0.6.

4. The composition of claim 1, wherein the degree of substitution is about 0.2 to about 0.6.

5. The composition of claim 1, wherein at least one the linkage moiety is —O—.

6. The composition of claim 1, wherein at least one the linkage moiety is —OCONH—/—OCON'—, which optionally is —OCONH—.

7. The poly alpha-1,6-glucan derivative composition of claim 1, wherein the organic group comprises a $C_1$ to $C_{18}$ alkyl group, a hydroxy alkyl group, a carboxy alkyl group, a $C_2$ to $C_{18}$ alkenyl group, a $C_2$ to $C_{18}$ alkynyl group, a benzyl group, a $C_6$ to $C_{20}$ aryl group, or a polyether comprising repeat units of (—CH$_2$CH$_2$O—) and/or (—CH$_2$CH(CH$_3$)O—) wherein the total number of repeat units is in the range of 2 to 100.

8. The composition of claim 1, wherein the organic group comprises a $C_1$-$C_{10}$ alkyl group, a $C_1$-$C_{10}$ hydroxyl alkyl group, or a polyether comprising repeat units of (—CH$_2$CH$_2$O—) and/or (—CH$_2$CH(CH$_3$)O—) wherein the total number of repeat units is in the range of 2 to 100.

9. The composition of claim 1, wherein the organic group comprises a benzyl group.

10. The composition of claim 1, wherein the organic group comprises a benzyl group substituted with one or more of a halogen, cyano group, ester group, amide group, ether group, $C_1$ to $C_6$ alkyl group, aryl group, $C_2$ to $C_6$ alkene group, or $C_2$ to $C_6$ alkyne group.

11. The composition of claim 1, wherein the organic group comprises an alkyl group that is substituted with another alkyl group.

12. The composition of claim 11, wherein the organic group comprises 2-ethylhexyl.

13. The composition of claim 1, wherein the poly alpha-1,6-glucan derivative has a biodegradability as determined by the Carbon Dioxide Evolution Test Method of at least 10% after 90 days.

14. The composition of claim 1, wherein the poly alpha-1,6-glucan derivative has a weight-average degree of polymerization of about 5 to about 500.

15. The composition of claim 1, in the form of a liquid, gel, powder, hydrocolloid, aqueous solution, granule, tablet, capsule, bead or pastille, single compartment sachet, pad, multi-compartment sachet, single compartment pouch, or multi-compartment pouch.

16. The composition of claim 1, further comprising one or more of a detergent builder, complexing agent, polymer, soil release polymer, surfactancy-boosting polymer, bleaching agent, bleach activator, bleaching catalyst, fabric conditioner, clay, foam booster, suds suppressor, anti-corrosion agent, soil-suspending agent, anti-soil re-deposition agent, dye, bactericide, tarnish inhibitor, optical brightener, perfume, saturated or unsaturated fatty acid, dye transfer-inhibiting agent, chelating agent, hueing dye, calcium cation, magnesium cation, visual signaling ingredient, antifoam, structurant, thickener, anti-caking agent, starch, sand, or gelling agent.

17. The composition of claim 1, wherein
   (i) the composition further comprises one or more of a perfume, fragrance, flavor, air odor-reducing agent, insect repellent, insecticide, bubble-generating agent, non-woven material, colorant, preservative, antioxidant, emulsifier, emollient, oil, medicament, or suspending agent; and/or
   (ii) the composition is a disinfecting product, cleaning product, coating product, wipe, or hard surface cleaner such as for a floor, countertop, table, desk, tub/shower, sink, toilet bowl, door/cabinet handle/panel, or glass/window.

18. A method for treating a substrate, the method comprising the steps:
   (a) providing a composition according to claim 1;
   (b) contacting the substrate with the composition; and
   (c) optionally rinsing the substrate;
   wherein the substrate is a textile, fabric, carpet, upholstery, apparel, or surface.

19. The composition of claim 1, further comprising a surfactant.

20. The composition of claim 1, further comprising an enzyme.

* * * * *